US010095343B2

(12) United States Patent
Teutschler et al.

(10) Patent No.: US 10,095,343 B2
(45) Date of Patent: Oct. 9, 2018

(54) DEVICES, METHODS, AND GRAPHICAL USER INTERFACES FOR PROCESSING INTENSITY INFORMATION ASSOCIATED WITH TOUCH INPUTS

(71) Applicant: Apple Inc., Cupertino, CA (US)

(72) Inventors: Sophia Teutschler, San Francisco, CA (US); Stephen R. Breen, San Jose, CA (US); Kenneth L. Kocienda, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/647,200

(22) Filed: Jul. 11, 2017

(65) Prior Publication Data

US 2017/0357358 A1    Dec. 14, 2017

Related U.S. Application Data

(63) Continuation of application No. PCT/US2017/027364, filed on Apr. 13, 2017.
(Continued)

(30) Foreign Application Priority Data

Aug. 9, 2016    (DK) ................................ 2016 70598

(51) Int. Cl.
  *G06F 3/041*   (2006.01)
  *G06F 3/0488*  (2013.01)
  *G06F 3/0482*  (2013.01)
(52) U.S. Cl.
  CPC ........ *G06F 3/0414* (2013.01); *G06F 3/04883* (2013.01); *G06F 3/0482* (2013.01)
(58) Field of Classification Search
  CPC ... G06F 3/0414; G06F 3/04883; G06F 3/0482
(Continued)

(56) References Cited

U.S. PATENT DOCUMENTS 9,389,718 B1 *   7/2016  Letourneur ........... G06F 3/0412
2006/0053387 A1 * 3/2006  Ording ................ G06F 3/04883
                                                715/773
(Continued)

FOREIGN PATENT DOCUMENTS

AU       2016102063 A4    1/2017

OTHER PUBLICATIONS

Office Action, dated Oct. 17, 2016, received in Danish Patent Application No. 201670598, 8 pages.
(Continued)

*Primary Examiner* — John T Repsher, III
(74) *Attorney, Agent, or Firm* — Morgan, Lewis & Bockius LLP

(57) ABSTRACT

An electronic device detects a change in intensity of an input at a location corresponding to a first user interface element associated with a user-interaction behavior model; generates, with an application-independent software module, output associated with the first user interface element determined in accordance with the change in intensity of the input and the user-interaction behavior model, including a first user-interaction component behavior and a second user-interaction component behavior; detects a change in intensity of an input at a location corresponding to a second user interface element associated with a subset of the user-interaction component behaviors; obtains, from the application-independent software module, an indication of whether the change in intensity of the input has met conditions associated with the first user-interaction component behavior; and updates, based on the indication, an appearance of the second user interface element based on the first user-interaction component behavior.

37 Claims, 65 Drawing Sheets

Related U.S. Application Data

(60) Provisional application No. 62/349,069, filed on Jun. 12, 2016.

(58) Field of Classification Search
USPC .......................................................... 715/863
See application file for complete search history.

(56) References Cited

U.S. PATENT DOCUMENTS

| | | | |
|---|---|---|---|
| 2008/0024459 A1* | 1/2008 | Poupyrev | G06F 3/016 345/173 |
| 2012/0038580 A1* | 2/2012 | Sasaki | G06F 3/016 345/173 |
| 2013/0141364 A1 | 6/2013 | Lynn et al. | |
| 2013/0155018 A1 | 6/2013 | Dagdeviren | |
| 2013/0227418 A1* | 8/2013 | Sa | G06F 3/04883 715/728 |
| 2014/0282283 A1* | 9/2014 | Glebocki | G06F 3/04815 715/863 |
| 2015/0062052 A1 | 3/2015 | Bernstein et al. | |
| 2015/0067605 A1 | 3/2015 | Zambetti et al. | |
| 2015/0138155 A1* | 5/2015 | Bernstein | G06F 3/0412 345/174 |
| 2015/0268725 A1 | 9/2015 | Levesque et al. | |
| 2017/0060315 A1* | 3/2017 | Park | G06F 3/0482 |
| 2017/0090653 A1* | 3/2017 | Seo | G06F 3/0412 |

OTHER PUBLICATIONS

Office Action, dated Feb. 28, 2017, received in Danish Patent Application No. 201670598, 2 Pages.
TechnoBuffalo: "3D Touch Explained: Peek, Pop, and Quick Actions!", YouTube, https://www.youtube.com/watch?v=-5sT1L7zUXc, Sep. 26, 2015.
Notice of Allowance, dated Jan. 16, 2018, received in Danish Patent Application No. 201670598, which corresponds with U.S. Appl. No. 15/647,200, 2 pages.
Extended European Search Report, dated Oct. 9, 2017, received in European Patent Application No. 17175425.2, which corresponds with U.S. Appl. No. 15/647,200, 11 pages.
International Search Report and Written Opinion, dated Nov. 29, 2017, received in International Patent Application No. PCT/US2017/027364, which corresponds with U.S. Appl. No. 15/647,200, 26 pages.
Patent, dated Apr. 16, 2018, received in Danish Patent Application No. 201670598, which corresponds with U.S. Appl. No. 15/647,200, 3 pages.

* cited by examiner

With application-independent software:

620 In response to obtaining, from the application software, the information identifying the first operation, perform the first operation (Figure 6B)

622 The first operation includes visually distinguishing at least a portion of the first user interface from another portion of the first user interface 624 The first operation includes transitioning at least a portion of the first user interface from a first state defined by the application software to a second state defined by the application software 626 The first operation includes transitioning the portion of the first user interface from the first state defined by the application software to the second state defined by the application software using animation curves defined by the application-independent software 628 While, or subsequent to, performing the first operation: in accordance with a determination that the input has been canceled, provide from the application-independent software to the application software information indicating that the touch has been canceled; subsequent to providing the information indicating that the touch has been canceled to the application software, obtain, at the application-independent software, from the application software, information identifying a fourth operation selected by the application software based on the information indicating that the touch has been canceled; and, in response to obtaining from the application software the information identifying the fourth operation, with the application-independent software, perform the fourth operation 630 While, or subsequent to, performing the first operation: with the application-independent software, continue to monitor the input; while the application-independent software is monitoring the input, in accordance with a determination that the input has been canceled, provide from the application software to the application-independent software information indicating that the touch has been canceled; and, subsequent to providing from the application software to the application-independent software information indicating that the touch has been canceled, cease, at the application-independent software, to monitor the input.

Figure 6C

With application-independent software:

632 Subsequent to providing the second touch information, detect an increase in an intensity of the contact on the touch-sensitive surface; and, with the application-independent software: obtain third touch information that corresponds to the contact with the increased intensity; and, in accordance with a determination that the increased intensity of the input satisfies preview criteria including that the input satisfies a second intensity threshold that is higher than the first intensity threshold, provide to the application software fourth touch information that is distinct from the third touch information. The fourth touch information includes information indicating that the input satisfies the preview criteria. Subsequent to providing the fourth touch information, obtain from the application software information identifying a second operation selected by the application software based on the fourth touch information; and, in response to obtaining the information identifying the second operation, perform the second operation.

634 The second operation includes overlaying a preview area on a portion of the first user interface 636 Subsequent to providing the fourth touch information, detect a further increase in an intensity of the contact on the touch-sensitive surface; and, with the application-independent software: obtain fifth touch information that corresponds to the contact with the increased intensity; and, in accordance with a determination that the further increased intensity of the input satisfies commit criteria including that the input satisfies a third intensity threshold that is distinct from the first intensity threshold and the second intensity threshold, provide to the application software sixth touch information that is distinct from the fifth touch information. The sixth touch information includes information indicating that the input satisfies the commit criteria. Subsequent to providing the sixth touch information, obtain from the application software information identifying a third operation selected by the application software based on the fifth touch information; and, in response to obtaining the information identifying the third operation, perform the third operation.

638 The third operation includes replacing display of the first user interface with a second user interface 640 With the application-independent software, initiate one or more tactile output devices to output a tactile output in response to a determination that an intensity of the input has changed between a first state not satisfying intensity threshold of the one or more intensity thresholds and a second state satisfying the intensity threshold.

Figure 6D

716 Update, based on the indication, from the application-independent software module, of whether the change in intensity of the input has met conditions associated with the first user-interaction component behavior, an appearance of the second user interface element on the display based on the first user-interaction component behavior > 718 In accordance with a determination that the change in intensity of the input has not met the conditions associated with the first user-interaction component behavior, forgo updating of the appearance of the second user interface element on the display based on the first user-interaction component behavior > 720 The first user-interaction component behavior includes one or more animation curves based on which the appearance of the second user interface element on the display is updated > 722 Updating the appearance of the second user interface element includes displaying a third user interface element that is distinct from the second user interface element, and the first user-interaction component behavior defines whether the third user interface element is to remain on display in response to the input in the second sequence of inputs ceases to be detected.

> 724 The first user-interaction component behavior includes a predefined animation > 726 Updating the appearance of the second user interface element on the display based on the first user-interaction component behavior includes changing, using the application-independent software module, the appearance of the second user interface element from a first display state to a second display state that is distinct from the first display state. The first display state and the second display state are defined by a software application associated with the second user interface element.

Figure 7C

806 Obtain a change in a value of a respective simulated physical parameter of a first physics model that is driven by the change in intensity of the first input on the touch-sensitive surface

| 808 The first physics model is a mass and spring model |

| 810 The respective simulated physical parameter is displacement of a simulated mass |

Figure 8B

812 Update an appearance of the user interface by progressing a first animation between a first state and a second state based on the change in the respective simulated physical parameter of the first physics model > 814 Obtaining the change in the value of the respective simulated physical parameter includes: updating the first physics model using the change in intensity of the first input on the touch-sensitive surface from the first intensity to the second intensity; and measuring a change in the respective simulated physical parameter of the one or more simulated physical parameters of the first physics model
>
> > 816 The first physics model is updated repeatedly as the intensity of the first input changes. The change in the respective simulated physical parameter responds dynamically to changes in the intensity of the first input. Updating the appearance of the user interface includes repeatedly updating the appearance of the user interface as the respective simulated physical parameter responds dynamically to changes in the intensity of the first input.

> 818 Progressing the animation includes updating a value of a respective display parameter of an object displayed in the user interface. The respective simulated physical parameter of the object is different from the respective simulated physical parameter of the first physics model.

> 820 Progressing the animation includes changing a size of the first user interface object > 822 Progressing the animation includes changing a blur radius of a background of the user interface > 824 Progressing the animation includes changing a size of a background of the user interface > 826 The user interface is a user interface of an application that includes application software that is specific to the application. The physics model is defined by application-independent software. The first state and second state of the animation are defined by the application software.

Figure 8C

DEVICES, METHODS, AND GRAPHICAL USER INTERFACES FOR PROCESSING INTENSITY INFORMATION ASSOCIATED WITH TOUCH INPUTS

RELATED APPLICATIONS

This application is a continuation of International Patent Application No. PCT/US2017/027364, filed Apr. 13, 2017, which claims the benefit of, and priority to, U.S. Provisional Patent Application Ser. No. 62/349,069, filed Jun. 12, 2016 and Danish Patent Application No. 201670598, filed Aug. 9, 2016. All of these applications are incorporated by reference herein in their entireties.

TECHNICAL FIELD

This relates generally to electronic devices with touch-sensitive surfaces, including but not limited to electronic devices with sensors to detect intensity of contacts on the touch-sensitive surfaces.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interface objects on a display.

Exemplary user interface objects include digital images, video, text, icons, control elements such as buttons and other graphics. Exemplary manipulations include adjusting the position and/or size of one or more user interface objects or activating buttons or opening files/applications represented by user interface objects, as well as associating metadata with one or more user interface objects or otherwise manipulating user interfaces. Certain manipulations of user interface objects are associated with certain types of touch inputs, which are referred to as gestures.

Such surfaces, in conjunction with sensors capable of detecting intensity of contacts, can be used to detect advanced gestures (e.g., intensity-dependent gestures). However, users who are not familiar with such gestures may spend a long time to learn how devices will respond to such gestures. In addition, applications that respond to a same advanced gesture differently present additional challenges to such users. When devices perform unintended operations due to a user's erroneous use of an advanced gesture, the user needs to cancel such operations and provide inputs again. These manipulations are cumbersome and tedious. In addition, having to undo unintended operations and providing inputs again take longer than necessary, thereby wasting energy. This latter consideration is particularly important in battery-operated devices. Thus, it would be desirable to have a framework for processing advanced gestures.

SUMMARY

Accordingly, there is a need for electronic devices with faster, more efficient, and more consistent methods and interfaces for processing inputs (e.g., intensity-dependent gestures). Such methods and interfaces optionally complement or replace conventional methods for processing inputs. Such methods and interfaces reduce the number, extent, and/or nature of the inputs from a user and produce a more efficient human-machine interface. In addition, such methods and interfaces provide more consistent human-machine interface for a plurality of software applications. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are included in a non-transitory computer readable storage medium or other computer program product configured for execution by one or more processors. Alternatively, or in addition, executable instructions for performing these functions are, optionally, included in a transitory computer-readable storage medium or other computer program product configured for execution by one or more processors.

In accordance with some embodiments, a method is performed at an electronic device with a display, a touch-sensitive surface, and one or more sensors to detect intensity of contacts with the touch-sensitive surface. The method includes displaying a first user interface of application software on the display. The first user interface is generated based on instructions from the application software. The method also includes detecting an input by a contact on the touch-sensitive surface at a location that corresponds to the first user interface. The method further includes, with application-independent software that is available for use by a plurality of software applications on the electronic device: obtaining first touch information that corresponds to the contact on the touch-sensitive surface; and, in response to obtaining the first touch information, providing to the application software second touch information that is distinct from the first touch information. The second touch information includes intensity information indicating changes in the input with respect to one or more intensity thresholds. The method further includes, subsequent to providing the second touch information to the application software, obtaining from the application software information identifying a first operation selected by the application software based on the second touch information; and, in response to obtaining, from the application software, the information identifying the first operation, performing the first operation.

In accordance with some embodiments, a method is performed at an electronic device with a display, a touch-sensitive surface, and one or more sensors to detect intensity of contacts with the touch-sensitive surface. The method includes, while displaying a first user interface element on the display, detecting a first sequence of one or more inputs that includes detecting a change in intensity of an input on the touch-sensitive surface at a location that corresponds to the first user interface element. The first user interface element is associated with a user-interaction behavior model for responding to the change in intensity of inputs. The user-interaction behavior model is composed of a plurality of user-interaction component behaviors. The method also includes, in response to detecting the first sequence of inputs, generating, with an application-independent software module, output at the device that is associated with the first user interface element that is determined in accordance with the change in intensity of the input and the user-interaction behavior model, including a first user-interaction component behavior and a second user-interaction component behavior that is distinct from the first user-interaction component behavior; after generating the output that is associated with the first user interface element, displaying, on the display, a second user interface element that is associated with a first subset of the user-interaction component behaviors in the user-interaction behavior model; while displaying the second user interface element on the display, detecting a second sequence of inputs that includes detecting a change in intensity of an input on the touch-sensitive surface at a location that corresponds to the second user interface element; and, in response to detecting the second sequence of inputs: obtaining, from the application-independent software module, an indication of whether the change in intensity of the input has met conditions associated with the first user-interaction component behavior; and updating, based on the indication from the application-independent software module of whether the change in intensity of the input has met conditions associated with the first user-interaction component behavior, an appearance of the second user interface element on the display based on the first user-interaction component behavior.

In accordance with some embodiments, a method is performed at an electronic device with a display, a touch-sensitive surface, and one or more sensors to detect intensity of contacts with the touch-sensitive surface. The method includes displaying a user interface on the display. The user interface includes one or more user interface objects (also called herein user interface elements). The method also includes detecting a first input on the touch-sensitive surface at a location that corresponds to a first user interface object of the one or more user interface objects on the display. Detecting the first input includes detecting a change in intensity of the first input on the touch-sensitive surface from a first intensity to a second intensity. The method further includes, in response to detecting the first input: obtaining a change in a value of a respective simulated physical parameter of a first physics model that is driven by the change in intensity of the first input on the touch-sensitive surface; and updating an appearance of the user interface by progressing a first animation between a first state and a second state based on the change in the respective simulated physical parameter of the first physics model.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to enable display of a first user interface of application software. The first user interface is generated based on instructions from the application software. The processing unit is also configured to detect an input by a contact on the touch-sensitive surface unit at a location that corresponds to the first user interface. The processing unit is further configured to, with application-independent software that is available for use by a plurality of software applications on the electronic device: obtain first touch information that corresponds to the contact on the touch-sensitive surface unit; and, in response to obtaining the first touch information, provide to the application software second touch information that is distinct from the first touch information. The second touch information includes intensity information indicating changes in the input with respect to one or more intensity thresholds. The processing unit is further configured to, subsequent to providing the second touch information to the application software, obtain from the application software information identifying a first operation selected by the application software based on the second touch information; and, in response to obtaining, from the application software, the information identifying the first operation, perform the first operation.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to, while the display unit is displaying a first user interface element, detect a first sequence of one or more inputs, including detecting a change in intensity of an input on the touch-sensitive surface unit at a location that corresponds to the first user interface element. The first user interface element is associated with a user-interaction behavior model for responding to the change in intensity of inputs. The user-interaction behavior model is composed of a plurality of user-interaction component behaviors. The processing unit is configured to, in response to detecting the first sequence of inputs, generate, with an application-independent software module, output at the device that is associated with the first user interface element that is determined in accordance with the change in intensity of the input and the user-interaction behavior model, including a first user-interaction component behavior and a second user-interaction component behavior that is distinct from the first user-interaction component behavior; after generating the output that is associated with the first user interface element, enable display of a second user interface element that is associated with a first subset of the user-interaction component behaviors in the user-interaction behavior model; while the display unit is displaying the second user interface element on the display unit, detect a second sequence of inputs, including detecting a change in intensity of an input on the touch-sensitive surface unit at a location that corresponds to the second user interface element; and, in response to detecting the second sequence of inputs: obtain, from the application-independent software module, an indication of whether the change in intensity of the input has met conditions associated with the first user-interaction component behavior; and update, based on the indication from the application-independent software module of whether the change in intensity of the input has met conditions associated with the first user-interaction component behavior, an appearance of the second user interface element on the display unit based on the first user-interaction component behavior.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to enable display of a user interface on the display unit. The user interface includes one or more user interface objects. The processing unit is also configured to detect a first input on the touch-sensitive surface unit at a location that corresponds to a first user interface object of the one or more user interface objects on the display unit. Detecting the first input includes detecting a change in intensity of the first input on the touch-sensitive surface unit from a first intensity to a second intensity. The processing unit is further configured to, in response to detecting the first input: obtain a change in a value of a respective simulated physical parameter of a first physics model that is driven by the change in intensity of the first input on the touch-sensitive surface unit; and update an appearance of the user interface by progressing a first animation between a first state and a second state based on the change in the respective simulated physical parameter of the first physics model.

In accordance with some embodiments, an electronic device includes a display, a touch-sensitive surface, one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and one or more sensors to detect intensity of contacts with the touch-sensitive surface, includes means for performing or causing performance of the operations of any of the methods described herein.

Thus, electronic devices with displays, touch-sensitive surfaces and one or more sensors to detect intensity of contacts with the touch-sensitive surface are provided with faster, more efficient methods and interfaces for processing inputs, thereby increasing the effectiveness, efficiency, and user satisfaction with such devices. Such methods and interfaces may complement or replace conventional methods for inputs.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6D are flow diagrams illustrating a method of processing inputs in accordance with some embodiments.

FIGS. 7A-7C are flow diagrams illustrating a method of processing inputs in accordance with some embodiments.

FIGS. 8A-8C are flow diagrams illustrating a method of processing inputs in accordance with some embodiments.

DESCRIPTION OF EMBODIMENTS

Many electronic devices have graphical user interfaces that allow certain manipulations of displayed user interface objects in response to certain touch inputs. However, various software applications may be configured to respond in an inconsistent manner to a same input (e.g., a pressure-based or intensity-based input), which makes it more challenging for a user to learn how to interact with different software applications. The disclosed embodiments address these limitations and disadvantages by providing a common framework for processing pressure-based (or intensity-based) inputs. Because instructions for processing such inputs are provided in electronic devices (e.g., in an operating system), software applications can be developed faster and made smaller, thereby improving the efficiency in storing and executing such software applications on electronic devices. In addition, various software applications respond to a same input in a consistent manner using the common framework, thereby improving user experience with such electronic devices. For battery-operated devices, the disclosed methods and devices conserve battery power and increase the time between battery charges. Furthermore, software applications can subscribe to different features of the common framework, thereby allowing the software applications to customize responses to inputs without losing the consistency and advanced features of the common framework.

Figure 2:
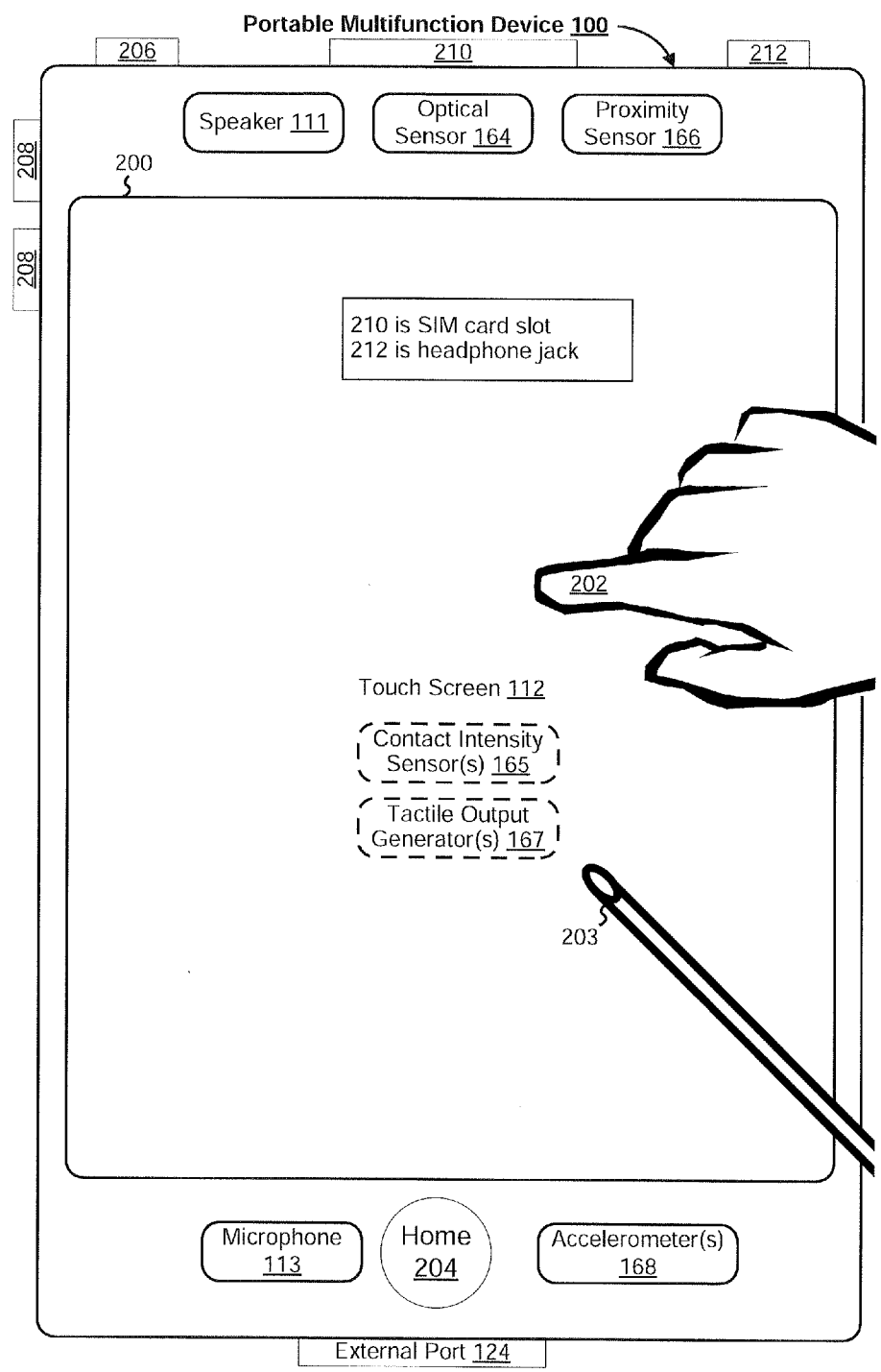
FIG. 2 illustrates a portable multifunction device having a touch screen in accordance with some embodiments.
Figure 3:
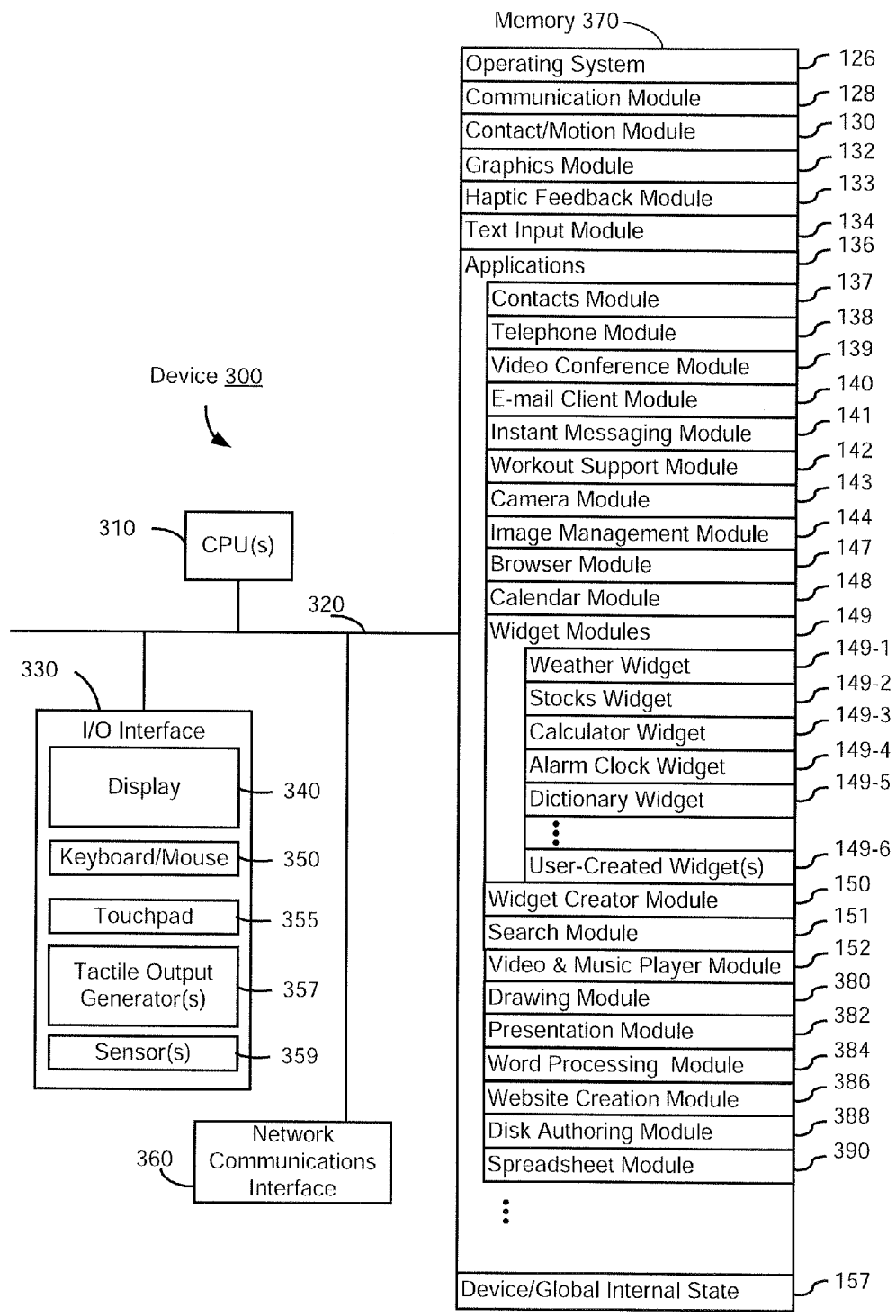
FIG. 3 is a block diagram of an exemplary multifunction device with a display and a touch-sensitive surface in accordance with some embodiments.

Below, FIGS. 1A-1B, 2, and 3 provide a description of exemplary devices. FIGS. 4A-4B and 5A-5DD illustrate exemplary user interfaces for processing inputs. FIGS. 4C-4E illustrate exemplary dynamic intensity thresholds. FIGS. 5EE-5GG illustrate simulated physics models in accordance with some embodiments. FIGS. 6A-6D illustrate a flow diagram of a method of processing inputs. 7A-7C illustrate a flow diagram of a method of processing inputs. FIGS. 8A-8C illustrate a flow diagram of a method of processing inputs. The user interfaces in FIGS. 5A-5DD are used to illustrate the processes in FIGS. 6A-6D, 7A-7C, and 8A-8C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
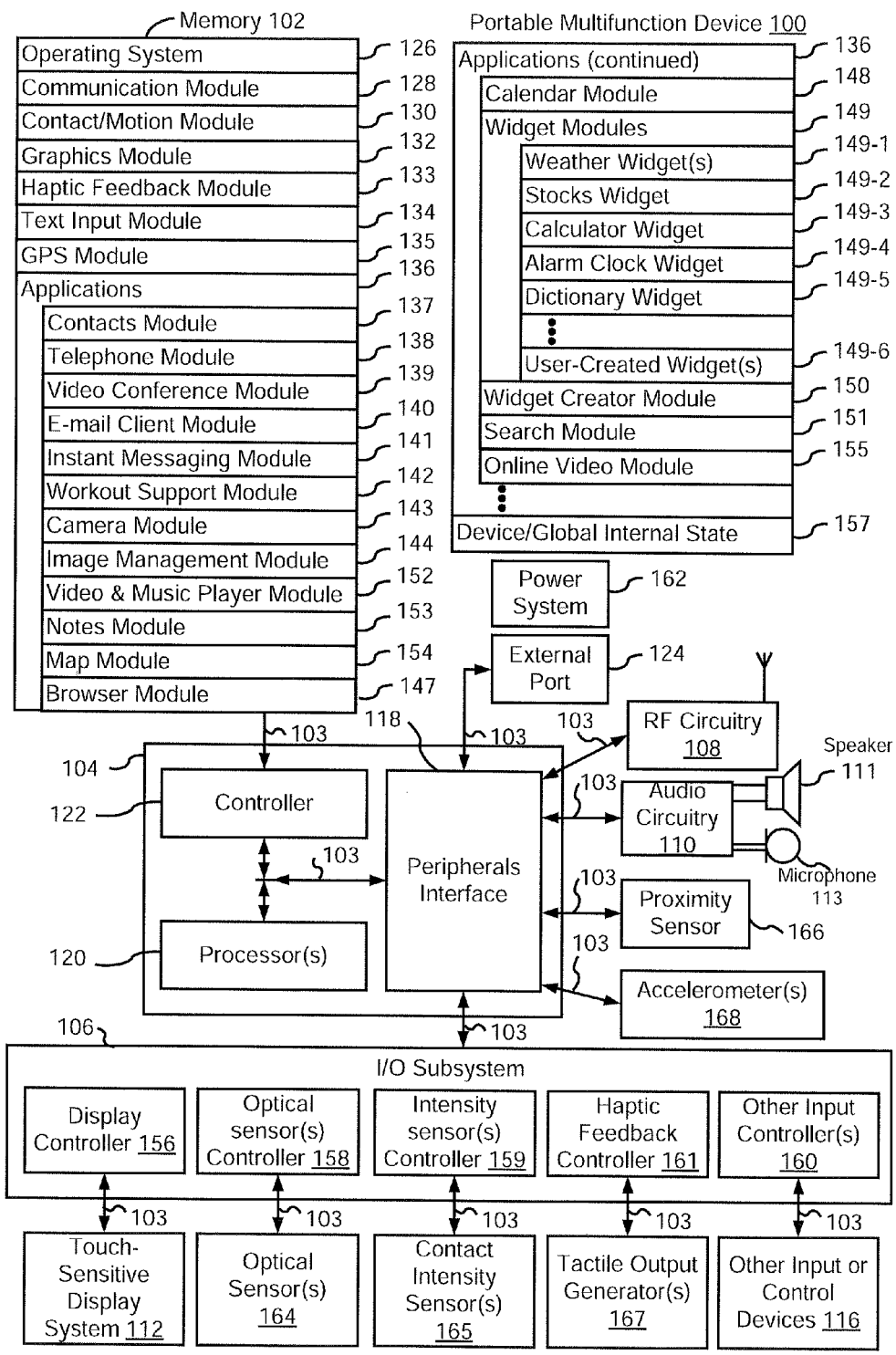
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). In some embodiments, tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
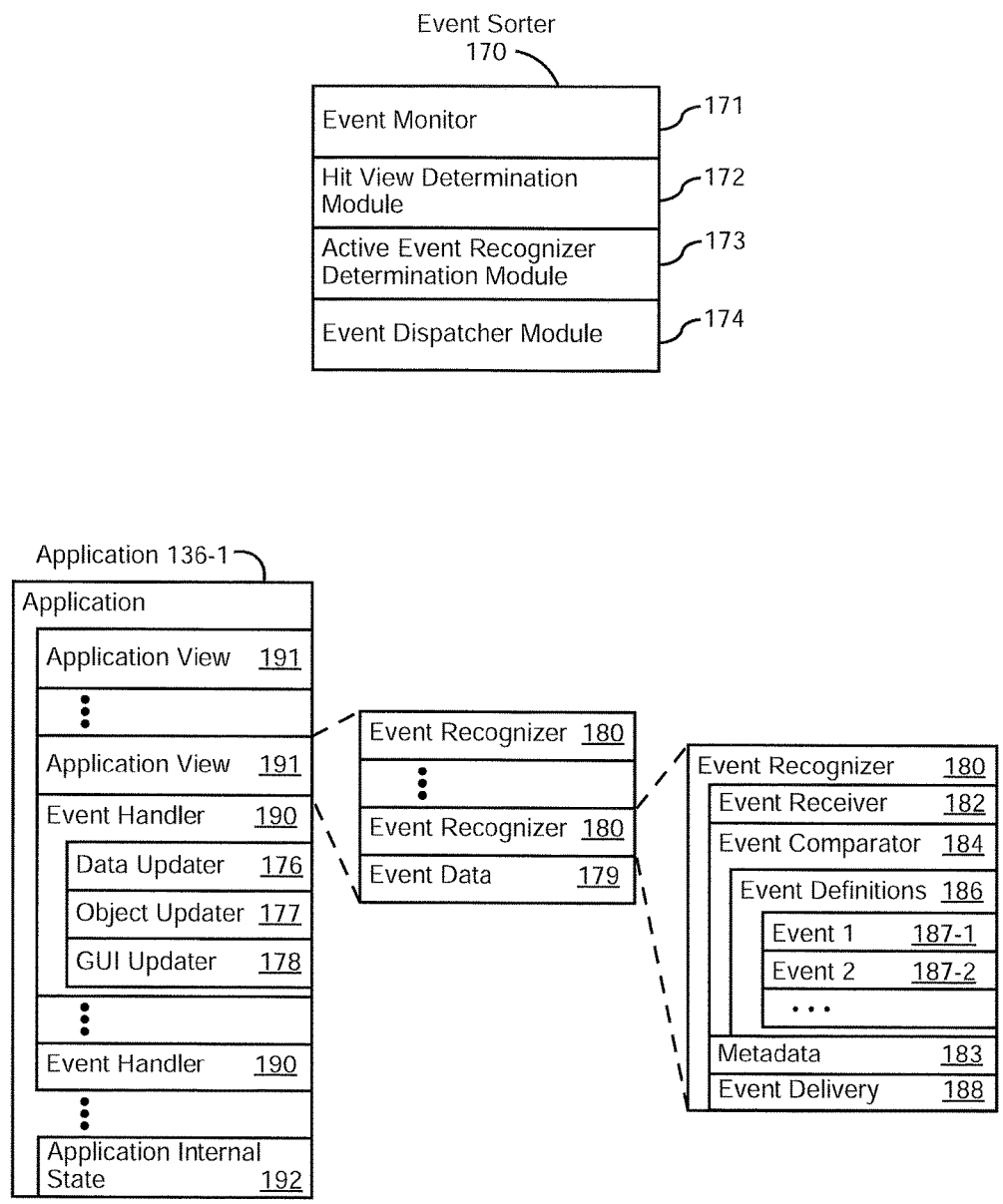
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user interface object. In some embodiments, event comparator 184 performs a hit test to determine which user interface object is associated with a sub-event. For example, in an application view in which three user interface objects are displayed on touch-sensitive display system 112, when a touch is detected on touch-sensitive display system 112, event comparator 184 performs a hit test to determine which of the three user interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user interface object or updates the position of a user interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIGS. 1C-1L are block diagrams illustrating processing touch information in accordance with some embodiments.

As described above with respect to FIG. 1A, contact/motion module 130 determines status and/or a change in the status of a touch input. In some embodiments, the device generates signals or data (e.g., in the form of a data object) to transfer the determined status and/or the determined change in the status of a touch input to one or more software components. In some embodiments, the data object is called an event object. An event object includes data that represents the status of a corresponding touch input. In some embodiments, the event object is a mouse event object (because the touch input is equivalent to an input by a mouse). For example, in such embodiments, a touch input moving across a touch-sensitive surface corresponds to a mouse movement (e.g., a mouse moved event). In some other embodiments, the event object is a touch event object that is distinct from a mouse event object. In some embodiments, the touch event object includes data (e.g., touch information) that represents touch-specific properties of a corresponding touch input (e.g., a number of concurrent touches, an orientation of a finger contact or a stylus, etc.). In some embodiments, the event object is a force event object that is distinct from a mouse event object (or a touch event object). In some embodiments, the force event object includes data that represents force event specific properties of a corresponding touch input (e.g., an intensity applied by the touch input, a stage or phase of the touch input, etc.). In some embodiments, the event object includes any combination of such properties (e.g., mouse event specific properties, touch event specific properties, and force event specific properties).

In some embodiments, contact/motion module 130 generates (or updates) an event object and sends an event object to one or more applications (e.g., application 136-1, such as e-mail client module 140 in FIG. 1A, application 136-2, such as browser module 147, application 136-3, and/or application 136-4). Alternatively, contact/information module 130 sends information regarding contacts (e.g., raw coordinates of contacts) to one or more applications (e.g., application 1 (136-1) and/or application 2 (136-2)), and an application, that receives the information, generates (or updates) one or more event objects. In some embodiments, an application includes application-independent software module 220 that generates (or updates) one or more event objects and sends the one or more event objects to a portion of the application other than application-independent software module 220. Alternatively, application-independent software module 220 prepares touch information that is distinct from touch information received from contact/motion module 130, and sends the prepared touch information to a portion of the application other than application-independent software module 220.

Figure 1C:
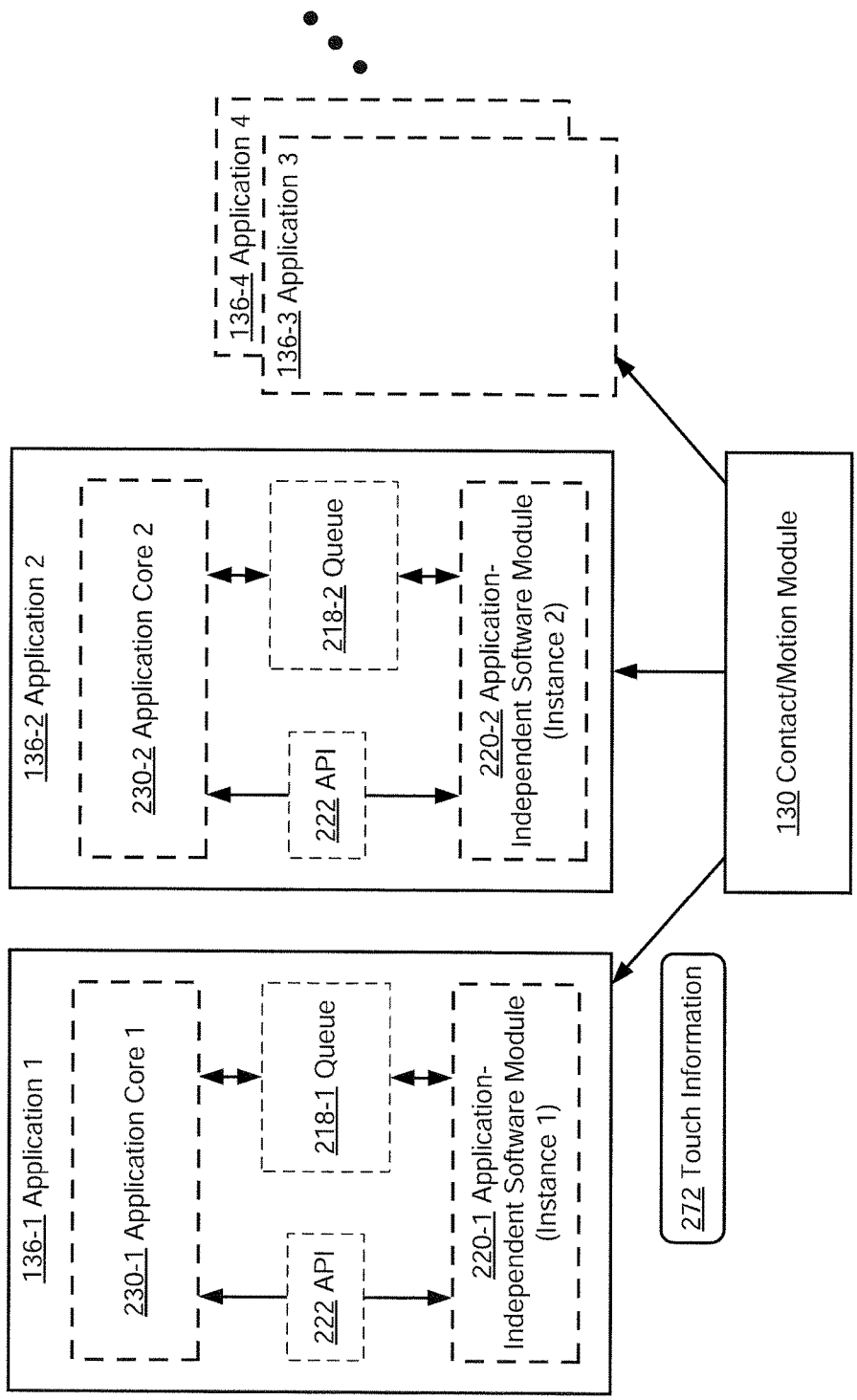
FIGS. 1C-1L are block diagrams illustrating processing touch information in accordance with some embodiments.
Figure 1D:
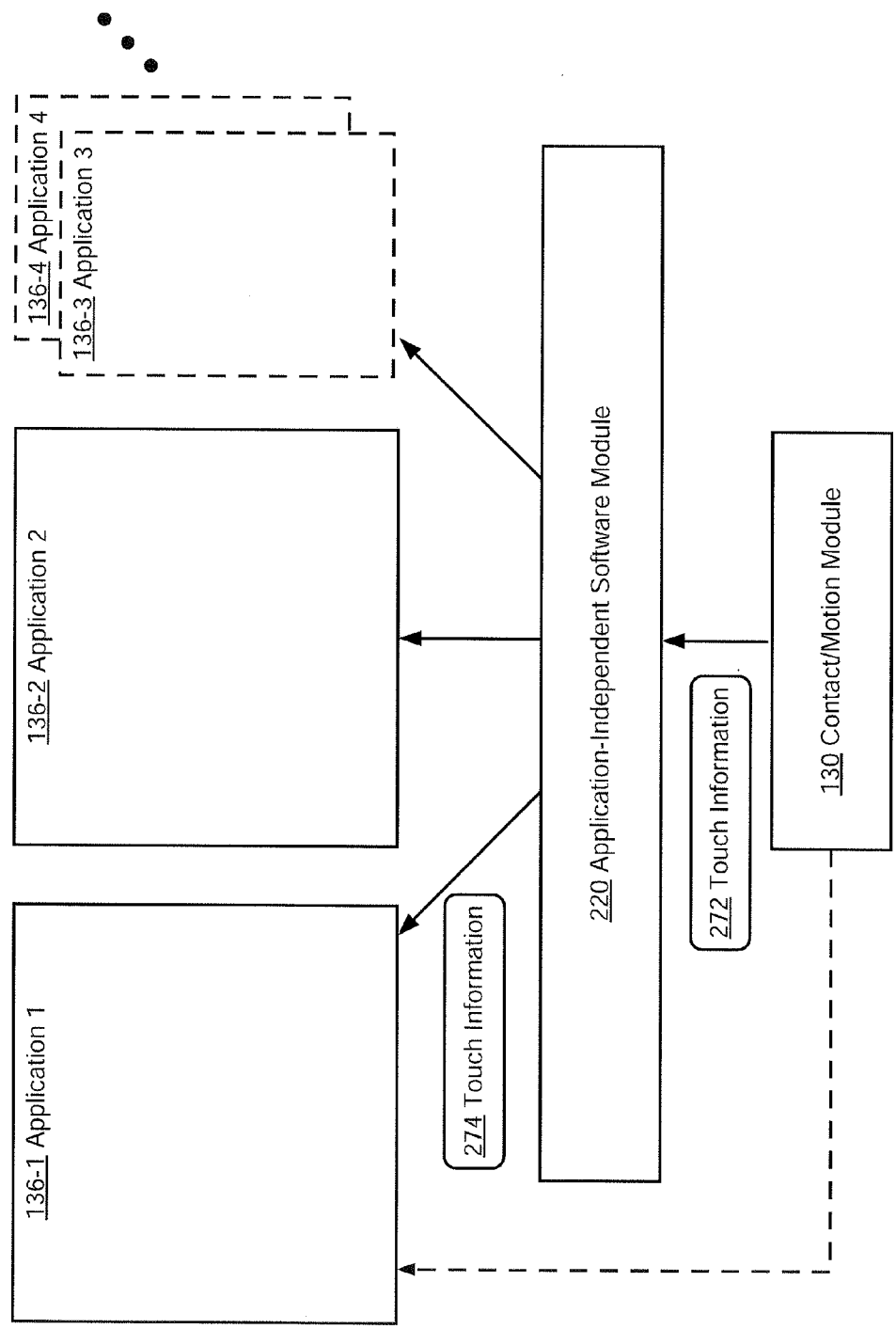

In some embodiments, software module 220 is application-independent (e.g., the same software module, or an instance of the same software module, is included in each of multiple distinct applications, such as e-mail client application, browser application, etc.). As used herein, that software module 220 is application-independent means that software module 220 is not designed specifically for a particular software application. That software module 220 is application-independent does not necessarily mean that software module 220 is located separate from its associated application. Although application-independent software module 220, in some embodiments, is distinct and separate from its associated application, as shown in FIG. 1D, application-independent software module 220 is included in its associated application in some embodiments, as shown in FIG. 1C. In some embodiments, the application also includes an application core that is specific to the application (e.g., in FIG. 1C, application 1 (136-1) includes application core 1 (230-1) and application 2 (136-2) includes application core 2 (230-2)).

It is noted that in some embodiments, contact/motion module 130 is also application-independent, in the sense that contact/motion module 130 is not designed specifically for a particular software application.

In FIG. 1C, each of application 1 (136-1, such as an e-mail client application) and application 2 (136-2, such as a browser application) includes a distinct instance (e.g., a distinct copy) of application-independent software module 220. In addition, application 1 (136-1) includes application core 1 (230-1) that is specific to application 1 (136-1) and/or application 2 (136-2) includes application core 2 (230-2) that is specific to application 2 (136-2). For example, application core 1 (230-1) includes instructions for performing operations specific to application 1 (136-1) (e.g., retrieving e-mails from one or more e-mail servers) and application core 2 (230-2) includes instructions for performing operations specific to application 2 (136-2) (e.g., bookmarking a web page).

In some embodiments, application-independent software module 220-1 processes touch information 272 from contact/motion module 130 and sends processed touch information directly to the destination (e.g., a software component, such as application core 1 (230-1)). Optionally, touch information is sent through application programming interface 222. In some embodiments, application-independent software module 220-1 posts touch information (e.g., in queue 218-1) for retrieval by application core 1 (230-1).

In some embodiments, touch information sent by application-independent software module 220-1 includes force information (e.g., raw or normalized force applied by the touch input, or whether the force applied by the touch input satisfies one or more thresholds). In some embodiments, a mouse event object includes force information. In some embodiments, a touch event object includes force information. In some embodiments, a force event object includes force information.

FIG. 1D is similar to FIG. 1C, except that application-independent software module 220 is distinct and separate from applications (e.g., application 1 (136-1), application 2 (136-2), application 3 (136-3), and application 4 (136-4)). For brevity, internal components of applications (shown in FIG. 1C, such as application cores 230, application programming interfaces 222, and/or queues 218) are omitted in FIG. 1D. However, a person having ordinary skill in the art would understand that applications in FIG. 1D can have one or more internal components of applications shown in FIG. 1C.

In FIG. 1D, application-independent software module 220 processes touch information 272 from contact/motion module 130 and sends processed touch information 274 to one or more applications (e.g., application 1 (136-1), application 2 (136-2), application 3 (136-3), and/or application 4 (136-4)). Processed touch information 274 is distinct from touch information 272, and includes contact intensity information.

In some embodiments, application-independent software module 220 is integrated with contact/motion module 130 (e.g., application-independent software module 220 is included in contact/motion module 130). In some embodiments, application-independent software module 220 is separate from contact/motion module 130.

FIGS. 1E-1J illustrate a sequence of processing touch information in accordance with some embodiments.

Figure 1E:
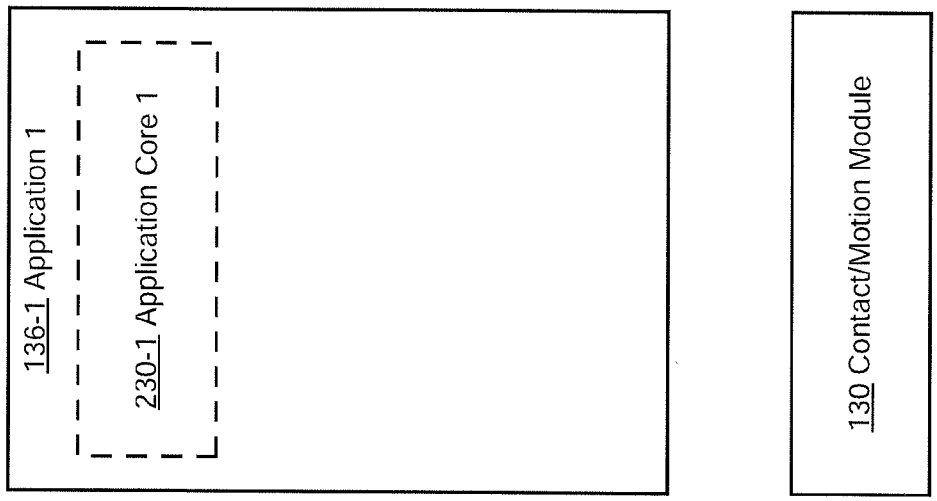

FIG. 1E illustrates that, when application 1 (136-1) is launched, application 1 (136-1) includes application core 1 (230-1) but does not include an application-independent software module. For example, although the device may store in memory 102 (FIG. 1A) instructions for the application-independent software module, in FIG. 1E, the instructions for the application-independent software module are not ready for execution (e.g., the instructions are not bound to application 1 (136-1) or loaded into an executable portion of memory 102 for execution by processor(s) 120).

Figure 1F:
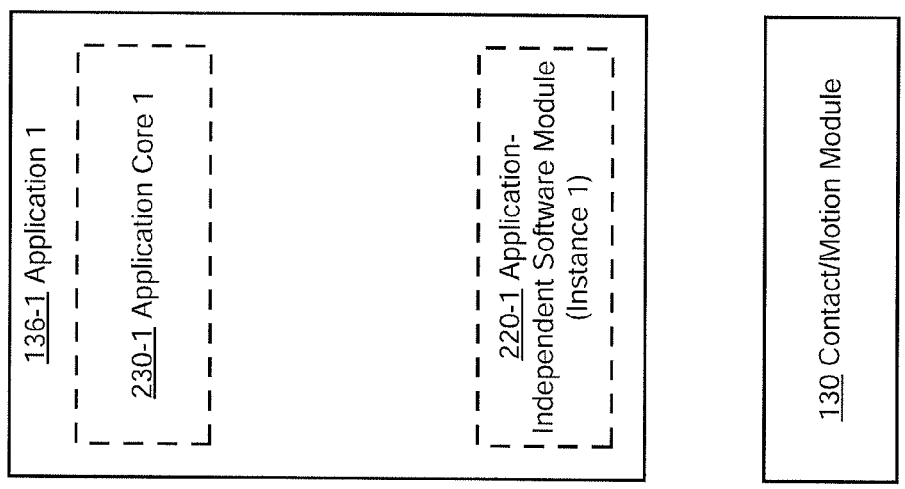

Figure IF illustrates that, application 1 (136-1) has instantiated application-independent software module 220-1. For example, application 1 (136-1) creates an instance of application-independent software module 220-1 from a predefined class of an application-independent software module. In some embodiments, the class of the application-independent software module is provided with, and/or included in, an operating system 126 (FIG. 1A). In FIG. 1F, the instance of application-independent software module 220-1 is included in application 1 (136-1). Alternatively, the instance of application-independent software module 220-1 is distinct and separate from application 1 (136-1). In some embodiments, the instance of application-independent software module 220-1 operates as a primary software component, within application 1 (136-1) for responding to touch inputs.

Figure 1G:
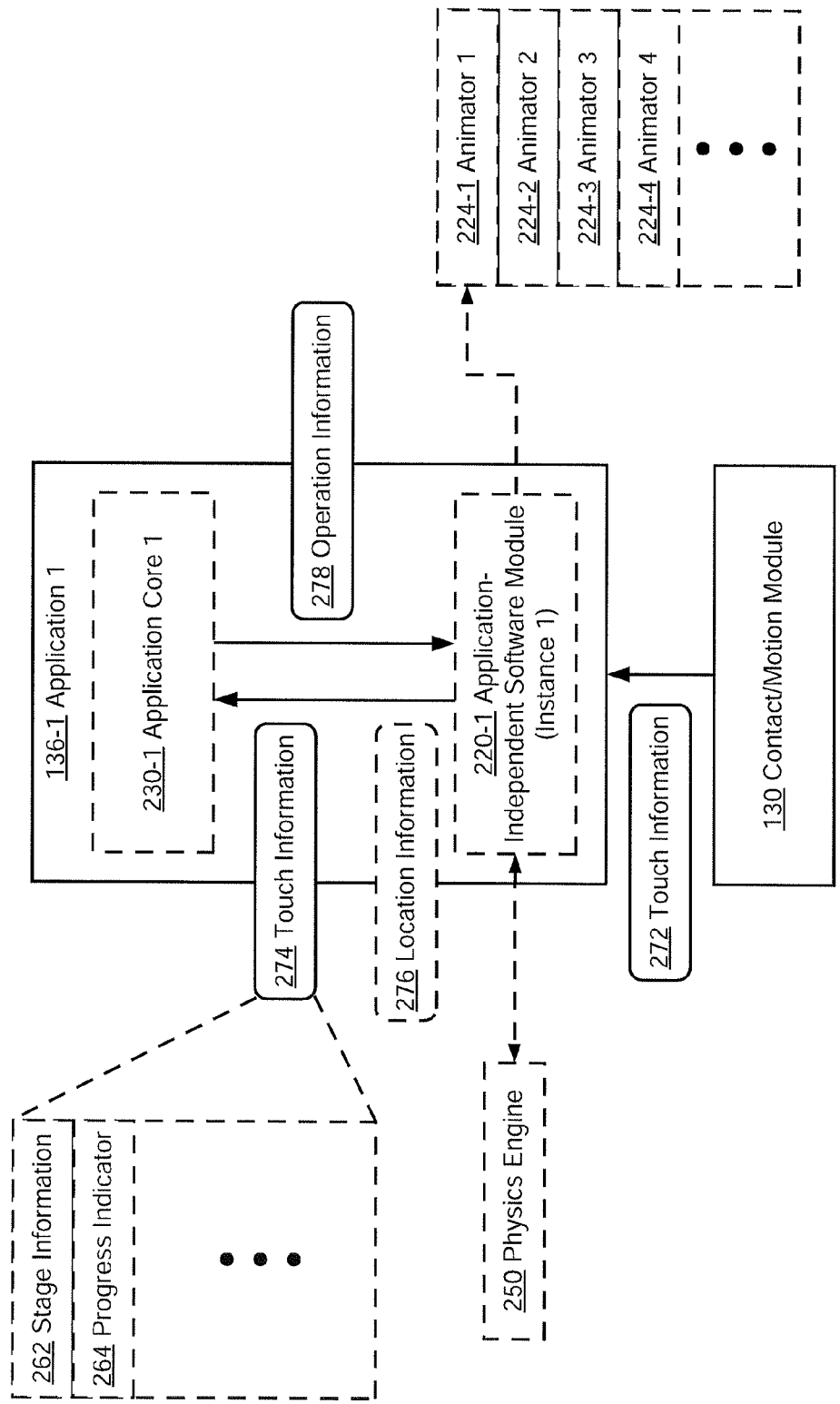

FIG. 1G illustrates that contact/motion module 130 provides touch information 272 to application 1 (136-1). In some embodiments, application-independent software module 220-1 in application 1 (136-1) obtains touch information 272 and provides processed touch information 274 to a portion of application 1 (136-1) distinct from application-independent software module 220-1 (e.g., application core 1 (230-1)). In some embodiments, touch information 274 is distinct from touch information 272. In some embodiments, touch information 274 includes information that is not included in touch information 272. In some embodiments, touch information 272 includes information that is not included in touch information 274. For example, touch information 272 includes information representing raw force applied by a touch input (e.g., the "characteristic intensity" of a touch input), and touch information 274 includes stage information 262 (e.g., information indicating whether the characteristic intensity of the touch input satisfies gesture recognition criteria such as one or more intensity thresholds) and/or progress indicator 264 (e.g., normalized intensity that corresponds to a force applied by the touch input). However, in some embodiments, touch information 274 does not include the information representing the raw force applied by the touch input (e.g., and, instead, includes information about whether the touch input has met various activation criteria and/or how close the touch input is to meeting activation criteria).

FIG. 1G also illustrates that application-independent software module 220-1 also sends to application core 1 (230-1) location information 276 (e.g., information representing a location of a contact in a touch input on a touch-sensitive surface, such as coordinates of the contact and/or information identifying a user interface element at a location corresponding to the contact). In some embodiments, application core 1 (230-1) receives location information directly from contact/motion module 130.

In FIG. 1G, application core 1 (230-1), in response to receiving touch information 274, provides operation information 278 to application-independent software module 220-1. In some embodiments, the information (e.g., touch information 274 and/or location information 276) sent to application core 1 (230-1) serves as a query to application core 1 (230-1) as to how application-independent software module 220-1 should respond to a touch input (e.g., which operations should be performed for a touch input at this location with a particular amount of intensity). Application core 1 (230-1) selects one or more operations to be performed in response to the touch input, and provides to application-independent software module 220-1 operation information 278, identifying the one or more operations.

After (or in response to) receiving operation information 278, application-independent software module 220-1 performs the one or more operations selected by application core 1 (230-1), such as updating a user interface (e.g., blurring one or more portions of the user interface, enlarging or shrinking one or more user interface elements, changing colors of one or more user interface elements, etc.).

In some embodiments, application-independent software module 220-1 performs the one or more operations with instructions included in application-independent software module 220-1.

In some embodiments, application-independent software module 220-1 performs at least one of the one or more operations with a preconfigured set of instructions that is located separately from application-independent software module 220-1 (e.g., the preconfigured set of instructions is not included in application-independent software module 220-1). For example, preconfigured sets of instructions (e.g., instructions that are provided in an operating system, independent of application 1 (136-1)) include multiple animators (e.g., animator 1 (224-1), animator 2 (224-2), animator 3 (224-3), and animator 4 (224-4)). In some embodiments, application-independent software module 220-1 performs at least one of the one or more operations with an animator (e.g., animator 1 (224-1)) based on operation information 278. For example, application-independent software module 220-1 performs a "hint" operation to visually indicate that an increase in intensity of a touch input toward an intensity threshold (at which a predefined operation, such as presenting a preview window, is to be performed).

In some embodiments, application-independent software module 220-1 includes physics engine 250. In some embodiments, application-independent software module 220-1 has access to physics engine 250 that is located separate from application-independent software module 220-1. In some embodiments, physics engine 250 is configured to simulate physical systems (e.g., a mass-and-spring system). For example, physics engine 250 is configured to simulate a movement of a mass that is coupled with one or more springs (and optionally one or more dampers) in response to a simulated external force applied to the mass. In some embodiments, application-independent software module 220-1 obtains a simulated physical parameter from physics engine 250 and performs at least one of the one or more operations based on the simulated physical parameter (e.g., using an animator, such as animator 1 (224-1)) and operation information 278. In some embodiments, operation information 278 includes a request (or an indication) to use a simulated physical parameter from physics engine 250 in performing the one or more operations.

Figure 1H:
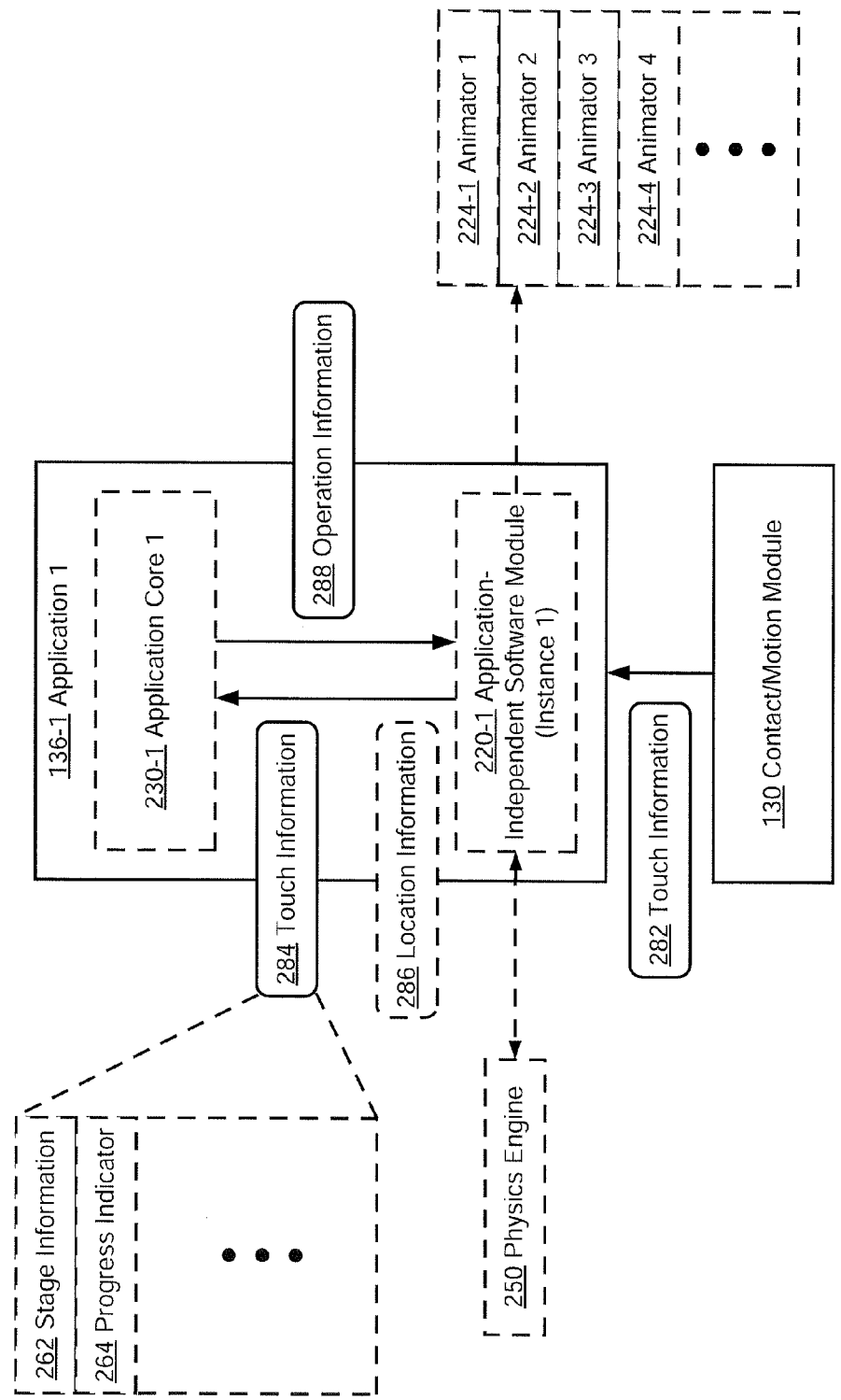

FIG. 1H illustrates that additional touch information 282 is sent to application 1 (136-1) after touch information 272 shown in FIG. 1G. FIG. 1H is similar to FIG. 1G, except that, in response to touch information 282, application-independent software module 220-1 provides touch information 284 (based on touch information 282) to application core 1 (230-1) and/or location information 286 (which indicates that a contact has moved or maintained its position on the touch-sensitive surface); and application core 1 (230-1) provides operation information 288. In some embodiments, operation information 288 identifies one or more operations that include displaying a preview window (which is also called herein a "peek" operation).

Figure 1I:
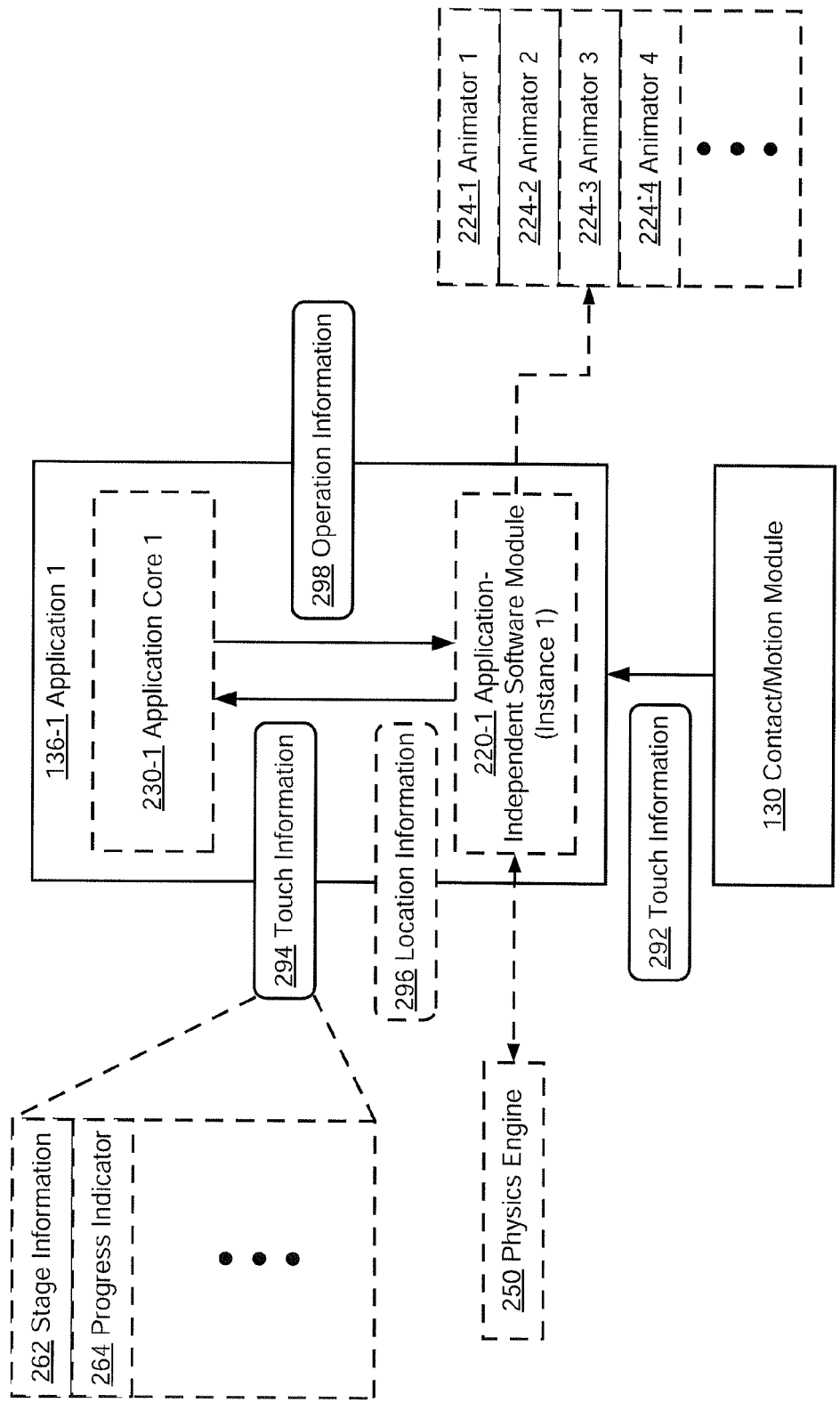

FIG. 1I illustrates that subsequent touch information 292 is sent to application 1 (136-1) after touch information 282 shown in FIG. 1H. FIG. 1I is similar to FIG. 1H, except that, in response to touch information 292, application-independent software module 220-1 provides touch information 294 (based on touch information 292) to application core 1 (230-1) and/or location information 296 (which indicates that a contact has moved or maintained its position on the touch-sensitive surface); and application core 1 (230-1) provides operation information 298. In some embodiments, operation information 298 identifies one or more operations that include replacing a user interface with a user interface in the preview window (which is also called herein a "pop" operation).

Figure 1J:
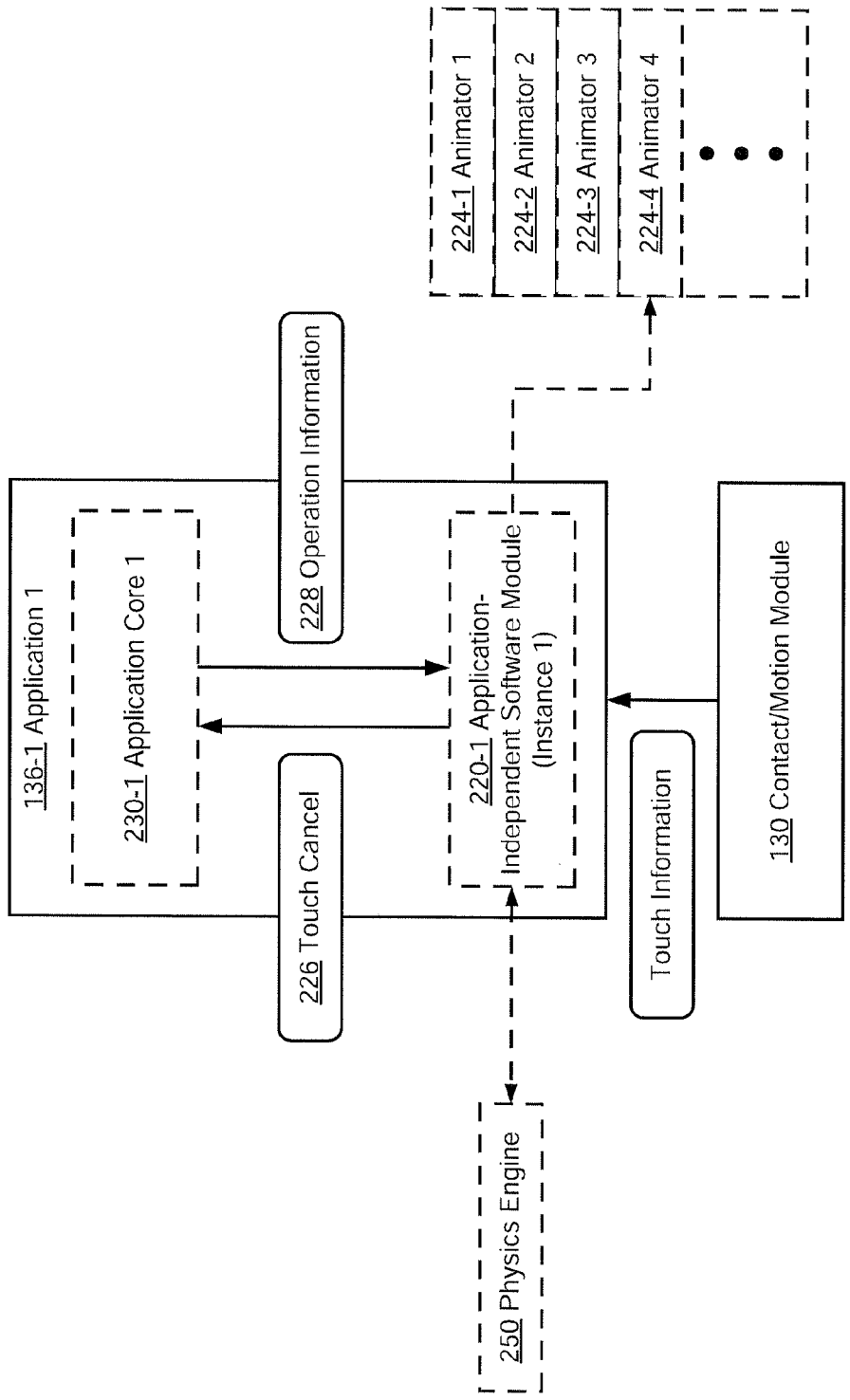
Figure 1K:
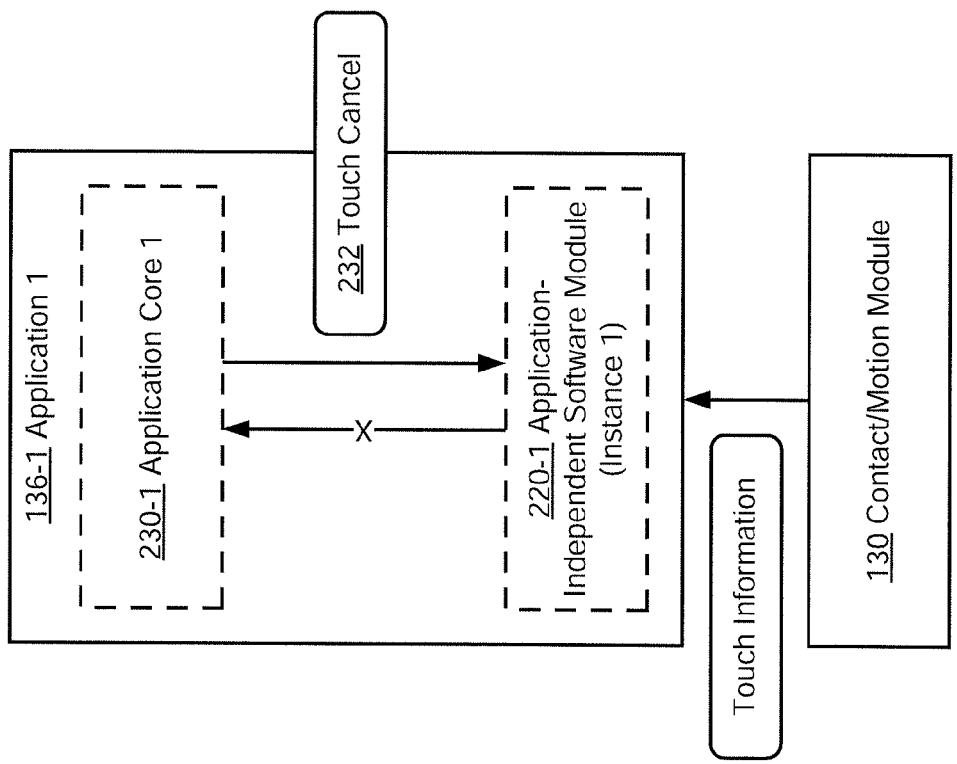

FIGS. 1J-1K illustrate touch cancel operations in accordance with some embodiments.

FIG. 1J illustrates embodiments in which information indicating touch cancelation (touch cancel 226) is provided from application-independent software module 220-1 to application core 1 (230-1). In FIG. 1J, application-independent software module 220-1 receives touch information that corresponds to a touch input. In some embodiments, application-independent software module 220-1 determines that the touch input has been canceled, and provides to application core 1 (230-1) touch cancel 226. In some embodiments, touch information received by application-independent software module 220-1 indicates that the touch input has been canceled, and application-independent software module 220-1 provides touch cancel 226 to application core 1 (230-1). In response to touch cancel 226, application core 1 (230-1) provides operation information 228. Operation information 228 identifies one or more operations to be performed in response to cancelation of a touch input (e.g., a "cancel" operation, such as undoing operations performed while the touch input was detected). Application-independent software module 220-1 performs the one or more operations based on operation information 228.

FIG. 1K illustrates embodiments in which information indicating touch cancelation (touch cancel 232) is provided from application core 1 (230-1) to application-independent software module 220-1. Prior to receiving touch cancel 232, application-independent software module 220-1 monitors touch information from contact/motion module 130 (and processes the touch information for providing processed touch information (e.g., touch information 274 in FIG. 1G). In some embodiments, subsequent to receiving touch cancel 232, application-independent software module 220-1 ceases to monitor touch information from contact/motion module 130 (e.g., application-independent software module 220-1 ignores the touch information from contact/motion module 130). In some embodiments, subsequent to receiving touch cancel 232, application-independent software module 220-1 ceases to provide touch information to application core 1 (230-1).

Figure 1L:
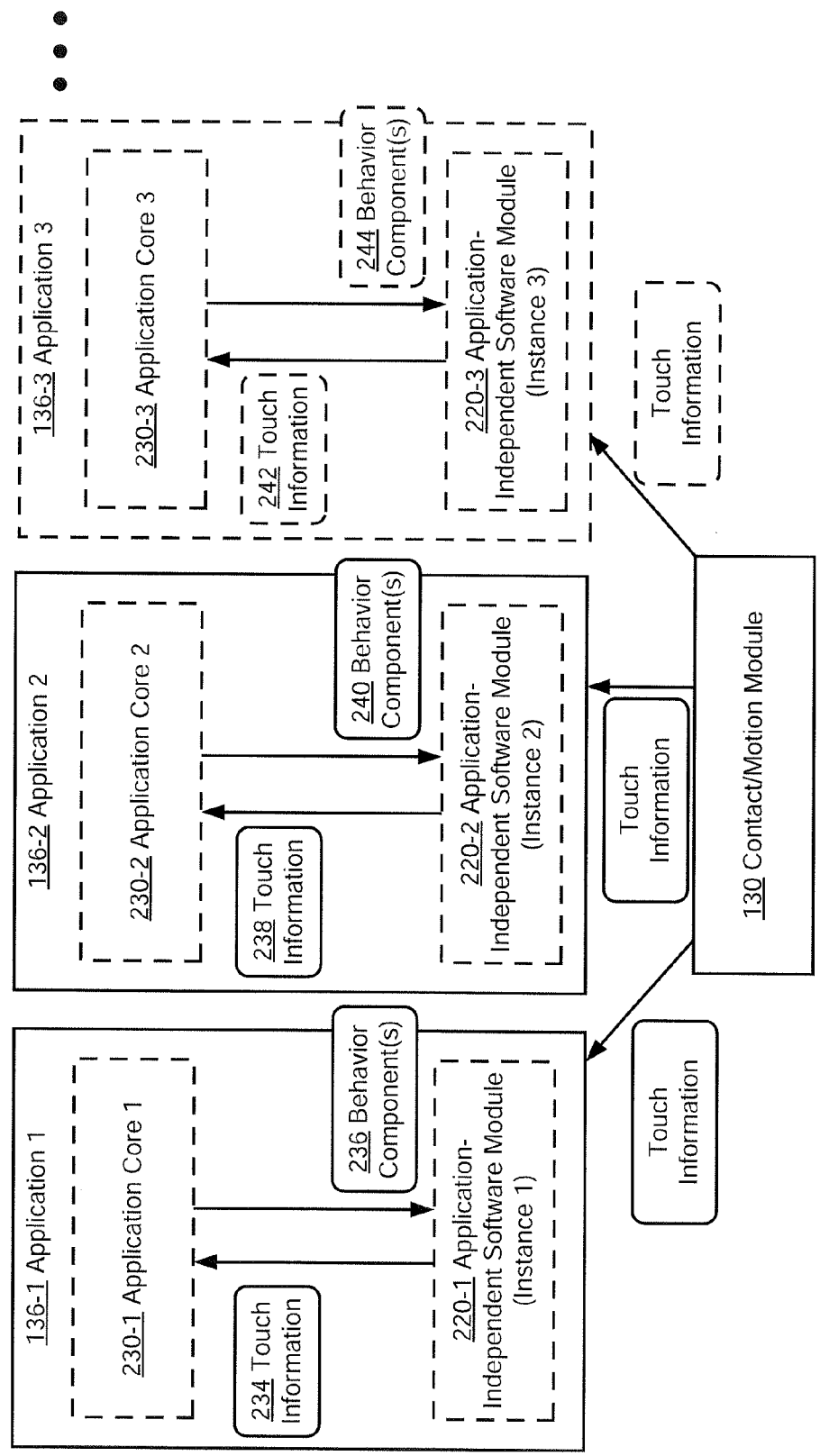

FIG. 1L illustrates a subscription method for the application-independent software module. In FIG. 1L, the application-independent software module (or their instances, such as 220-1, 220-2, and 220-3) is used by a plurality of software applications (e.g., application 1 (136-1), application 2 (136-2), and application 3 (136-3)). The plurality of software applications use predefined features of the application-independent software module. Thus, the application independent module facilitates a consistent way of processing touch inputs for the plurality of software applications, in particular when handling intensity-dependent gestures.

However, in some cases, not all of the features of the application-independent software module are required for each of the plurality of software applications. For example, in some embodiments, a first software application of the plurality of software applications uses a first subset of the features of the application-independent software module, and a second software application of the plurality of software applications uses a second subset of the features of the application-independent software module that is distinct from the first subset of the features of the application-independent software module.

In some embodiments, one or more software applications of the plurality of software applications subscribe to only a subset, less than all, of the features of the application-independent software module. This eliminates the need for providing all of the features of the application-independent software module to all of the plurality of software applications, thereby reducing the use of computing resources and electric energy. In addition, this allows respective software applications to select how touch inputs will be processed, while using the respective software applications, using the application-independent software module. This customization facilitates providing user interfaces that are tailored for specific needs of the respective software applications, without losing the consistency offered by the application-independent software module.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
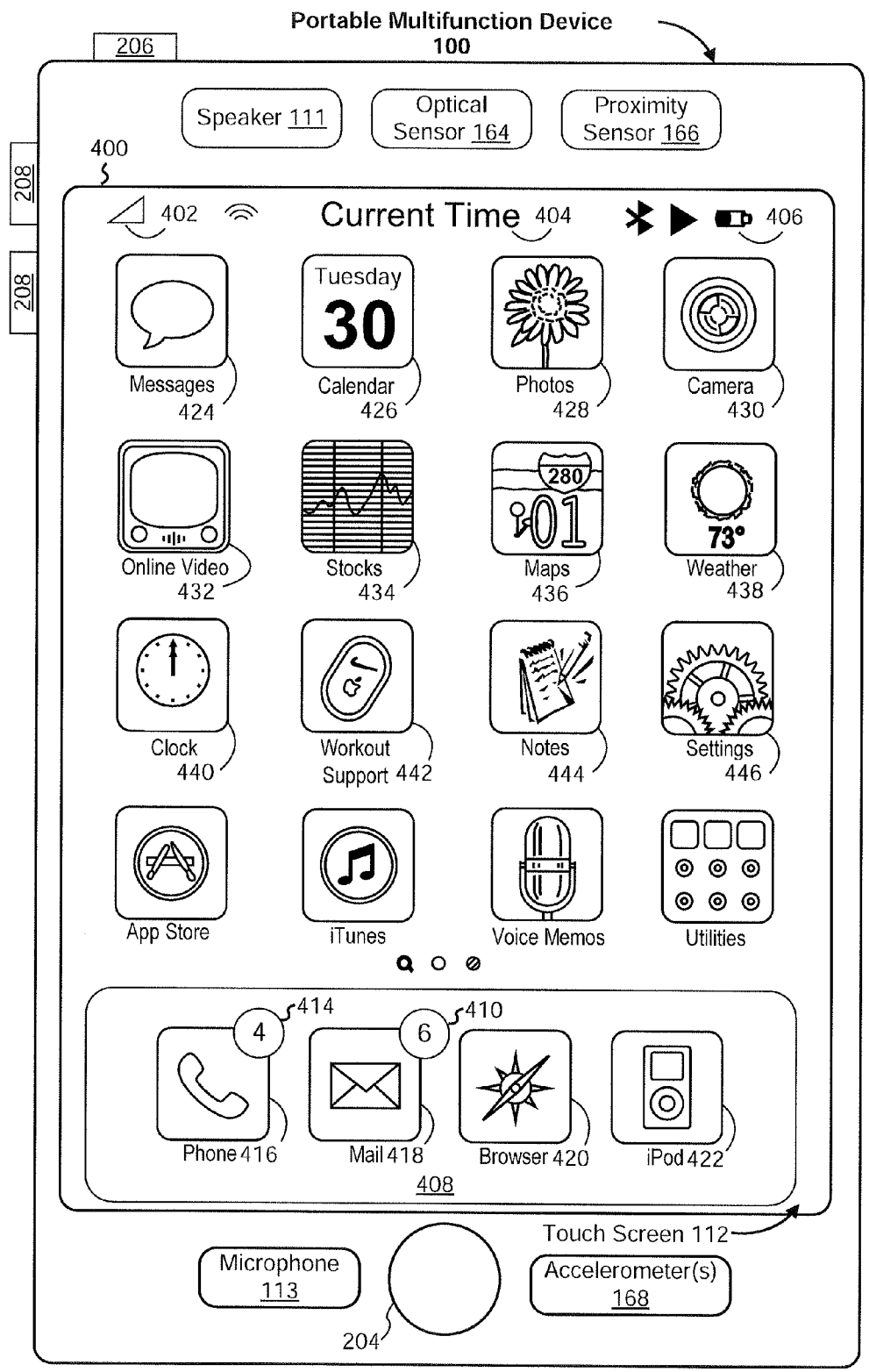
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:
  Signal strength indicator(s) 402 for wireless communication(s), such as cellular and Wi-Fi signals;
  Time 404;
  a Bluetooth indicator;
  Battery status indicator 406;
  Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, also referred to as iPod (trademark of Apple Inc.) module 152, labeled "iPod;" and
  Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"
    Icon 440 for alarm clock widget 149-4, labeled "Clock;"
    Icon 442 for workout support module 142, labeled "Workout Support;"
    Icon 444 for notes module 153, labeled "Notes;" and
    Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
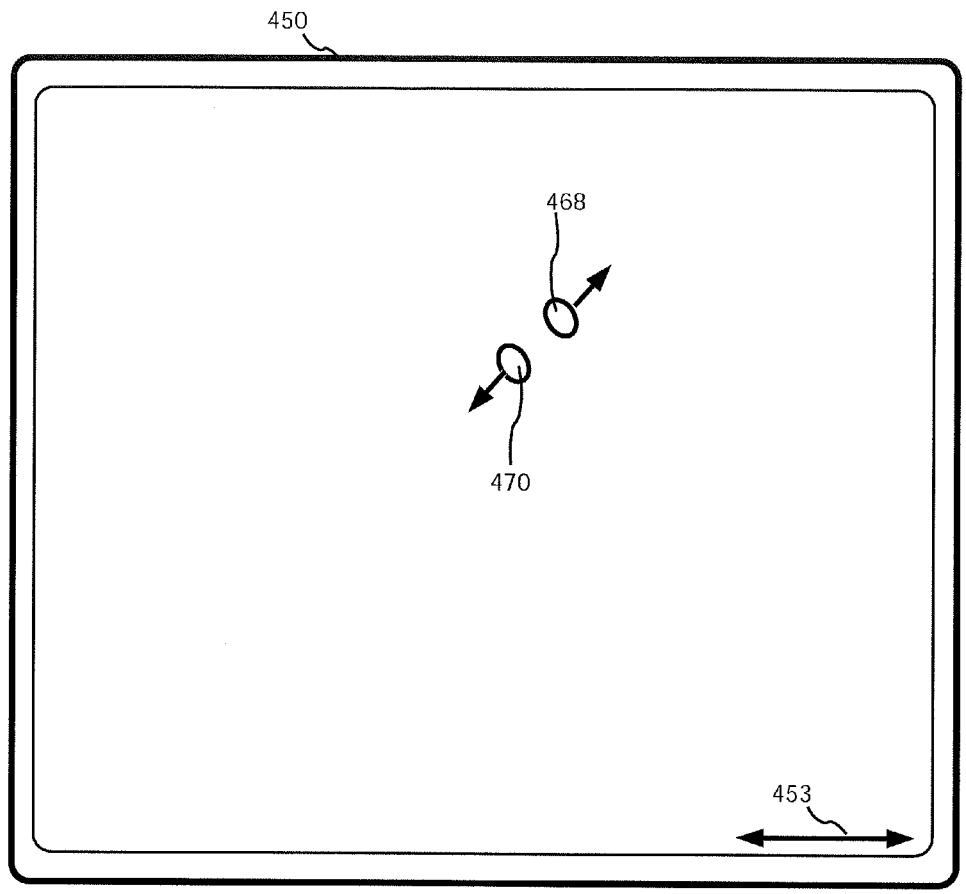
FIG. 4B illustrates an exemplary user interface for a multifunction device with a touch-sensitive surface that is separate from the display in accordance with some embodiments.
Figure 4B:
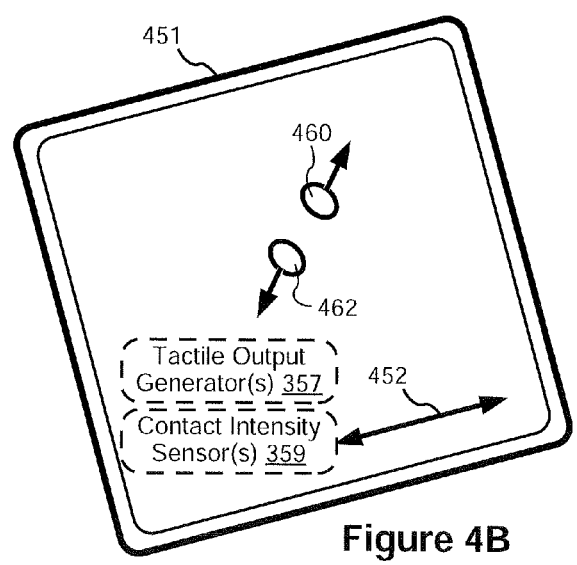
Figure 4C:
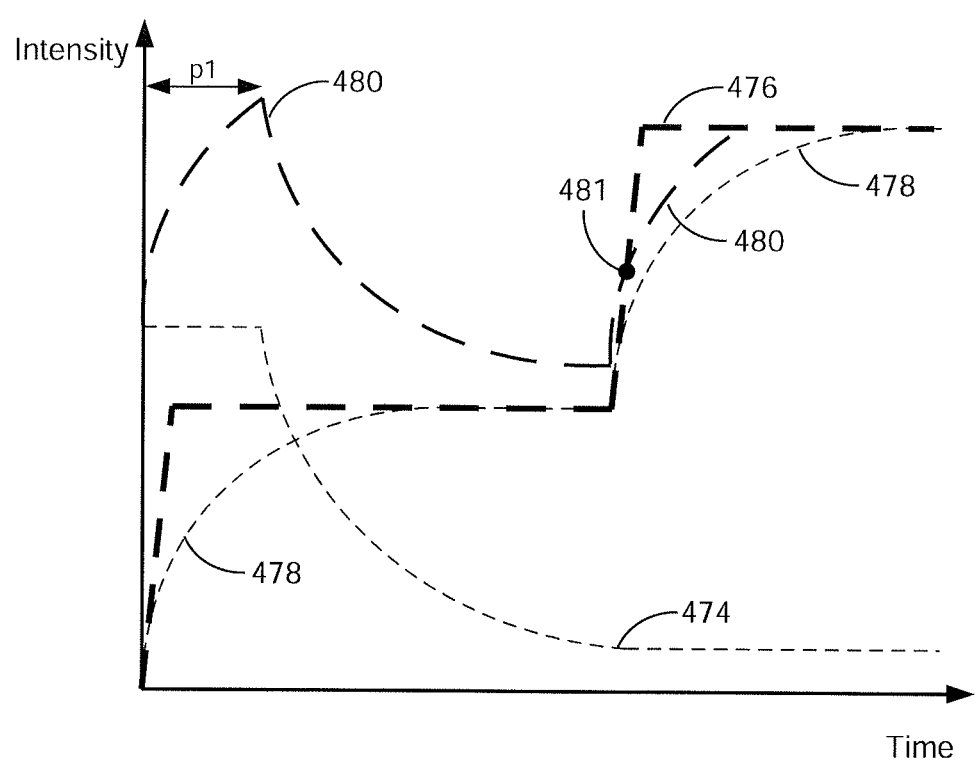
FIGS. 4C-4E illustrate exemplary dynamic intensity thresholds in accordance with some embodiments.
Figure 4D:
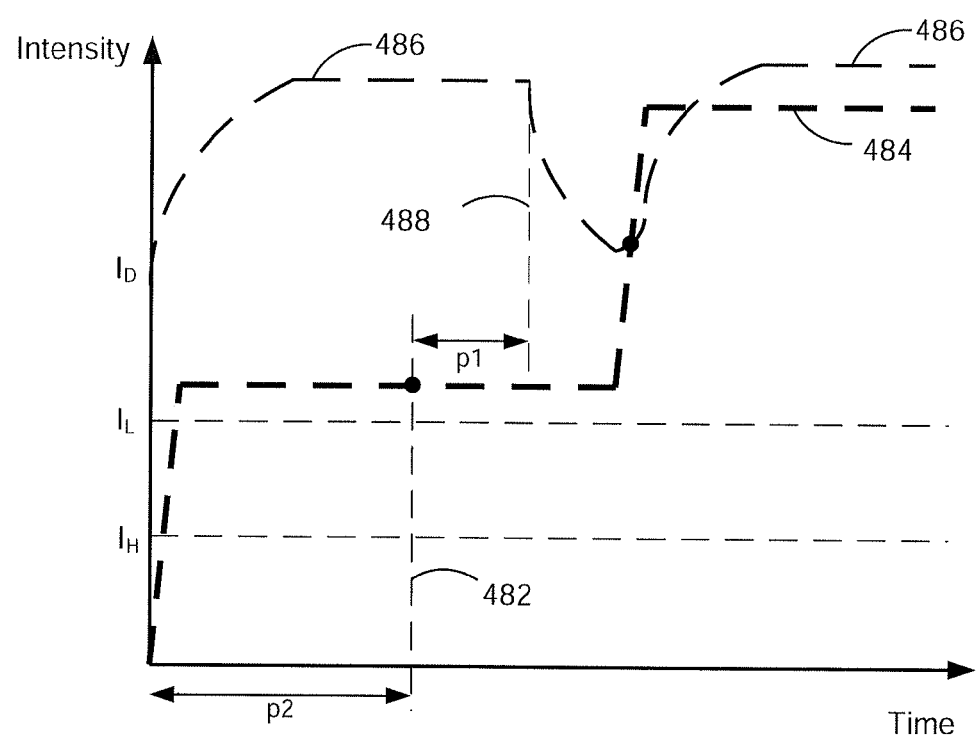
Figure 4E:
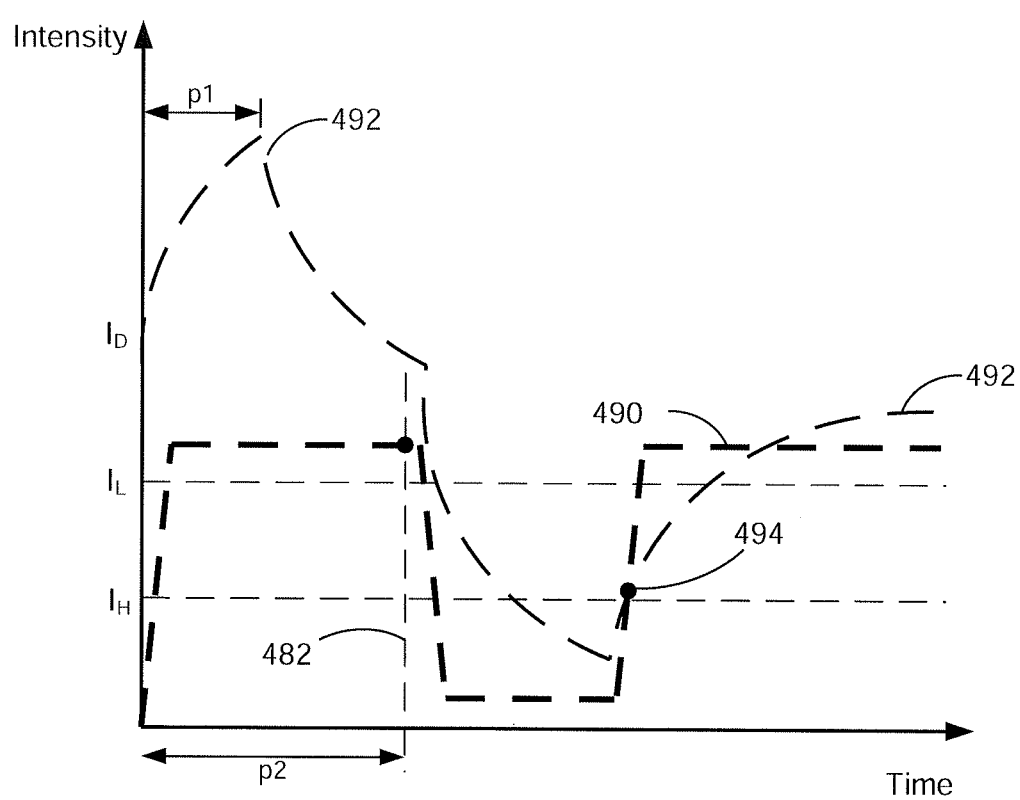

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 5A-5DD) described herein optionally include various intensity diagrams (also called herein intensity graphs) that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensities of contacts with the touch-sensitive surface.

FIGS. 5A-5DD illustrate exemplary user interfaces for processing inputs in accordance with some embodiments. The user interfaces in these figures are used to illustrate the processes described below, including the processes in FIGS. 6A-6D, 7A-7C, and 8A-8C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5DD include intensity graph 506 that shows an intensity of the contact as a function of time. In particular, in FIGS. 5A-5DD, intensity graph 506 shows the current intensity of a contact on the touch-sensitive surface relative to one or more intensity thresholds (e.g., intensity thresholds $IT_H$, $IT_L$, and $IT_D$). Although these intensity thresholds are illustrated as constant intensity thresholds in FIGS. 5A-5DD (e.g., the intensity thresholds do not change over time), in some embodiments, one or more intensity thresholds are dynamic intensity thresholds (e.g., the intensity thresholds change over time), as shown in FIGS. 4C-4E.

Figure 5A:
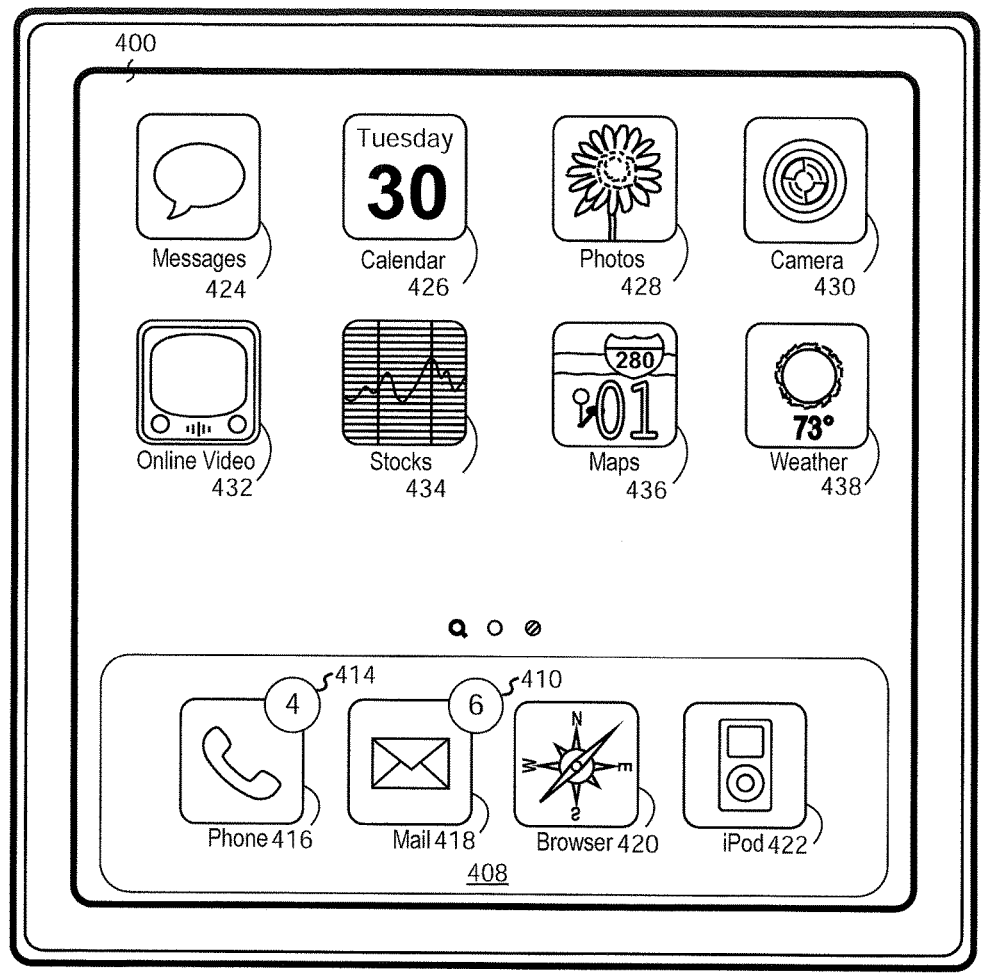
FIGS. 5A-5DD illustrate exemplary user interfaces for processing inputs in accordance with some embodiments.
Figure 5A:
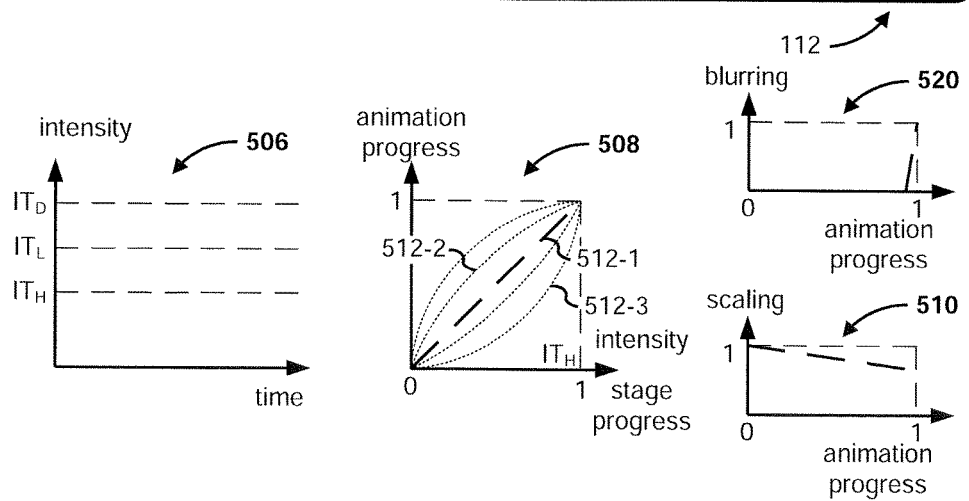

FIG. 5A illustrates user interface 400 that is similar to user interface 400 shown in FIG. 4A (e.g., user interface 400 in FIG. 5A includes a subset of user interface elements illustrated in FIG. 4A). FIG. 5A also illustrates intensity graph 506 (described above) and graphs 508, 510, and 520. Graphs 508, 510, and 520 show a state of changes to a user interface (or particular parameters for updating the user interface) in an animation (e.g., an animation showing a transition from a first user interface to a second user interface).

In FIG. 5A, graph 508 shows animation curves (e.g., 512-1, 512-2, 512-3, etc.) that each define how the animation progresses in response to changes to an intensity of a contact. In FIG. 5A, the animation curves map stage progress values (e.g., normalized intensity values) to animation progress values (representing how the animation progresses from the first user interface to the second user interface). In FIGS. 5A-5DD, an animation progress value of 0 corresponds to a state when the first user interface is displayed, and an animation progress value of 1 corresponds to a state when the second user interface is displayed. While the displayed user interface transitions between the first user interface and the second user interface, the animation progress value is between 0 and 1. Animation curve 512-1 represents a linear transition from the first user interface to the second user interface based on the increased intensity of the contact. Animation curve 512-2 represents a transition from the first user interface to the second user interface, where the animation progresses rapidly in response to an initial increase in the intensity of the contact and the animation progresses slowly in response to the intensity of the contact approaching an intensity threshold (e.g., $IT_H$). Animation curve 512-3 represents a transition from the first user interface to the second user interface, where the animation progresses slowly in response to an initial increase in the intensity of the contact and the animation progresses rapidly in response to the intensity of the contact approaching an intensity threshold (e.g., $IT_H$). In some embodiments, other animation curves that are not shown in FIG. 5A are used.

In FIG. 5A, graphs 510 and 520 show changes to parameters used in updating the user interface. For example, graph 520 shows changes to a blurring parameter (e.g., a blur radius, representing a magnitude of a blurring effect on one or more portions of the user interface) as a function of the animation progress value, and graph 510 shows changes to a scaling parameter (representing an increase or decrease in a size of one or more user interface objects) as a function of the animation progress value. In FIG. 5A, graph 510 represents that one or more user interface objects are scaled down with the increase in the animation progress value. In FIG. 5A, graph 520 represents that when the animation progress value is 1, a blurring effect is applied to one or more portions of the user interface. Although FIG. 5A shows changes to two parameters (scaling and blurring) with graphs 510 and 520, in some embodiments, additional parameters (e.g., color, scaling of a background, a blur radius, etc.) also change as functions of the animation progress value, which can be represented graphically. For brevity, such additional graphs are omitted herein.

Although graphs 510 and 520 are represented as functions of the animation progress value, in some embodiments, graphs 510 and 520 are represented as functions of the stage progress value (or raw intensity of a user input). In such embodiments, animation curves define how various visual parameters used in the animation progress in response to changes to an intensity of a contact.

As explained above with respect to FIGS. 1G-1H, an application-independent software module (e.g., application-independent software module 220-1 in FIG. 1G) receives touch information (e.g., touch information 272, in FIG. 1G, including information representing the "characteristic intensity" of a touch input) from contact/motion module 130, and determines a stage progress value that corresponds to the characteristic intensity of the touch input. The application-independent software module, in turn, determines an animation progress value (e.g., using an animation curve, such as animation curve 512-1). In some embodiments, an application core (e.g., application core 1 (230-1) defines (or provides) user interface update parameters (e.g., parameters used in updating the user interface, such as a blur radius, a scaling factor of a user interface object, a scaling factor of a background, etc.) for an initial state of the animation (e.g., when the animation progress value is 0) and an end state of the animation (e.g., when the animation progress value is 1). In some embodiments, the user interface update parameters for the initial state of the animation and the end state of the animation are defined by the application core before the animation progress value is determined (or even before the touch information is received at the application-independent software module). After the user interface update parameters for the initial state of the animation and the end state of the animation are defined, the application-independent software module determines the user interface update parameters based on the animation progress value, independent of the application core (e.g., without further input from the application core). For example, the application-independent software module interpolates a user interface update parameter (e.g., a blur radius) for the initial state of the animation and the end state of the animation based on the animation progress value to obtain the user interface update parameter to be used in rendering the currently displayed user interface (e.g., when the animation progress value is 0.5, the application-independent software module uses an average of the blur radius to be used when the animation progress value is 0 and the blur radius to be used when the animation progress value is 1).

FIGS. 5B-5F illustrate a transition of user interface 400 including an array of user interface objects in response to an increase in intensity of a contact in accordance with some embodiments.

Figure 5B:
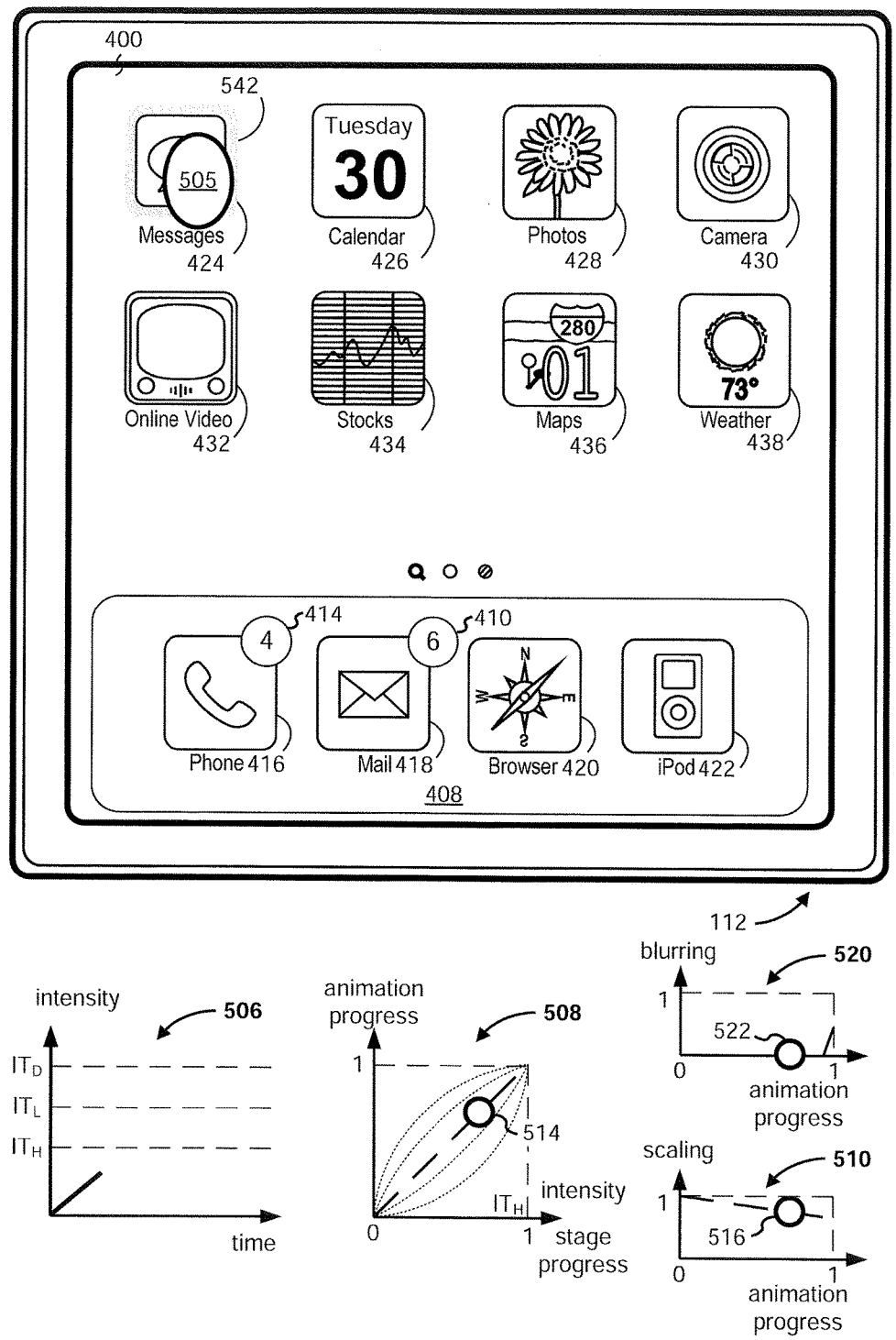

FIG. 5B shows that user input 505 is detected at a location on a touch-sensitive surface (e.g., touch-sensitive surface 451 or a touch-sensitive surface of a touch-screen display) that corresponds to user interface object 424. In response to detecting the intensity of user input 505 (as shown in intensity graph 506 of FIG. 5B), an animation progress value is determined using the normalized intensity of user input 505 (e.g., the stage progress representing the normalized intensity of user input 505 below the intensity threshold $IT_H$) and the animation curve shown in graph 508 (as represented by indicator 514), and, in turn, a blurring value (e.g., a blur radius) and a scaling value are determined from graphs 520 and 510 (as represented by indicators 522 and 516). In FIG. 5B, graph 520 indicates that there is no blurring (represented by the blurring value of 0 for indicator 522) and graph 510 indicates that the scaling factor is decreased (represented by the scaling factor, lower than the initial scaling factor of 1, for indicator 516).

FIG. 5B also shows that user interface 400 is updated based on changes to the scaling factor. In FIG. 5B, the size of user interface object 424 is reduced (as compared to the size of user interface object 424 shown in FIG. 5A) based on the decrease in the scaling factor. FIG. 5B also shows that an additional user interface object (e.g., a shadow) is shown around user interface object 424, based on another visual update parameter (e.g., a shadow size).

Figure 5C:
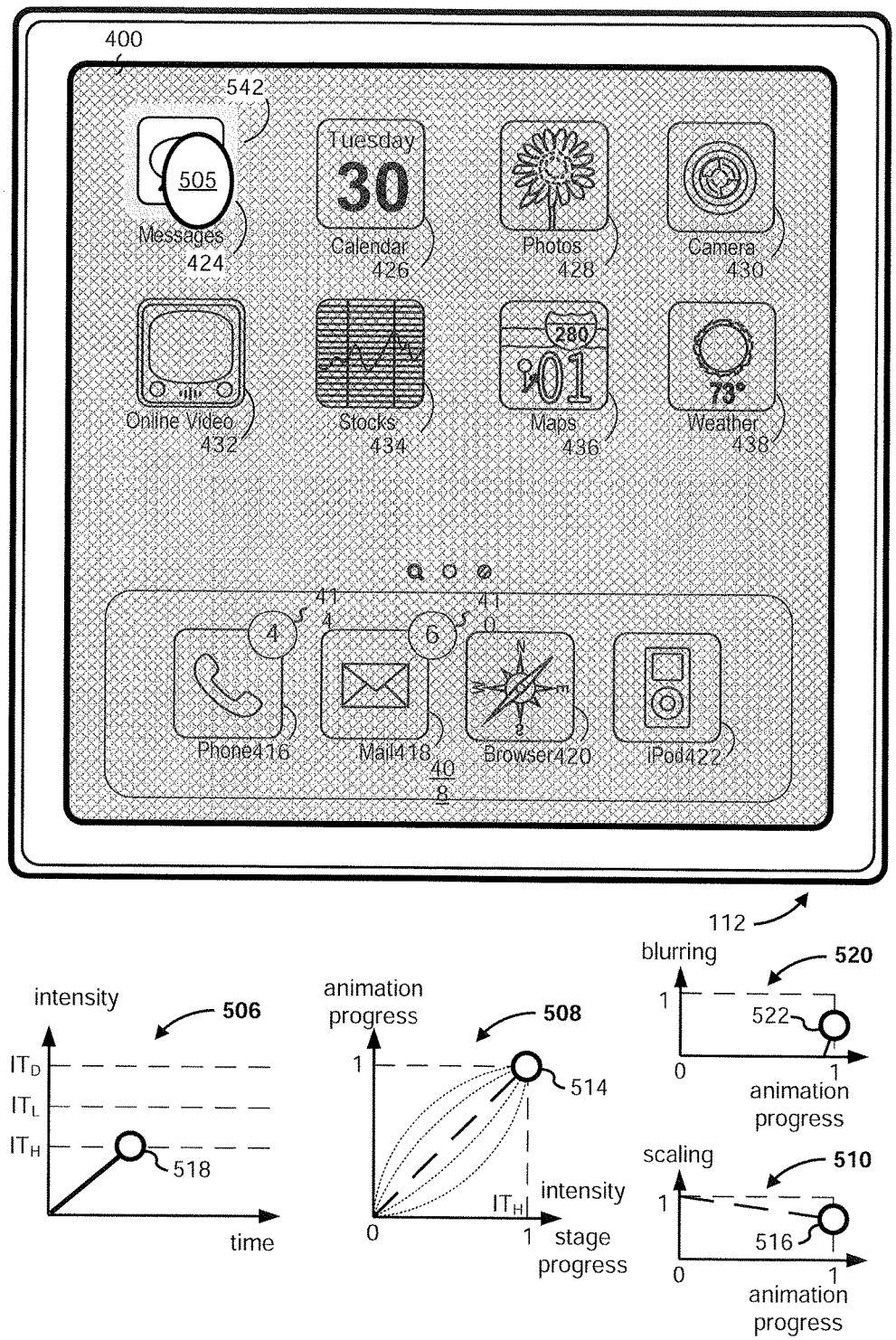

FIG. 5C shows, in intensity graph 506, that the intensity of user input 505 has increased further to satisfy the intensity threshold $IT_H$. Graph 508 in FIG. 5C represents that the animation progress value has increased to 1. Graph 510 in FIG. 5C represents that the scaling factor has further decreased from the scaling factor shown in FIG. 5B, and graph 520 in FIG. 5C represents that the blurring value has increased, causing one or more portions of user interface 400 to be blurred. FIG. 5C also shows that user interface 400 is updated based on changes to these parameters (the blurring value and the scaling factor). For example, the size of user interface object 424 has decreased further (as compared to the size of user interface object 424 shown in FIG. 5B) based on the further decrease in the scaling factor, and user interface 400, other than user interface object 424, is blurred. In addition, the background (e.g., other icons shown in the background) is scaled down so that icons in the background are displayed smaller.

Figure 5D:
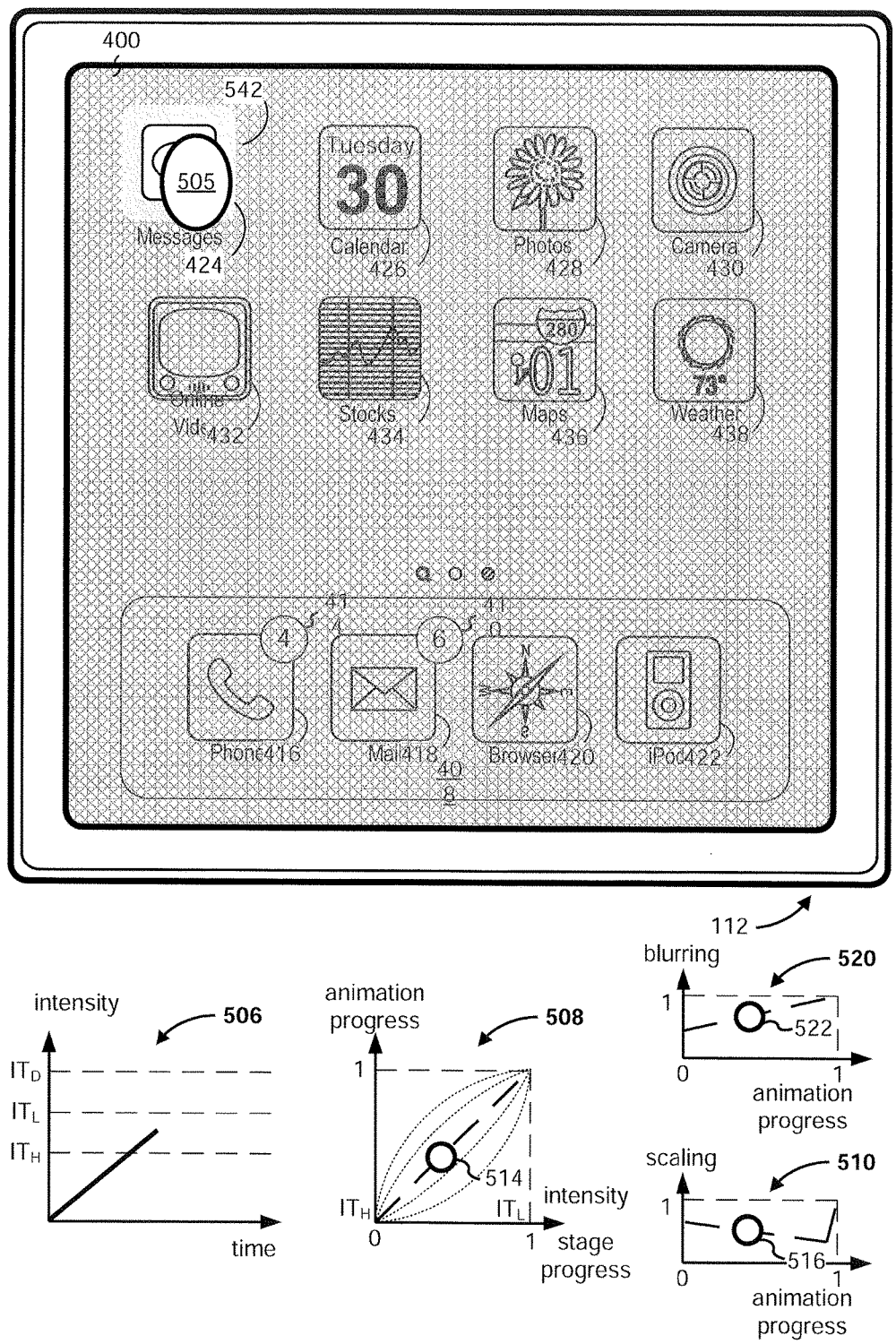
Figure 5E:
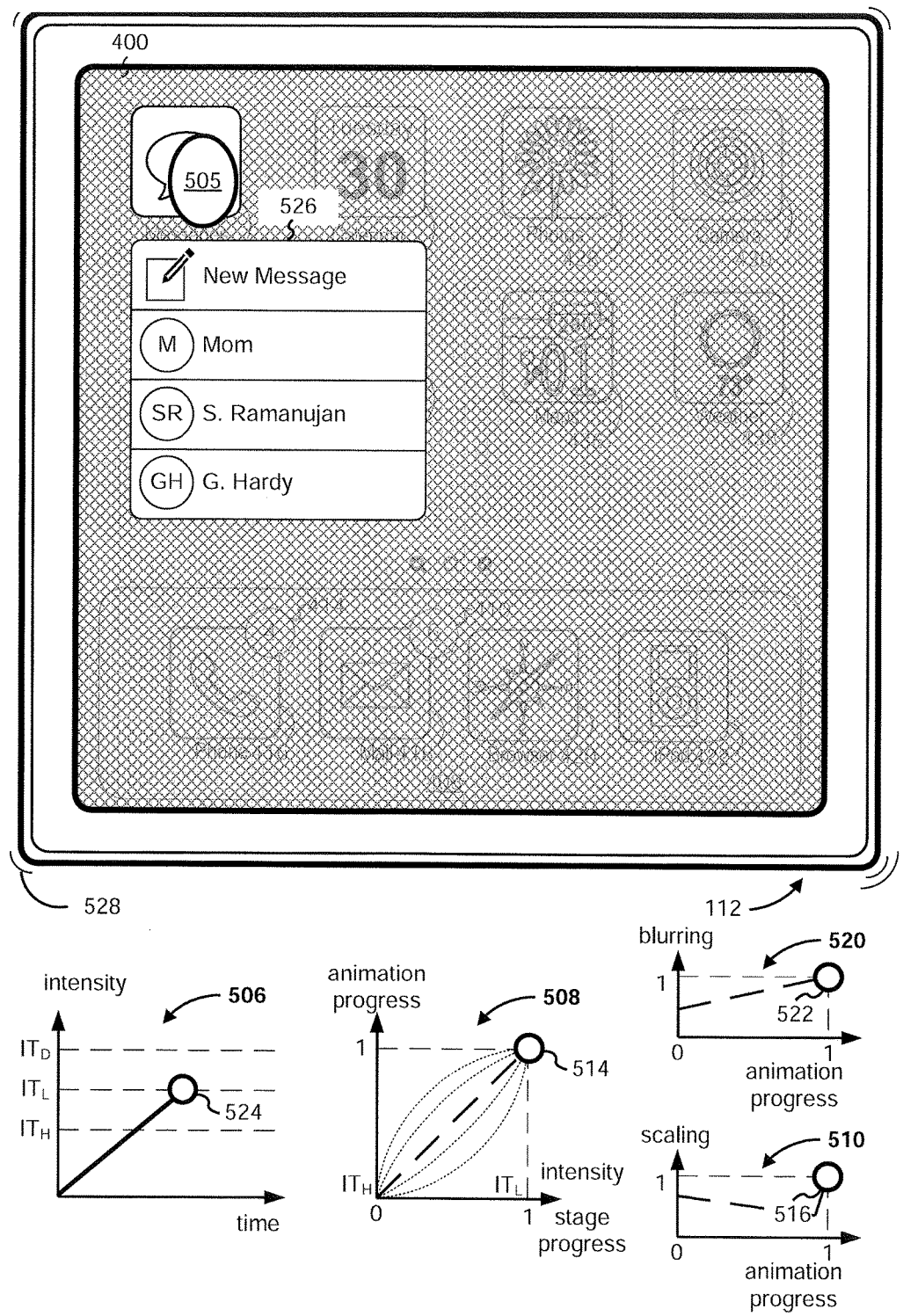
FIGS. 5EE-5GG illustrate simulated physics models in accordance with some embodiments.

FIG. 5D shows, in intensity graph 506, that the intensity of user input 505 has increased above the intensity threshold $IT_H$. Graph 508 in FIG. 5D shows the animation progress value determined based on the stage progress (e.g., the normalized intensity of the touch input between the intensity threshold $IT_H$ and the intensity threshold $IT_L$). Graph 510 in FIG. 5D represents that the scaling factor decreases with an increase in the animation progress value, and graph 520 in FIG. 5D represents that the blurring value increases with an increase in the animation progress value. FIG. 5D also shows that user interface 400 is updated based on changes to these parameters. The size of user interface object 424 is further reduced (as compared to the size of user interface object 424 shown in FIG. 5C) based on the further decrease in the scaling factor, and the magnitude of the blurring effect applied to user interface 400, other than user interface object 424, has increased (e.g., the blur radius has increased). The background (and/or icons in the background) is scaled down further.

FIG. 5E shows, in intensity graph 506, that the intensity of user input 505 satisfies the intensity threshold $IT_L$ (represented by indicator 524 in intensity graph 506). Graph 508 in FIG. 5E represents that the animation progress value has increased to 1. Graph 510 in FIG. 5E represents that the scaling factor has increased back to the initial scaling factor of 1, and graph 520 in FIG. 5E represents that the blurring value has increased. FIG. 5E also shows that user interface 400 is updated based on changes to these parameters (the blurring value and the scaling factor). User interface object 424 has returned to its initial size (as shown in FIG. 5A) based on the scaling factor, and user interface 400, other than user interface object 424, is blurred more (e.g., a larger blur radius is applied). The additional user interface object (e.g., a shadow) ceases to be displayed. The background (e.g., other icons shown in the background) has returned to its original scale. In addition, user interface 400 includes user interface element 526 (e.g., user interface element 526 with one or more menu options is laid over the previously displayed user interface). In some embodiments, user interface element 526 is called a quick action menu.

FIG. 5E also shows that tactile output 528 is generated in response to the intensity of user input 505 satisfying the intensity threshold $IT_L$.

In some embodiments, further increase in intensity of user input 505 does not cause further changes to user interface 400. For example, user interface 400 shown in FIG. 5E is maintained on display even if the intensity of user input 505 increases above the intensity threshold $IT_L$ (not shown).

Figure 5F:
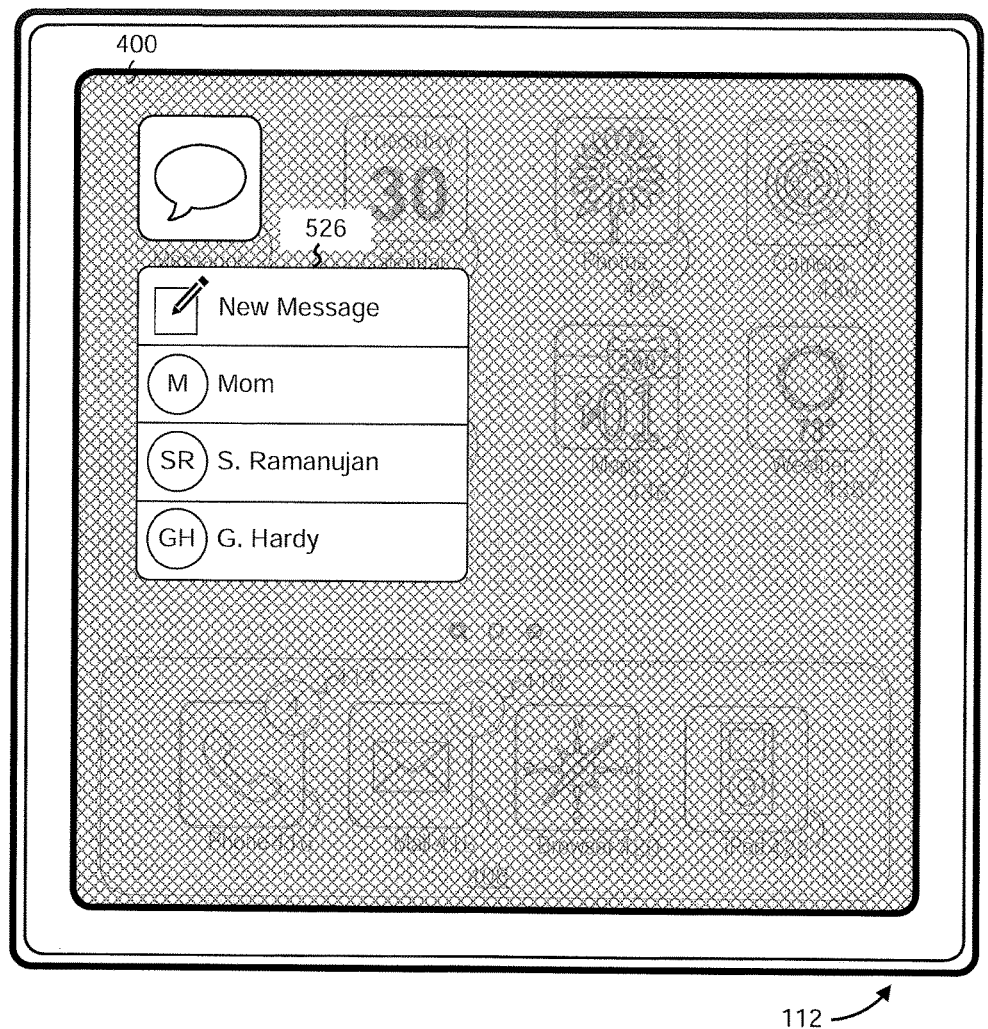
Figure 5F:
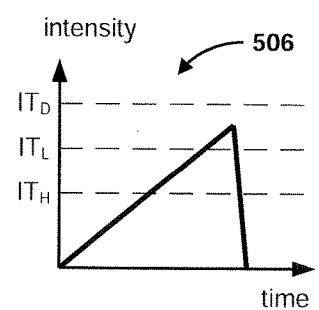

FIG. 5F illustrates that user input 505 ceases to be detected on the touch-sensitive surface (e.g., the contact has lifted off from the touch-sensitive surface and the intensity of user input 505 has decreased to 0 or below a detection threshold). In FIG. 5F, user interface element 526 remains on display (even though the user input 505 has ceased to be detected on the touch-sensitive surface). In some embodiments, user interface element 526 ceases to be displayed in response to a determination that user input 505 has ceased to be detected on the touch-sensitive surface (e.g., in response to the contact lifting off from the touch-sensitive surface, user interface element 526 and/or other visual effects, such as blurring, are removed from display).

FIGS. 5G-5J illustrate a transition of user interface 400 including an array of user interface objects in response to an increase in intensity of a contact in accordance with some embodiments.

Figure 5G:
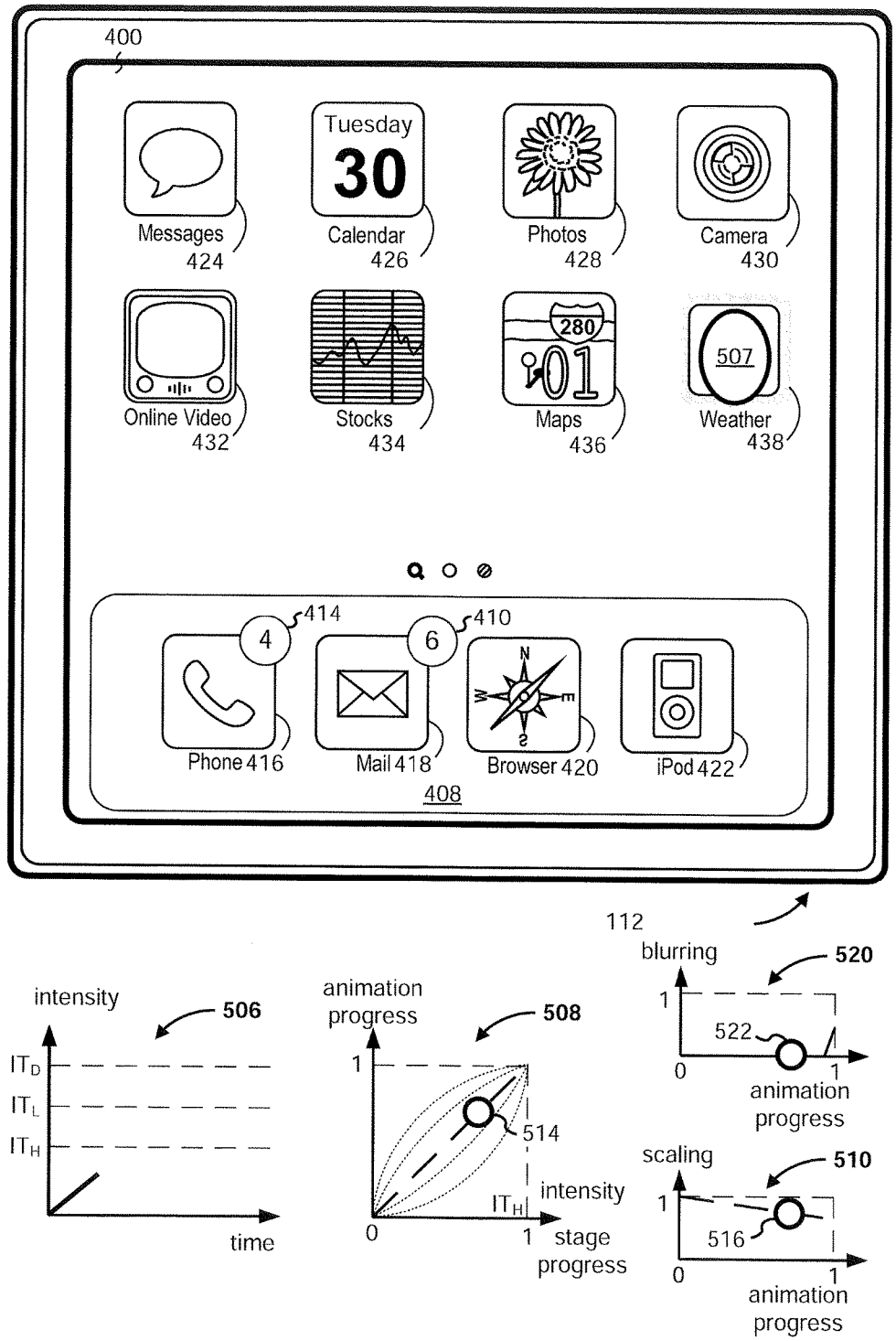

FIG. 5G shows that user input 507 is detected at a location on the touch-sensitive surface that corresponds to user interface object 438. In response to detecting the intensity of user input 507 (as shown in intensity graph 506 of FIG. 5G), an animation progress value is determined using the normalized intensity of user input 507 (e.g., the stage progress representing the normalized intensity of user input 507 below the intensity threshold $IT_H$) and the animation curve shown in graph 508 (as represented by indicator 514), and, in turn, a blurring value and a scaling value are determined from graphs 520 and 510 (as represented by indicators 522 and 516). In FIG. 5G, graph 520 indicates that there is no blurring (represented by the blurring value of 0 for indicator 522) and graph 510 indicates that the scaling factor is decreased (represented by the scaling factor, lower than the initial scaling factor of 1, for indicator 516).

Figure 5H:
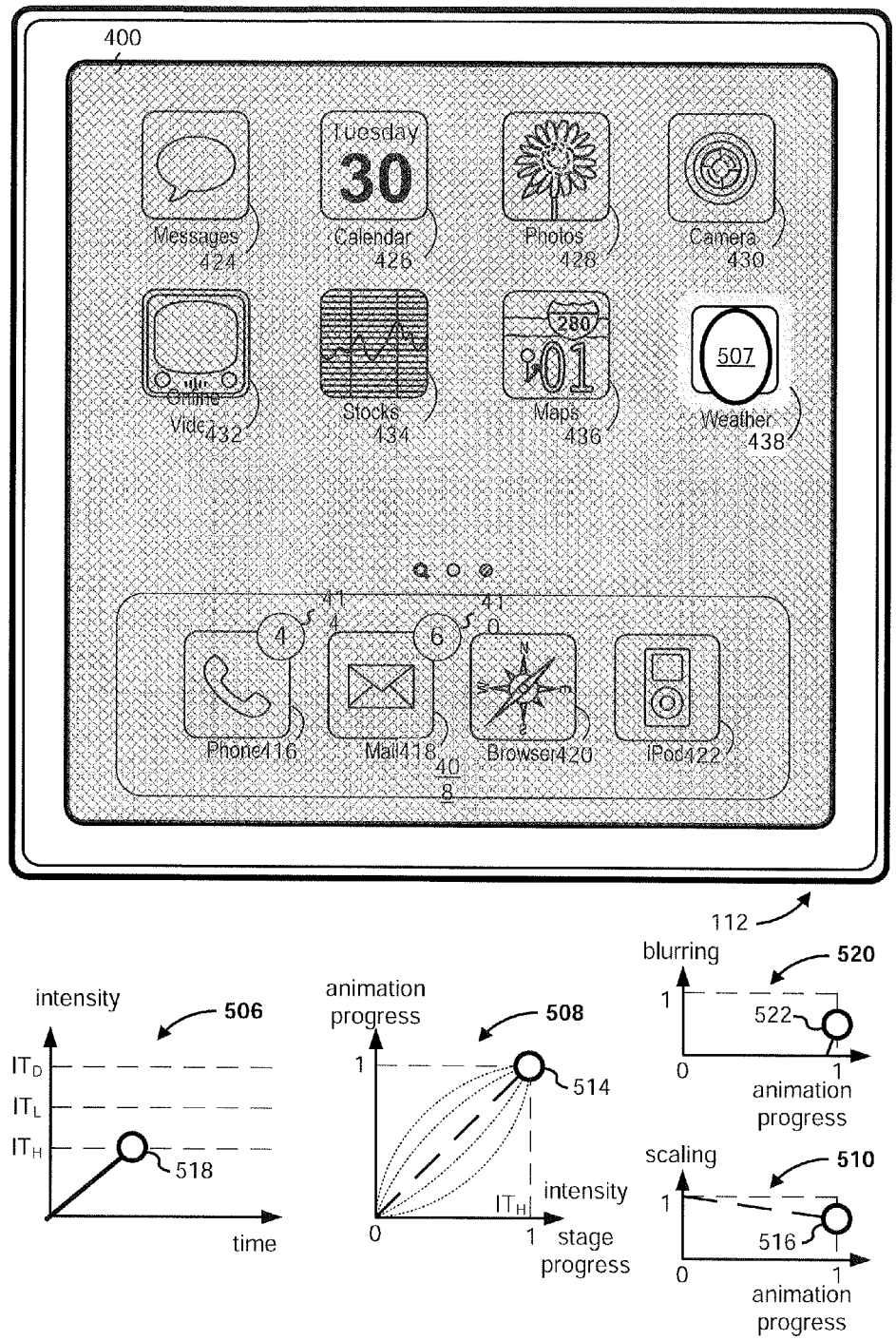

FIG. 5H is similar to FIG. 5C, except that the size of user interface object 438 is reduced (and additional user interface object, such as a shadow, is displayed around user interface object 438, instead of user interface object 424).

Figure 5I:
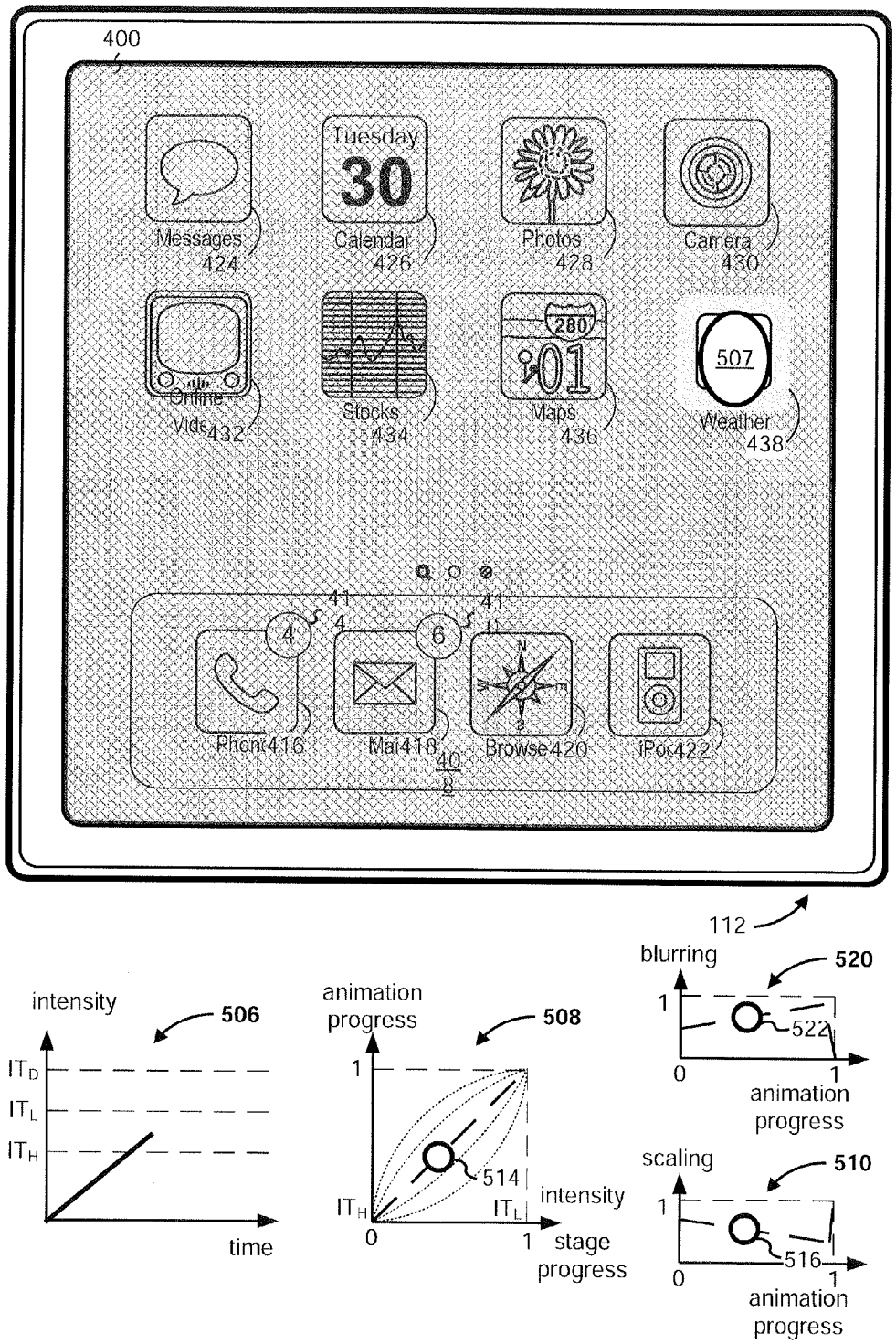

FIG. 5I is also similar to FIG. 5D, except that the size of user interface object 438 is reduced (and additional user interface element, such as a shadow, is displayed around user interface object 438, instead of user interface object 424). In addition, graph 510 represents that the scaling factor increases to 1 when the animation progress value is 1, and graph 520 represents that the blurring value decreases to 0 when the animation progress value is 1. In some embodiments, the curves in graphs 510 and 520 are selected by an application corresponding to user interface object 424 (e.g., the curves are actively selected by the application, such as weather widget 149-1, or the curves are selected based on a determination that the application has not subscribed to a preview operation, such as displaying user interface object 526 as shown in FIG. 5E).

Figure 5J:
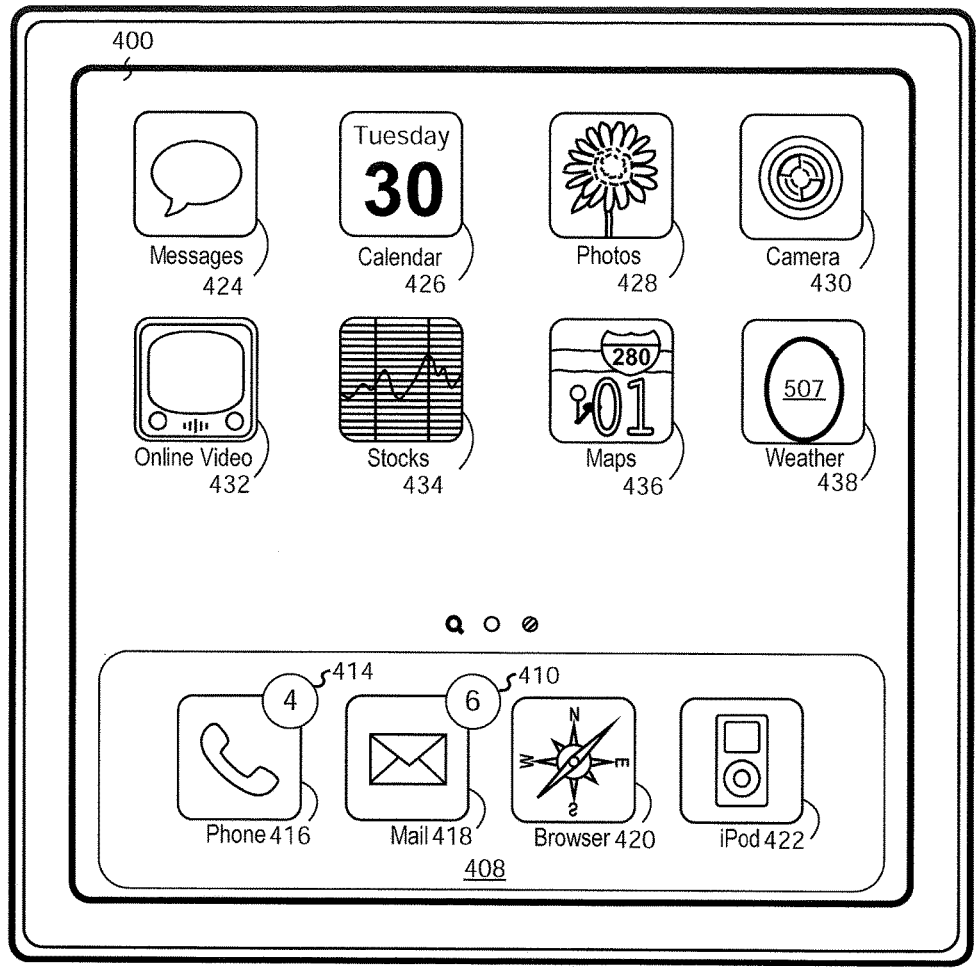
Figure 5J:
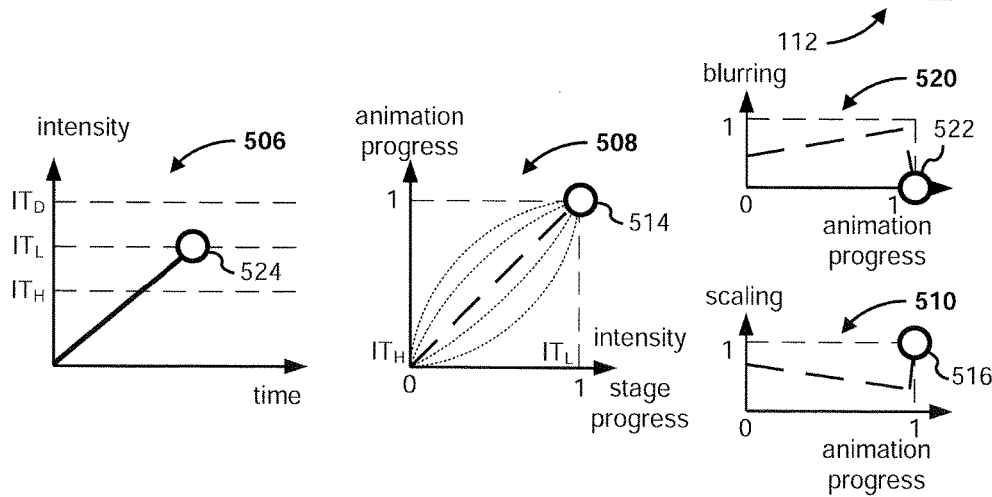

FIG. 5J shows, in intensity graph 506, that the intensity of user input 505 satisfies the intensity threshold $IT_L$ (represented by indicator 524 in intensity graph 506). Graph 508 in FIG. 5E represents that the animation progress value has increased to 1. Graph 510 in FIG. 5J represents that the scaling factor has increased back to the initial scaling factor of 1, and graph 520 in FIG. 5J represents that the blurring value has increased to 0. FIG. 5J also shows that user interface 400 is updated based on changes to these parameters (the blurring value and the scaling factor). User interface object 438 has returned to its initial size (as shown in FIG. 5A) based on the scaling factor, and user interface 400 ceases to be blurred (e.g., the blurring of user interface 400 is removed). The additional user interface (e.g., a shadow) ceases to be displayed.

FIGS. 5K-5O illustrate a transition of user interface 400 containing a list of items in response to an increase in intensity of a contact in accordance with some embodiments.

Figure 5K:
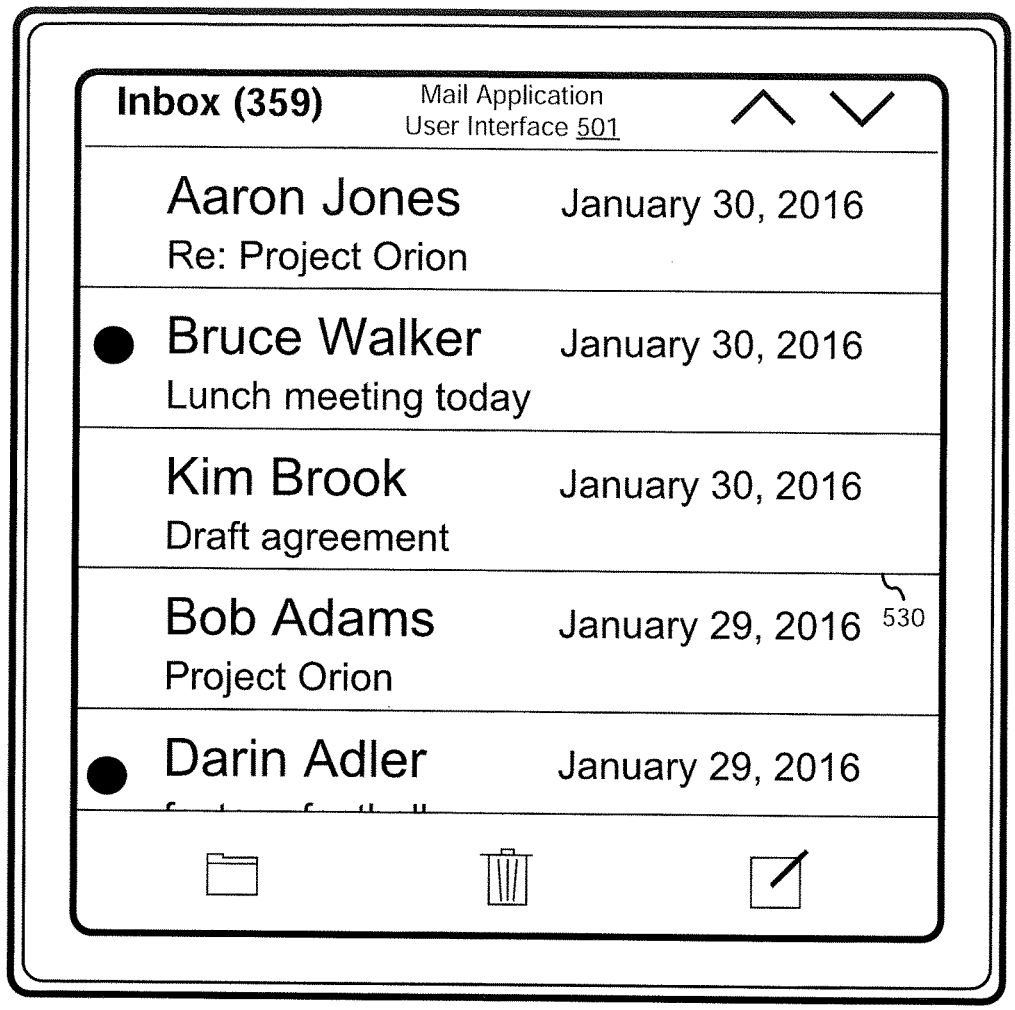
Figure 5K:
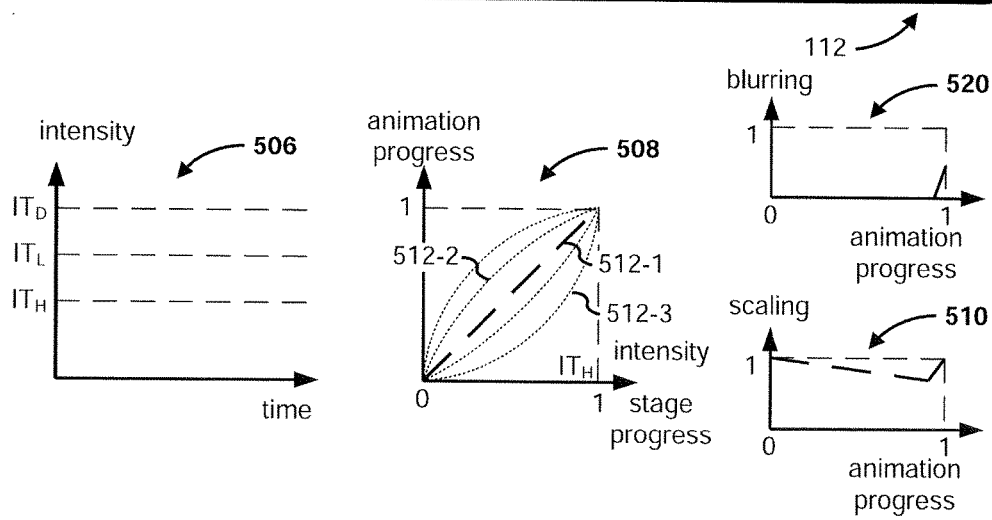

FIG. 5K illustrates user interface 501 of a mail application that includes a list of emails.

Figure 5L:
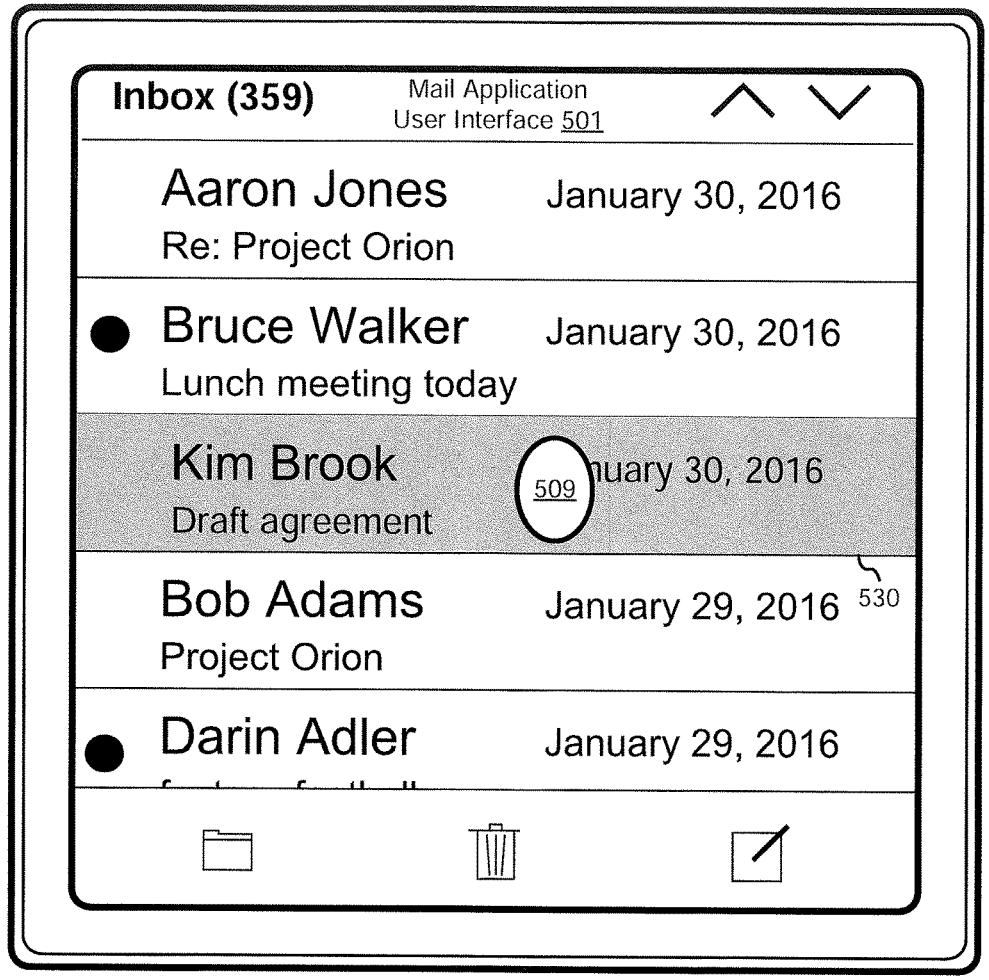
Figure 5L:
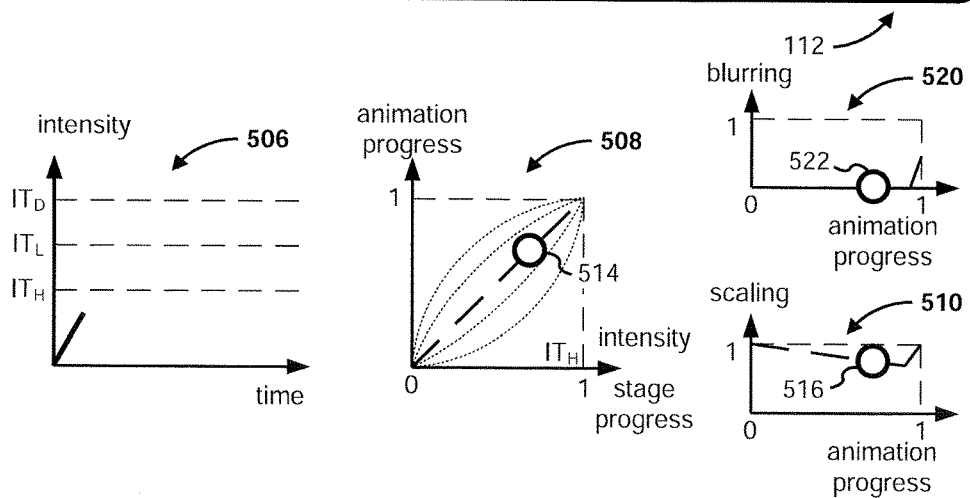

FIG. 5L shows that user input 509 is detected at a location on a touch-sensitive surface (e.g., touch-sensitive surface 451 or a touch-sensitive surface of a touch-screen display) that corresponds to user interface object 530 (e.g., an entry in the list, such as an email in the list of emails). In response to detecting the intensity of user input 509 (as shown in intensity graph 506 of FIG. 5L), an animation progress value is determined using the normalized intensity of user input 509 (e.g., the stage progress representing the normalized intensity of user input 509 below the intensity threshold $IT_H$) and the animation curve shown in graph 508 (as represented by indicator 514), and, in turn, a blurring value and a scaling value are determined from graphs 520 and 510 (as represented by indicators 522 and 516). In FIG. 5L, graph 520 indicates that there is no blurring (represented by the blurring value of 0 for indicator 522) and graph 510 indicates that the scaling factor is decreased (represented by the scaling factor, lower than the initial scaling factor of 1, for indicator 516).

FIG. 5L also shows that user interface 501 is updated based on changes to the scaling factor. In FIG. 5L, the size of text in user interface object 530 is reduced (as compared to the size of text in user interface object 530 shown in FIG. 5K) based on the decrease in the scaling factor. FIG. 5L also shows that the color of user interface object 530 has changed.

Figure 5M:
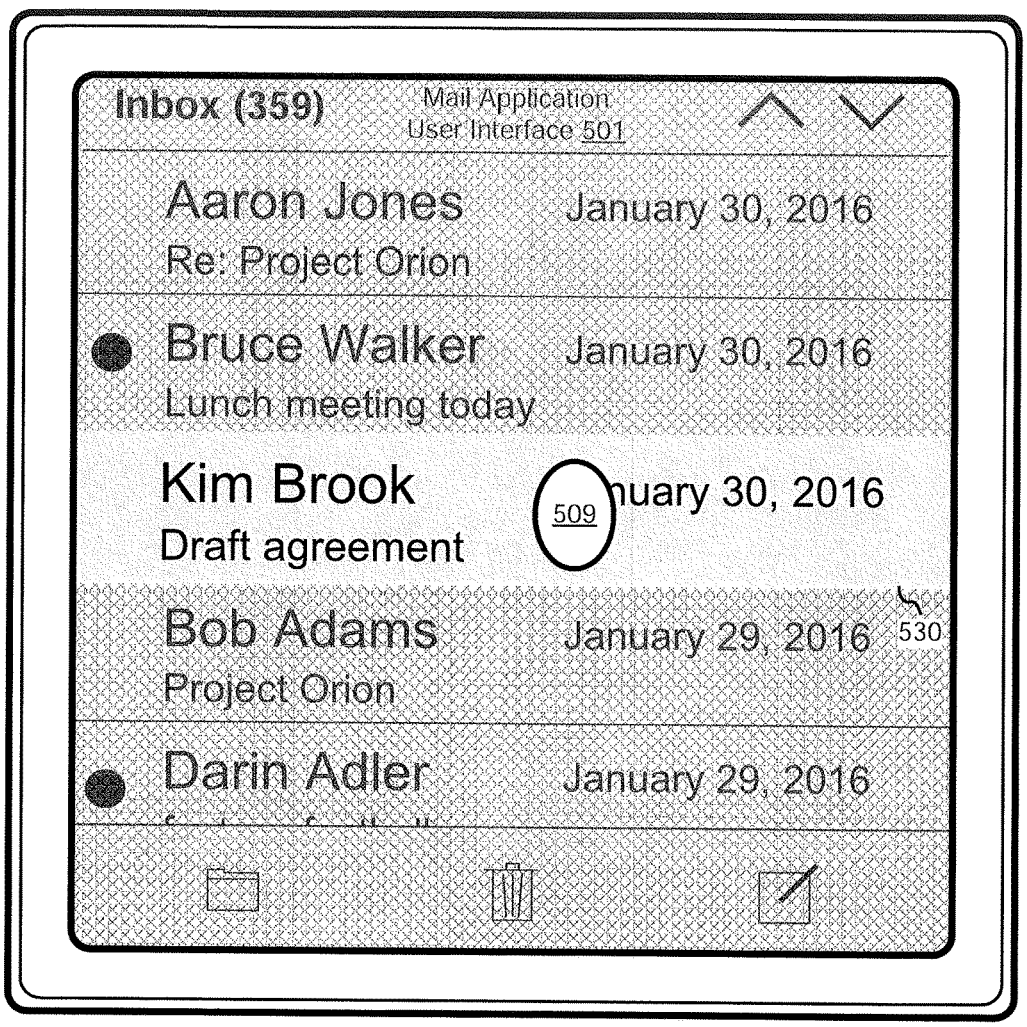
Figure 5M:
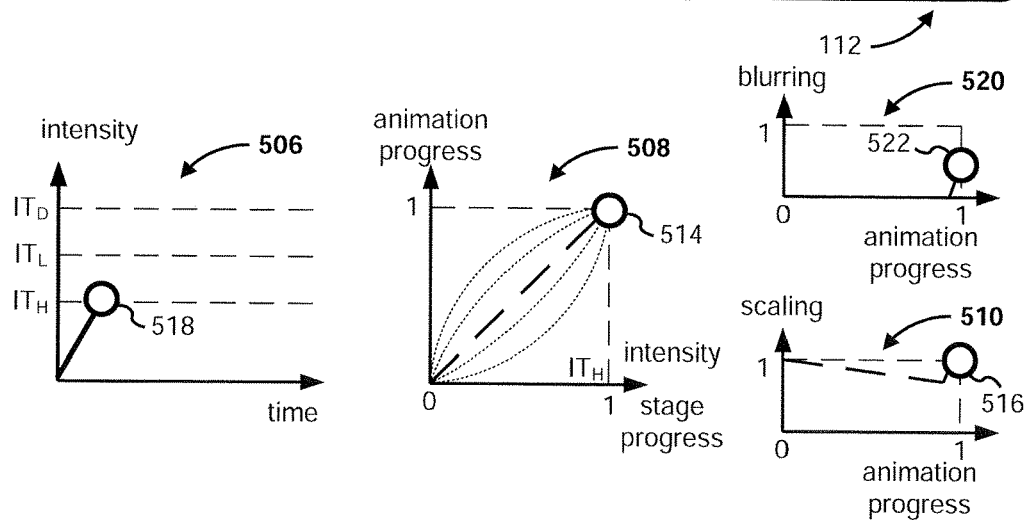

FIG. 5M shows, in intensity graph 506, that the intensity of user input 509 has increased further to satisfy the intensity threshold $IT_H$. Graph 508 in FIG. 5C represents that the animation progress value has increased to 1. Graph 510 in FIG. 5C represents that the scaling factor has returned to the initial scaling factor, and graph 520 in FIG. 5M represents that the blurring value has increased, causing one or more portions of user interface 501 to be blurred. FIG. 5M also shows that user interface 501 is updated based on changes to these parameters (the blurring value and the scaling factor). For example, the size of text in user interface object 530 returned to its initial size (and increased from the size of text in user interface object 530 shown in FIG. 5L) based on the changes to the scaling factor, and user interface 501, other than user interface object 530, is blurred. The color of user interface object 530 has changed further.

Figure 5N:
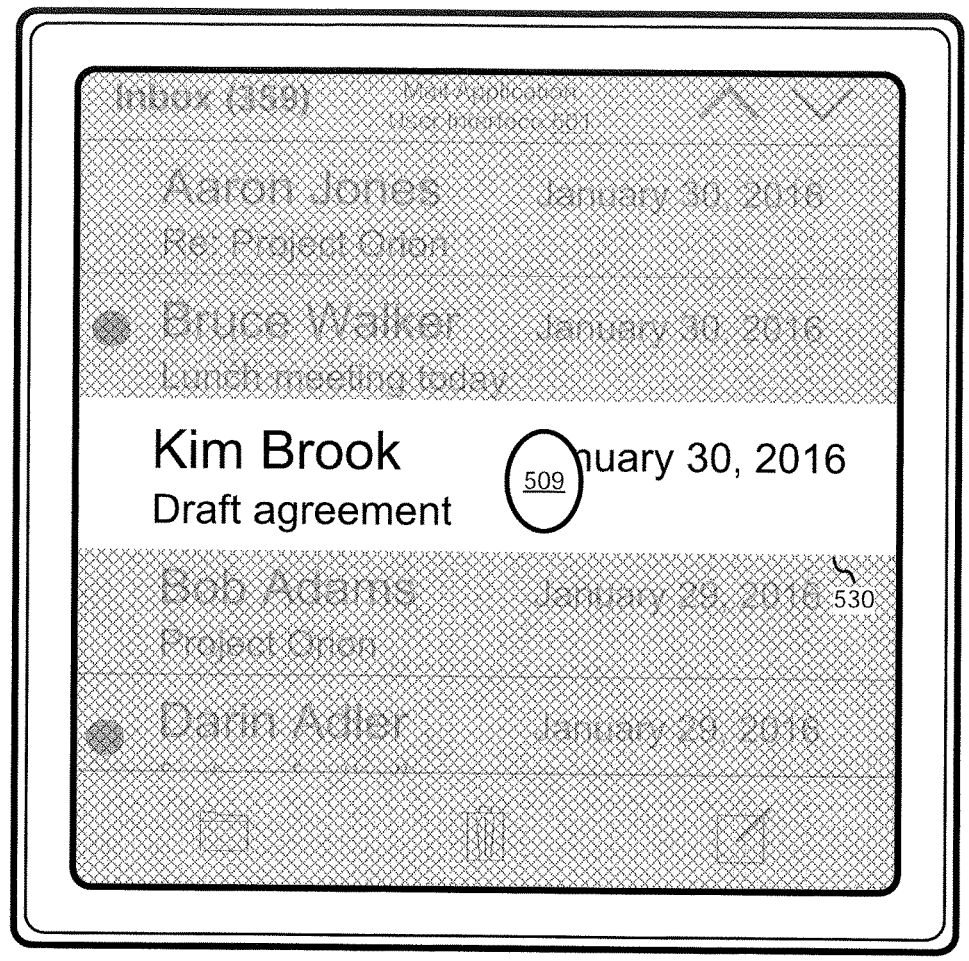
Figure 5N:
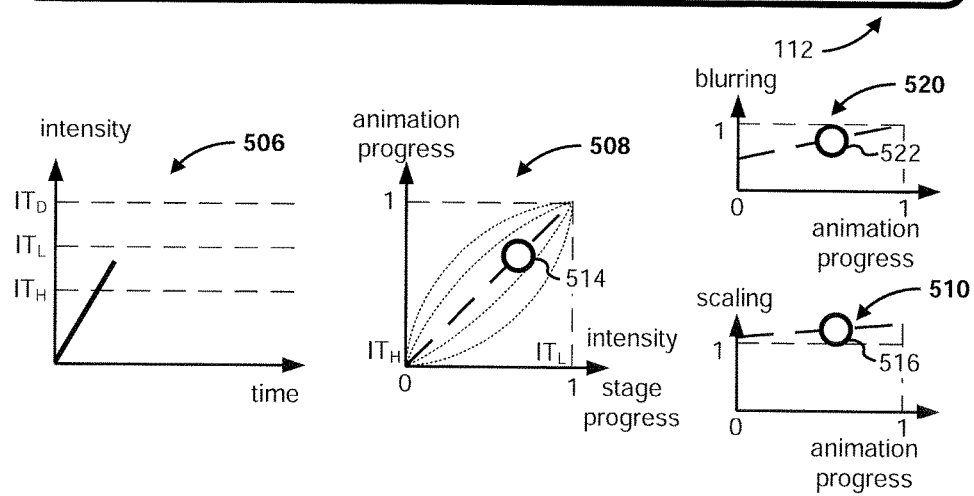

FIG. 5N shows, in intensity graph 506, that the intensity of user input 509 has increased above the intensity threshold $IT_H$. Graph 508 in FIG. 5N shows the animation progress value determined based on the stage progress (e.g., the normalized intensity of the touch input between the intensity threshold $IT_H$ and the intensity threshold $IT_L$). Graph 510 in FIG. 5N represents that the scaling factor increases with an increase in the animation progress value, and graph 520 in FIG. 5N represents that the blurring value increases with an increase in the animation progress value. FIG. 5N also shows that user interface 501 is updated based on changes to these parameters. The size of text in user interface object 530 is increased (as compared to the size of text in user interface object 530 shown in FIG. 5M) based on the increased scaling factor, and the magnitude of the blurring effect applied to user interface 501, other than user interface object 530, has increased (e.g., the blur radius has increased).

Figure 5O:
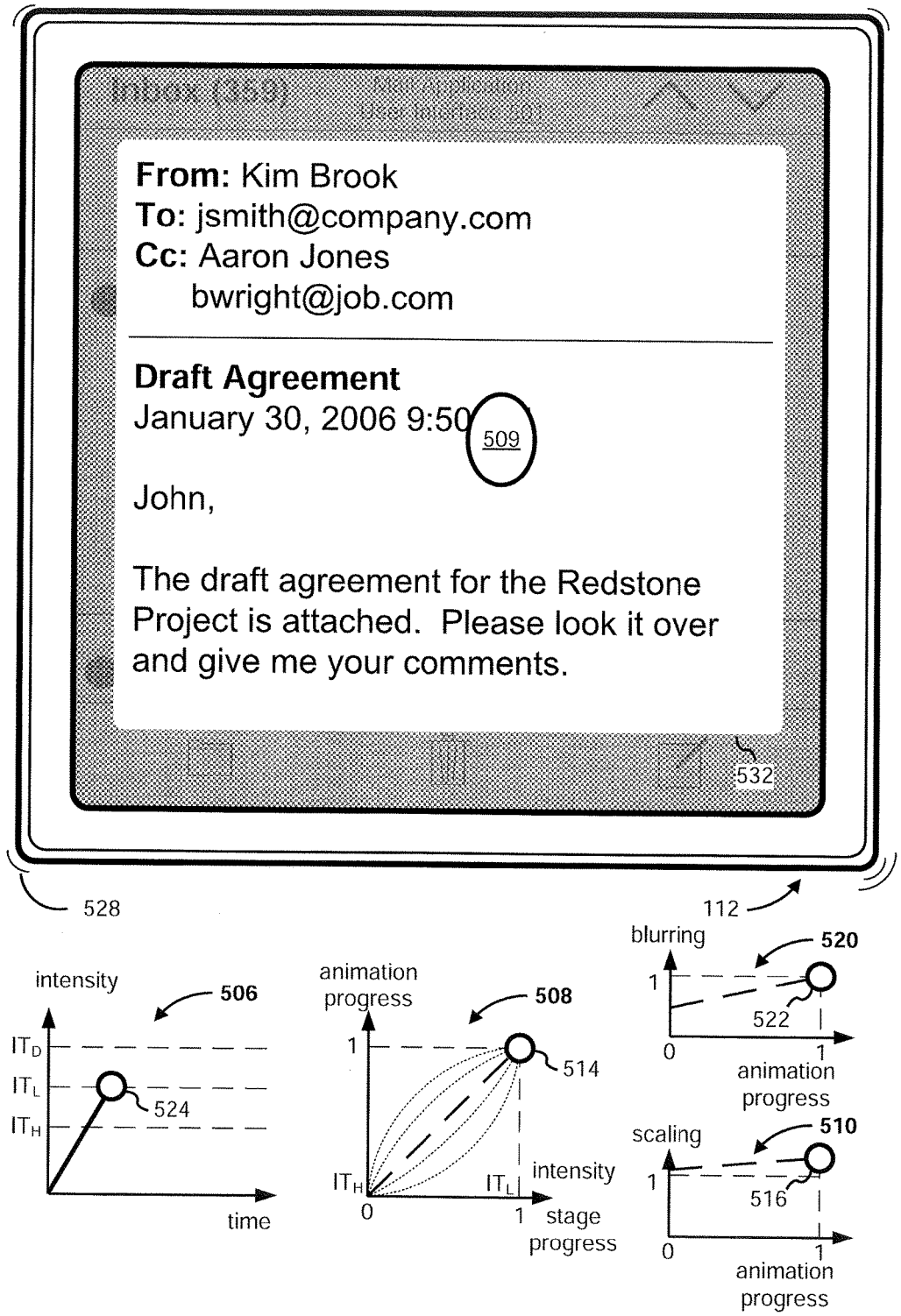

FIG. 5O shows, in intensity graph 506, that the intensity of user input 509 satisfies the intensity threshold $IT_L$ (represented by indicator 524 in intensity graph 506). Graph 508 in FIG. 5O represents that the animation progress value has increased to 1. Graph 520 in FIG. 5O represents that the blurring value has increased further. FIG. 5O also shows that user interface 501 is updated based on changes to the blurring value. For example, the previously blurred portion of user interface 501 is blurred more. In addition, user interface 501 includes user interface element 532 (e.g., a preview window is laid over the previously displayed user interface).

FIG. 5O also shows that tactile output 528 is generated in response to the intensity of user input 509 satisfying the intensity threshold $IT_L$.

Figure 5P:
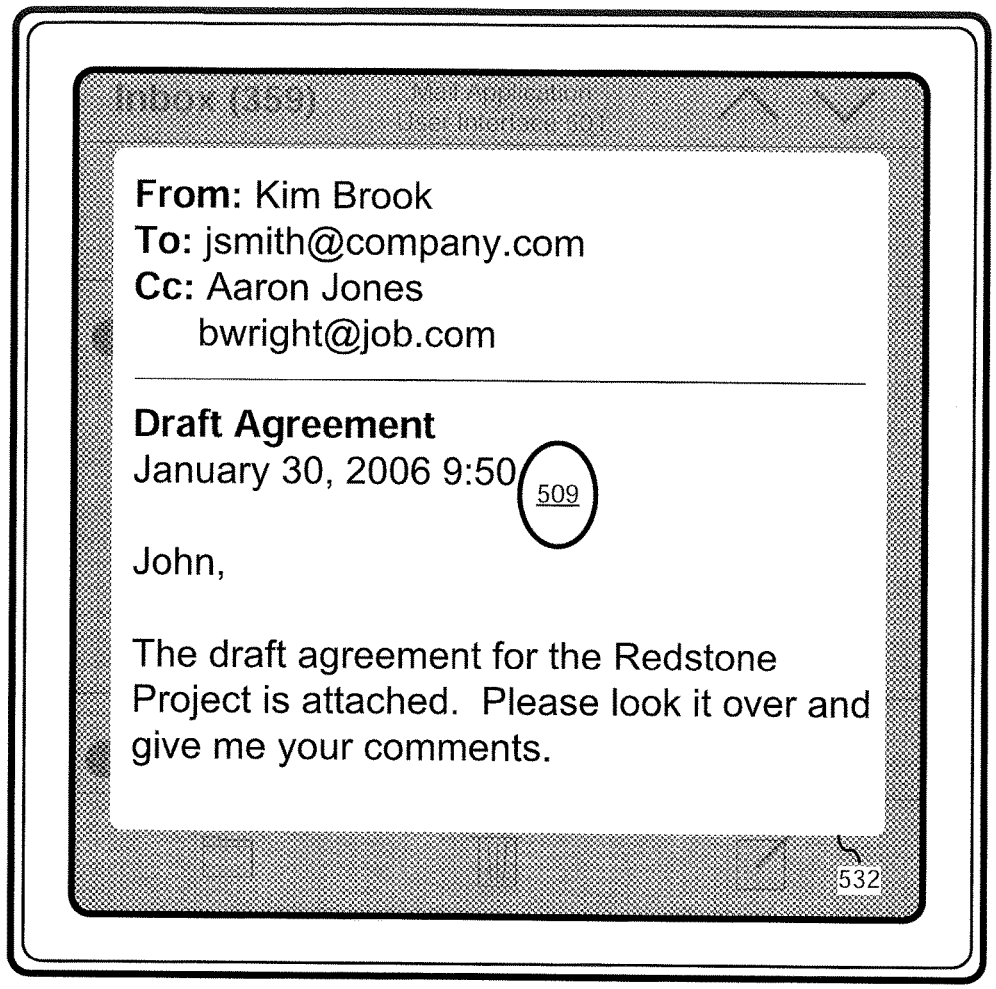
Figure 5P:
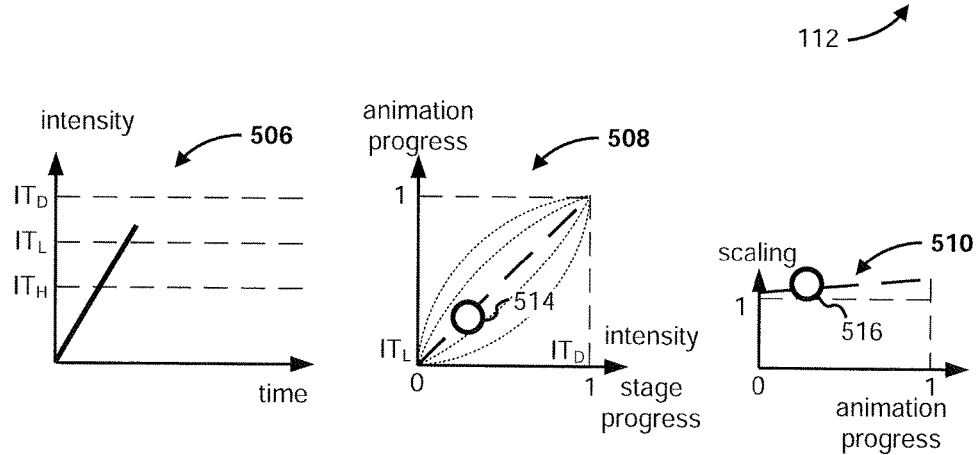
Figure 5Q:
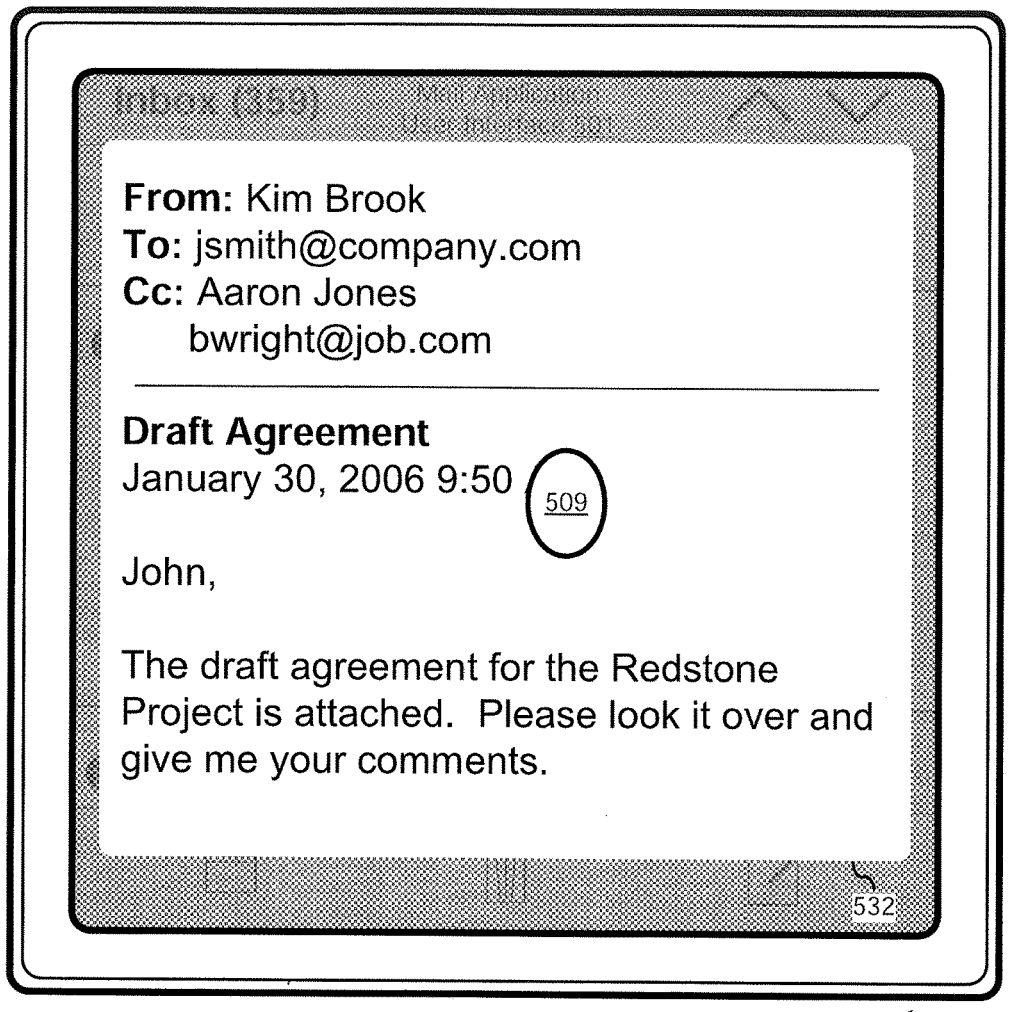
Figure 5Q:
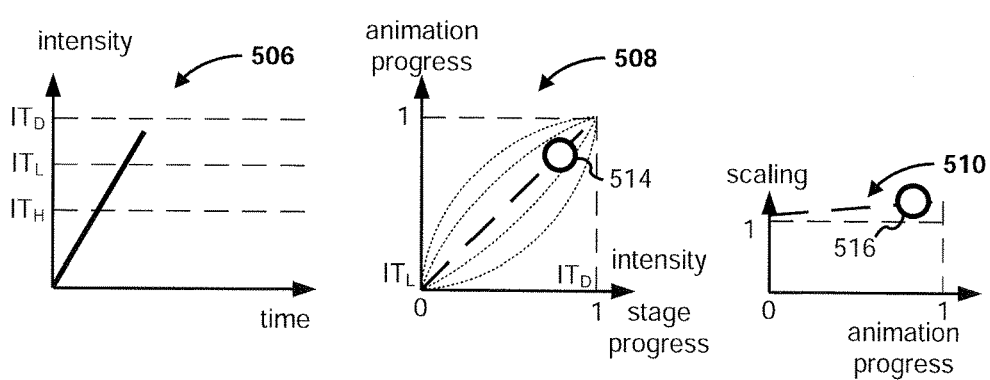

FIG. 5P shows, in intensity graph 506, that the intensity of user input 509 has increased above the intensity threshold $IT_L$. Graph 508 in FIG. 5Q shows the animation progress value determined based on the stage progress (e.g., the normalized intensity of touch input between the intensity threshold $IT_L$ and the intensity threshold $IT_D$). Graph 510 in FIG. 5P represents that the scaling factor increases with an increase in the animation progress value. FIG. 5P also shows that user interface 501 is updated based on changes to the scaling factor. The size of user interface object 532 is increased (as compared to the size of user interface object 532 shown in FIG. 5O) based on the increased scaling factor.

FIG. 5Q shows, in intensity graph 506, that the intensity of user input 509 has increased further. Graph 508 in FIG. 5Q shows that the animation progress value determined based on the stage progress has increased further. Graph 510 in FIG. 5Q represents that the scaling factor also increases further with an increase in the animation progress value. FIG. 5Q also shows that user interface 501 is updated based on changes to the scaling factor. The size of user interface object 532 is increased further (as compared to the size of user interface object 532 shown in FIG. 5P) based on the increased scaling factor.

Figure 5R:
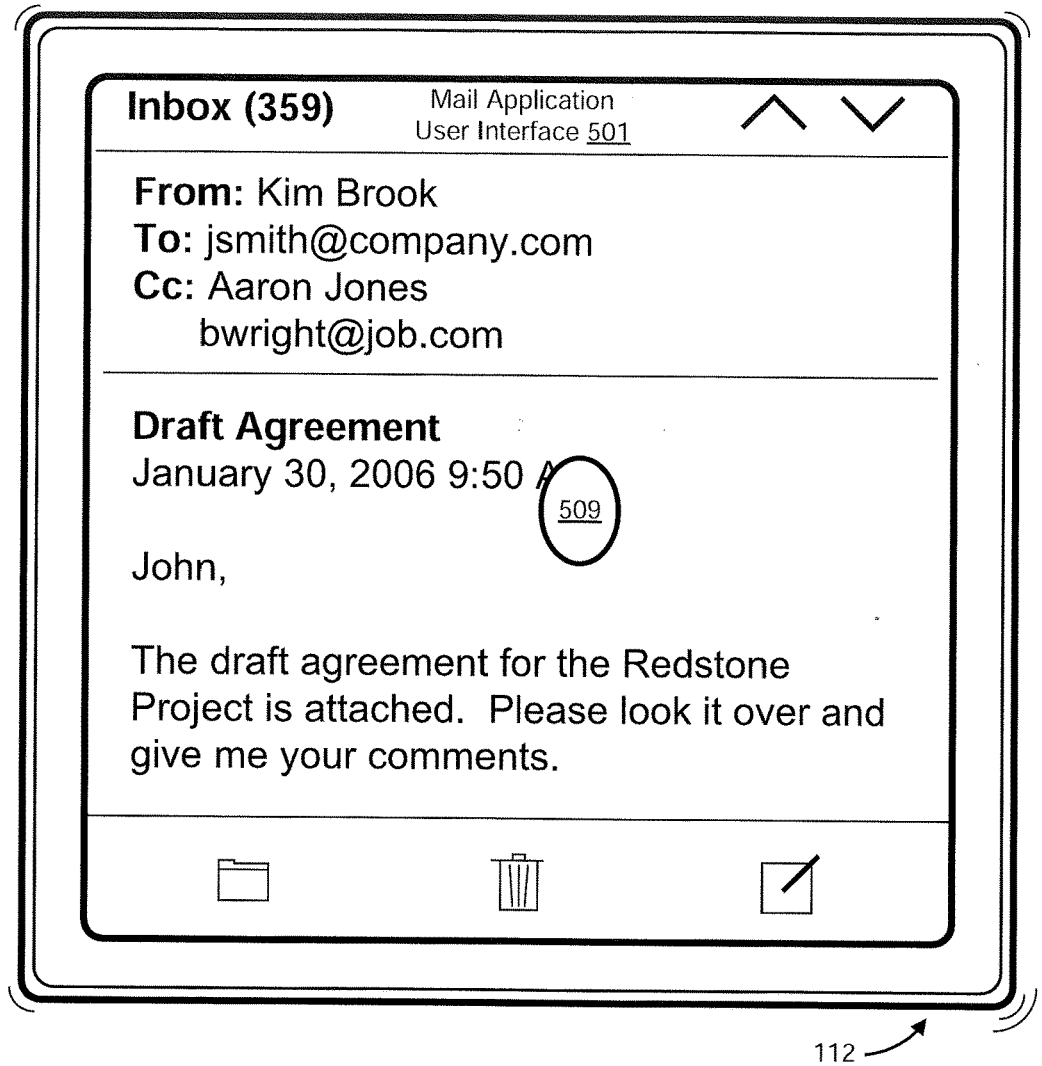
Figure 5R:
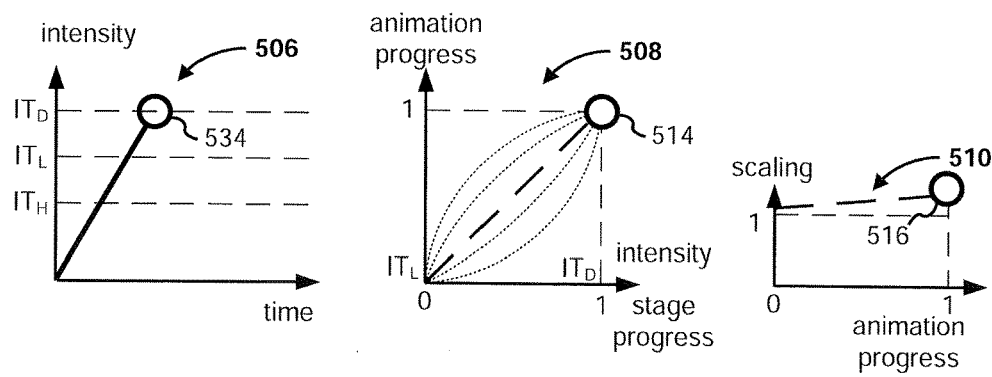

FIG. 5R shows, in intensity graph 506, that the intensity of user input 509 satisfies the intensity threshold $IT_D$ (represented by indicator 534 in intensity graph 506). Graph 508 in FIG. 5R represents that the animation progress value has increased to 1. Graph 510 in FIG. 5R represents that the scaling factor has increased further. FIG. 5R also shows that user interface 501 is updated based on changes to the scaling factor. For example, the previously displayed user interface is replaced with the user interface shown in user interface object 532 (e.g., user interface object 532 expands to occupy entire user interface 501).

FIG. 5R also shows that a tactile output is generated in response to the intensity of user input 509 satisfying the intensity threshold $IT_D$.

In some embodiments, further increase in intensity of user input 509 does not cause further changes to user interface 501. For example, user interface 501 shown in FIG. 5R is maintained on display even if the intensity of user input 509 increases above the intensity threshold $IT_D$.

Figure 5S:
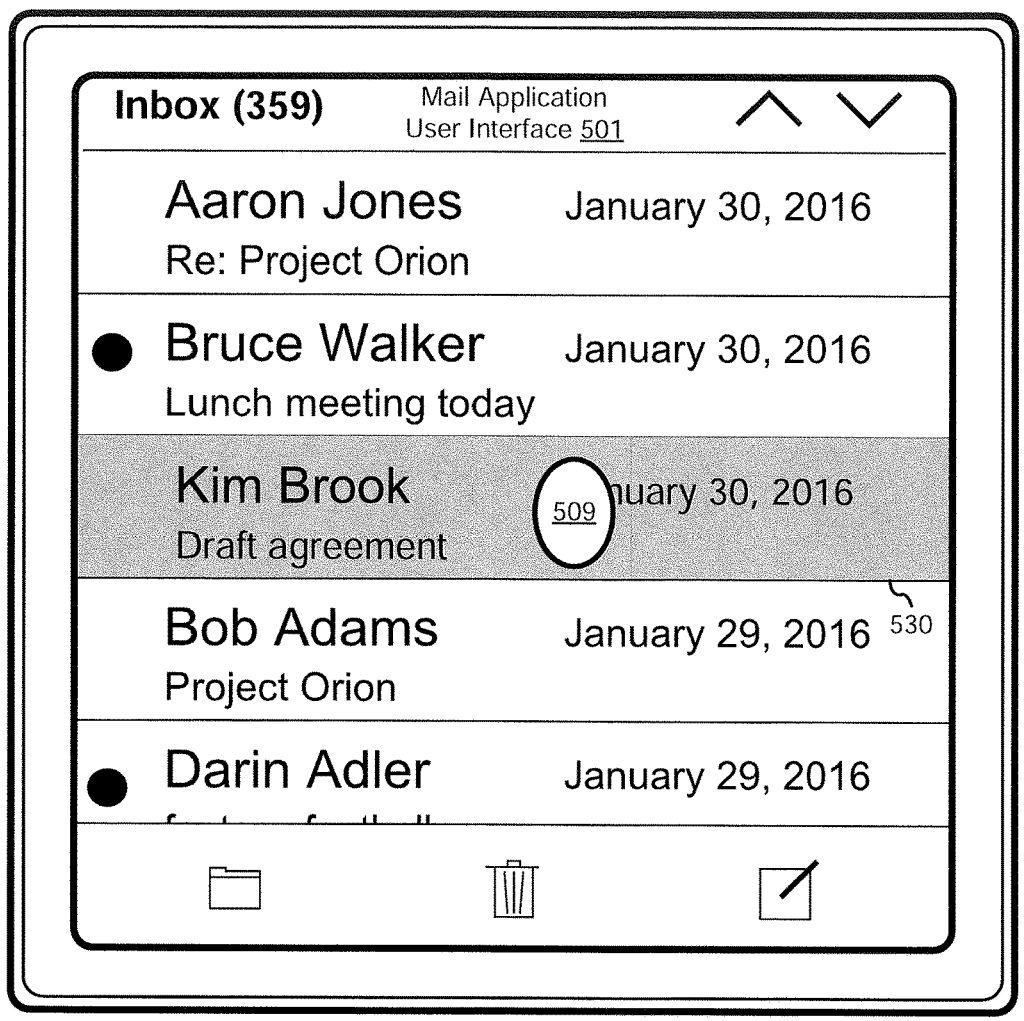
Figure 5S:
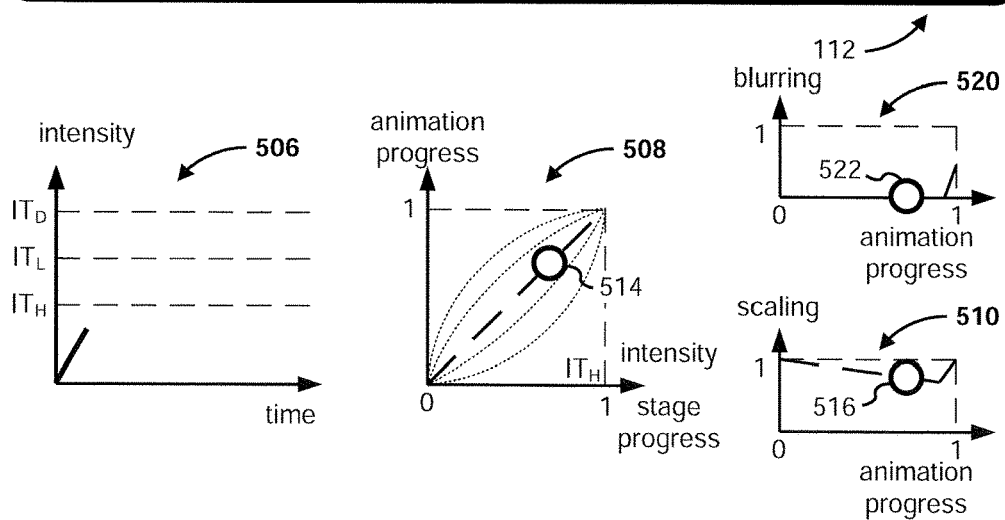

FIGS. 5S-5AA illustrate visual effects displayed to indicate that a particular user interface object is configured to respond to changes in intensity of a user input, in accordance with some embodiments.

FIG. 5S is similar to FIG. 5L, and elements in FIG. 5S with the same reference number as corresponding elements in FIG. 5S have the same properties and functions as described above for the corresponding elements in FIG. 5L.

Figure 5T:
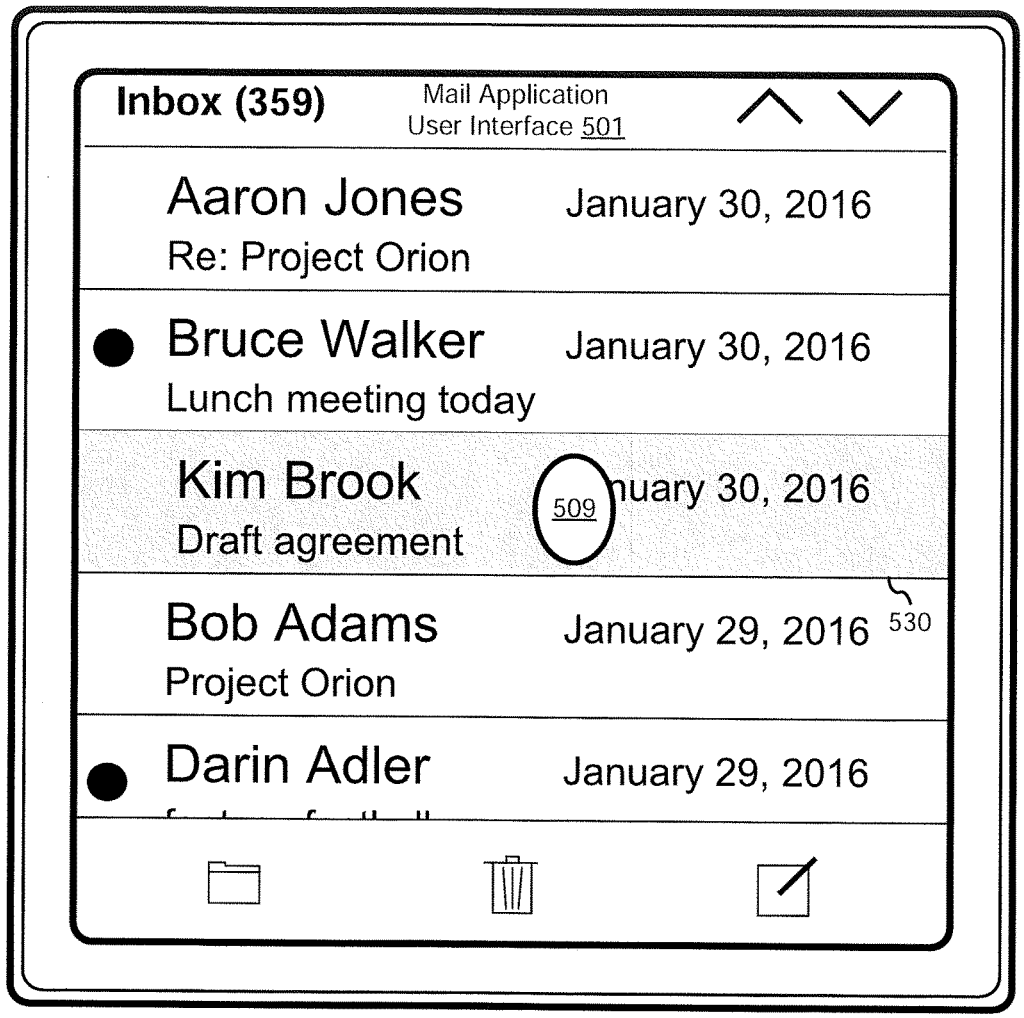
Figure 5T:
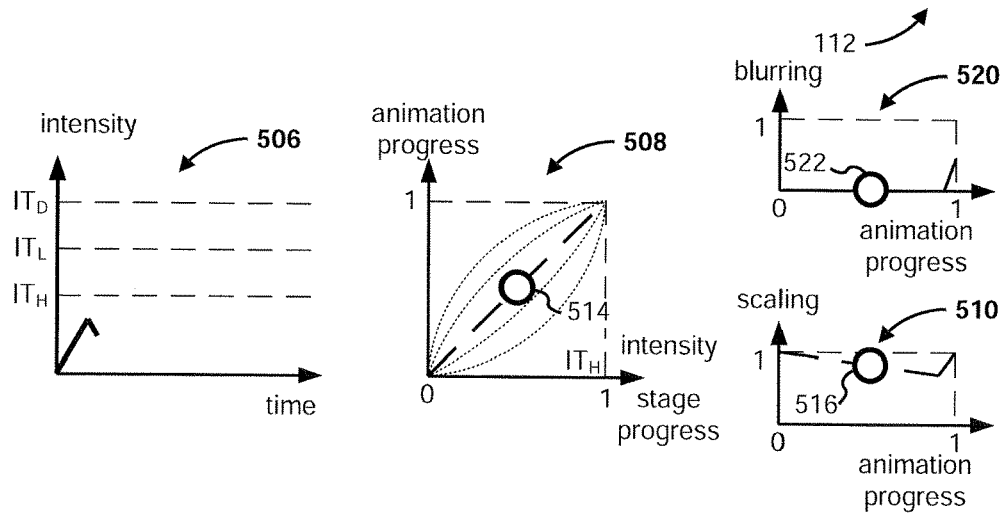

FIG. 5T illustrates, in intensity graph 506, that the intensity of user input 509 has decreased from the intensity of user input shown in FIG. 5S. Graph 508 in FIG. 5T represents that the animation progress value has decreased, and indicators 516 and 522 in graphs 510 and 520 are updated based on the changes to the animation progress value. FIG. 5T also shows that user interface 501 is updated based on changes to the scaling factor. For example, the size of text in user interface object 530 increases based on the changes to the scaling factor. In addition, the color of user interface object 530 also changes.

Figure 5U:
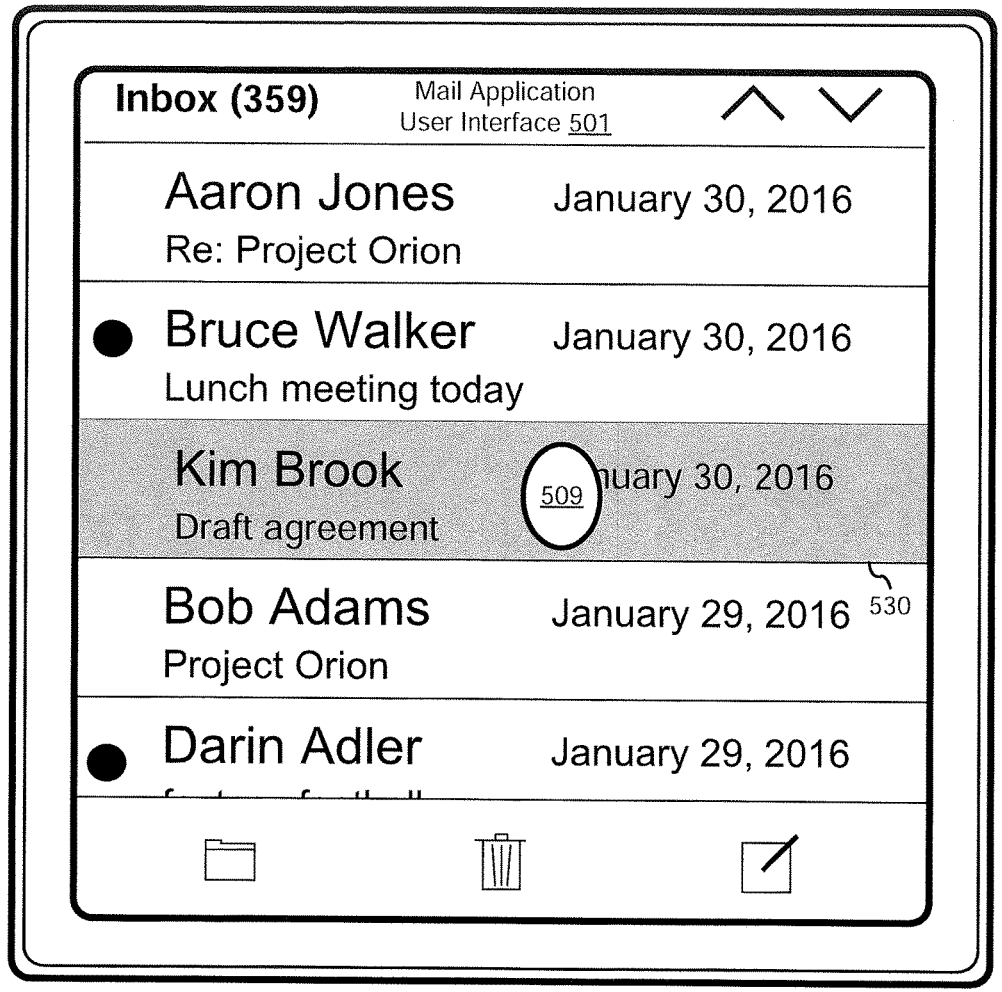
Figure 5U:
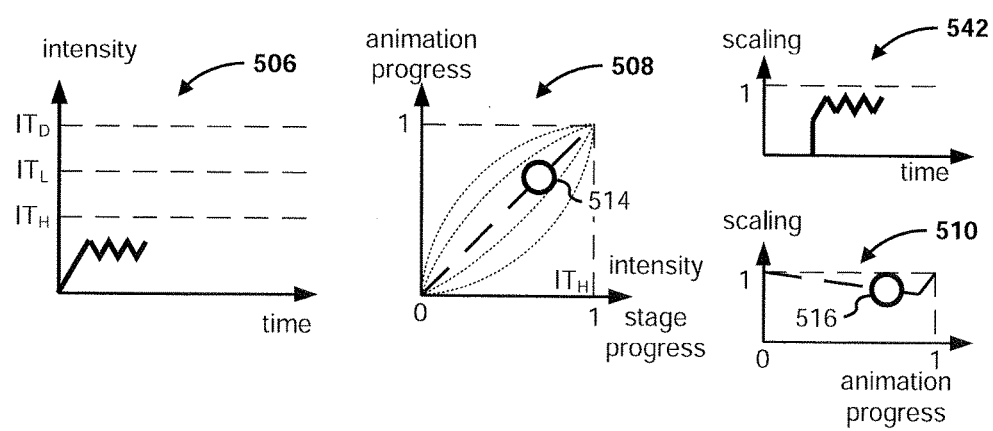

FIG. 5U illustrates, in intensity graph 506, that the intensity of user input 509 has fluctuated (e.g., increased and decreased multiple times) over time below the intensity threshold $IT_H$. Graph 542 represents that the scaling factor also changes over time based on the changes to the intensity of user input 509 (and/or associated changes to the stage progress value). Accordingly, the size of text in user interface object 530 increases and decreases based on the changes to the intensity of user input 509. In some cases, this visually indicates that user interface object 530 is configured to respond to further changes in intensity of user input 509 (e.g., user interface object 530 is configured to cause blurring of one or more portions of user interface 501 in response to the intensity of user input 509 satisfying the intensity threshold $IT_H$).

Figure 5V:
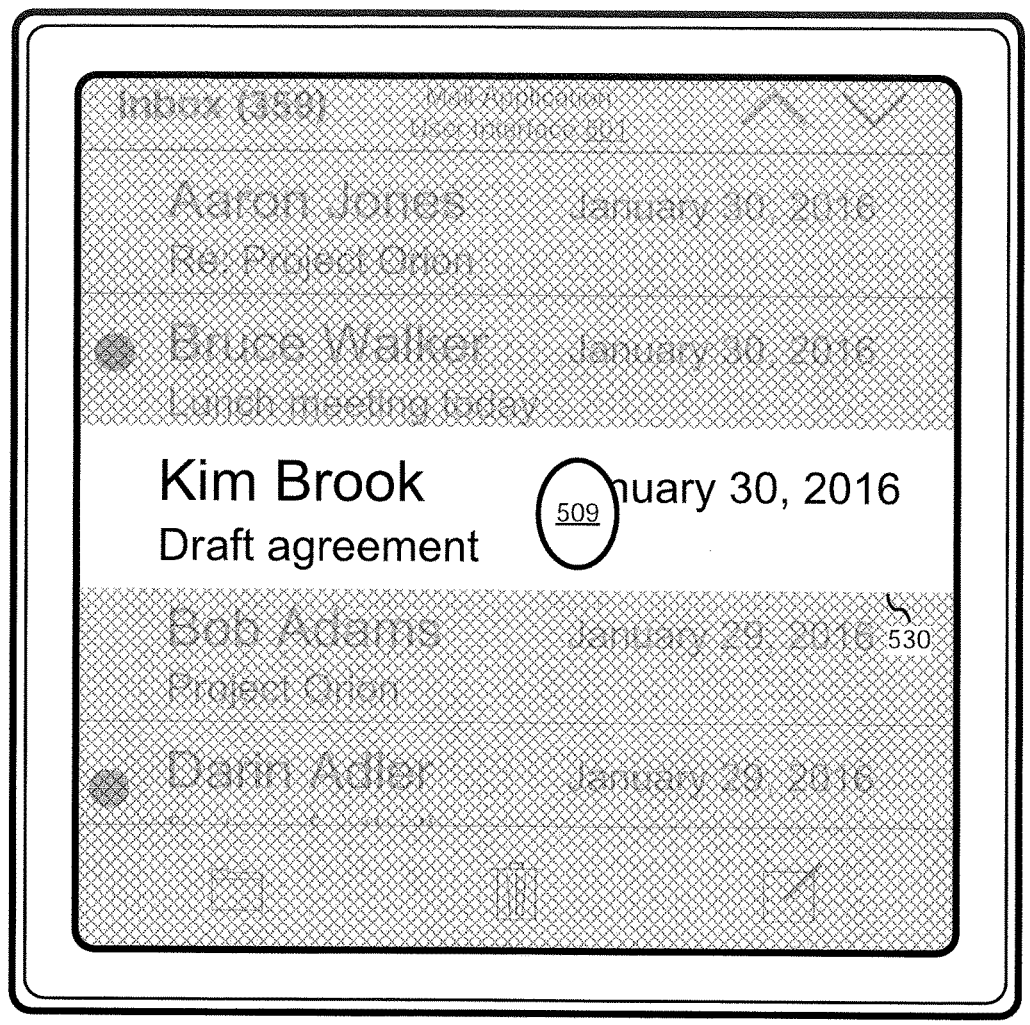
Figure 5V:
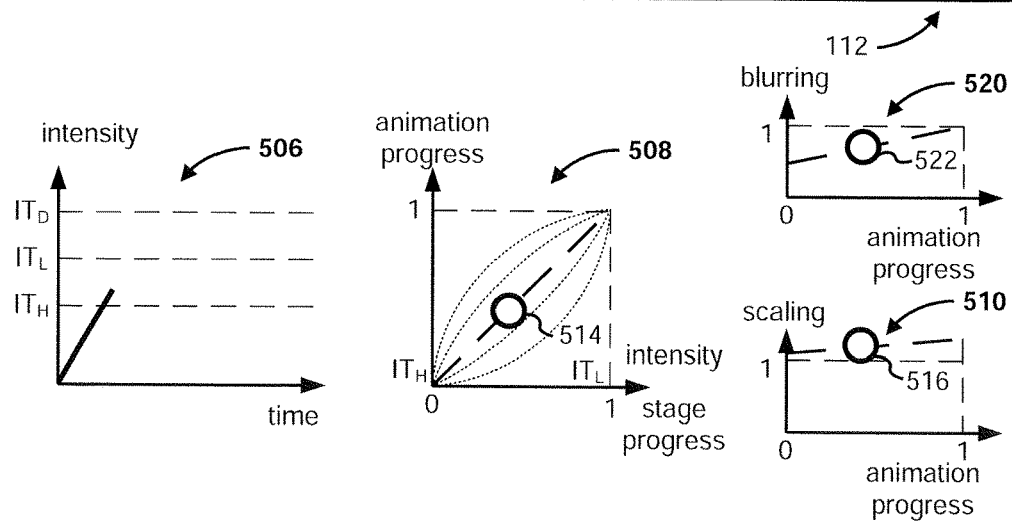

FIG. 5V shows that the intensity of user input 509 exceeds the intensity threshold $IT_H$, and one or more portions of user interface 501 are blurred. FIG. 5V corresponds to FIG. 5N described above. For brevity, the detailed description of this user interface is not repeated herein.

Figure 5W:
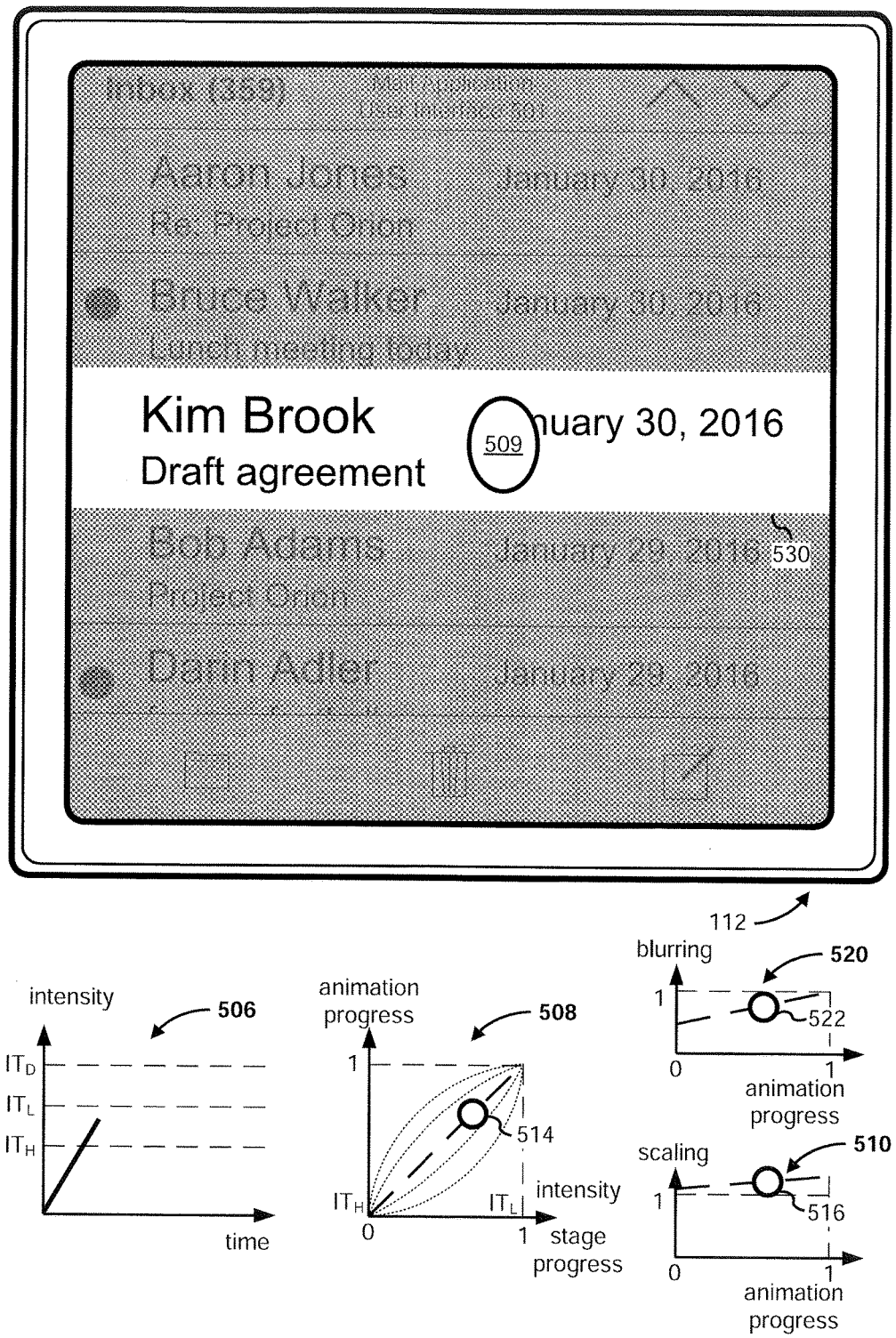

FIG. 5W illustrates, in intensity graph 506, that the intensity of user input 509 has increased from the intensity of user input shown in FIG. 5V. Graph 508 in FIG. 5W represents that the animation progress value has increased, and indicators 516 and 522 in graphs 510 and 520 are updated based on the changes to the animation progress value. FIG. 5W also shows that user interface 501 is updated based on changes to the scaling factor and the blurring value. For example, the size of text in user interface object 530 increases based on the changes to the scaling factor, and the previously blurred portions of user interface 501 are blurred more.

Figure 5X:
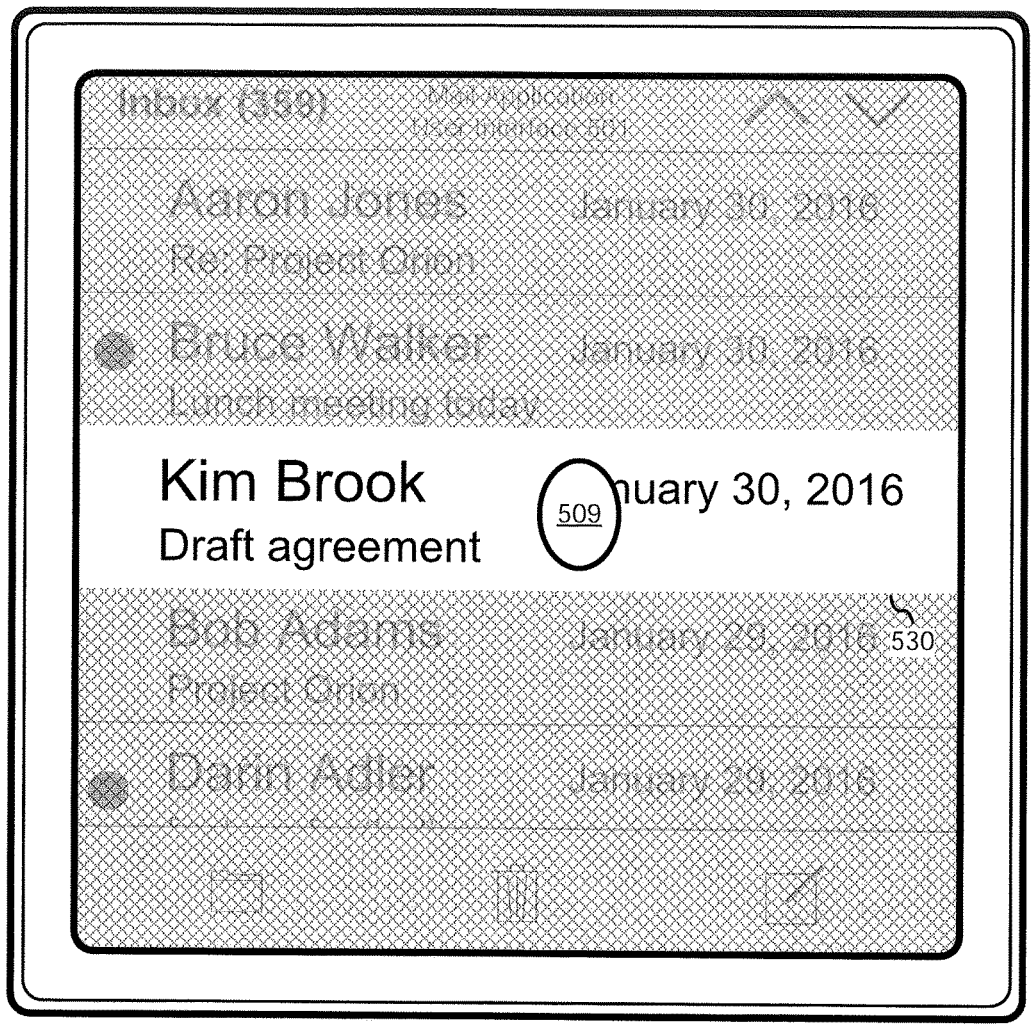
Figure 5X:
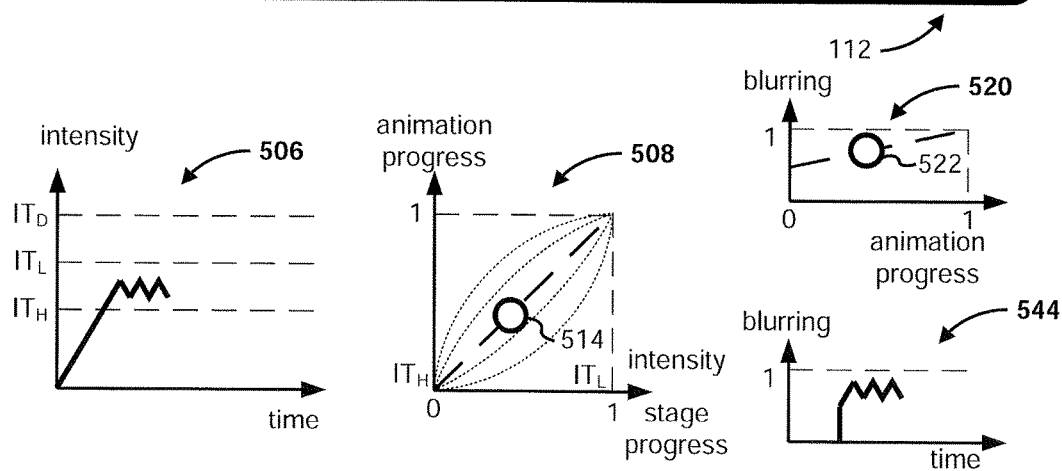

FIG. 5X illustrates, in intensity graph 506, that the intensity of user input 509 has fluctuated (e.g., increased and decreased multiple times) over time between the intensity threshold $IT_H$ and the intensity threshold $IT_L$. Graph 544 represents that the blurring value also changes over time based on the changes to the intensity of user input 509 (and/or associated changes to the stage progress value). Accordingly, the magnitude (or severity) of the blurring effect increases and decreases based on the changes to the intensity of user input 509. In some cases, this visually indicates that user interface object 530 is configured to respond to further changes in intensity of user input 509 (e.g., user interface object 530 is configured to cause display of a preview window in response to the intensity of user input 509 satisfying the intensity threshold $IT_L$).

Figure 5Y:
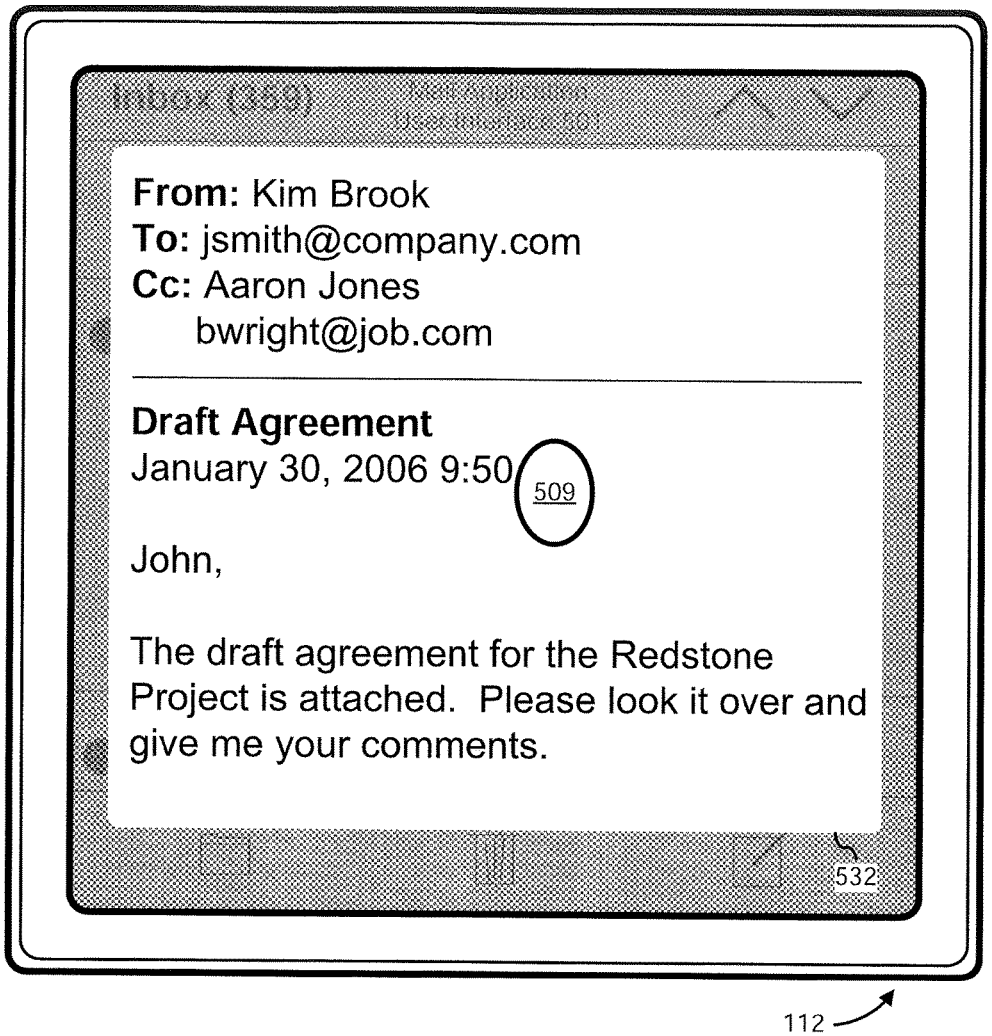
Figure 5Y:
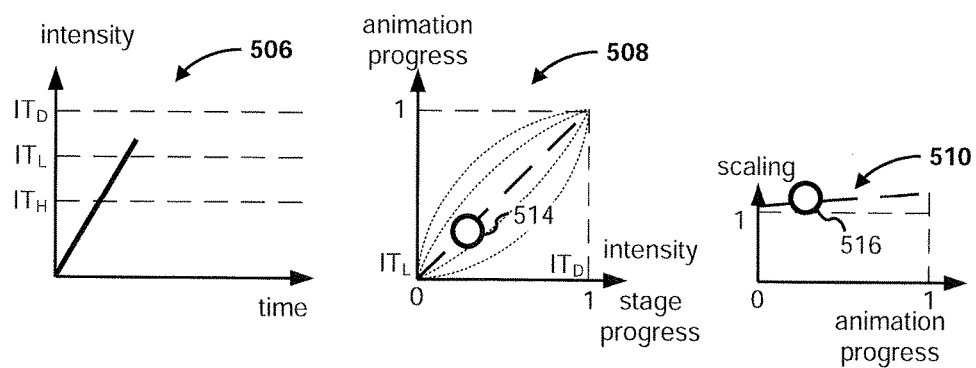

FIG. 5Y shows that the intensity of user input 509 exceeds the intensity threshold $IT_L$, and user interface object 532 (e.g., a preview window) is displayed (e.g., user interface object 532 is laid over a portion of the previously displayed user interface). FIG. 5Y is similar to FIG. 5Q described above. For brevity, the detailed description of this user interface is not repeated herein.

Figure 5Z:
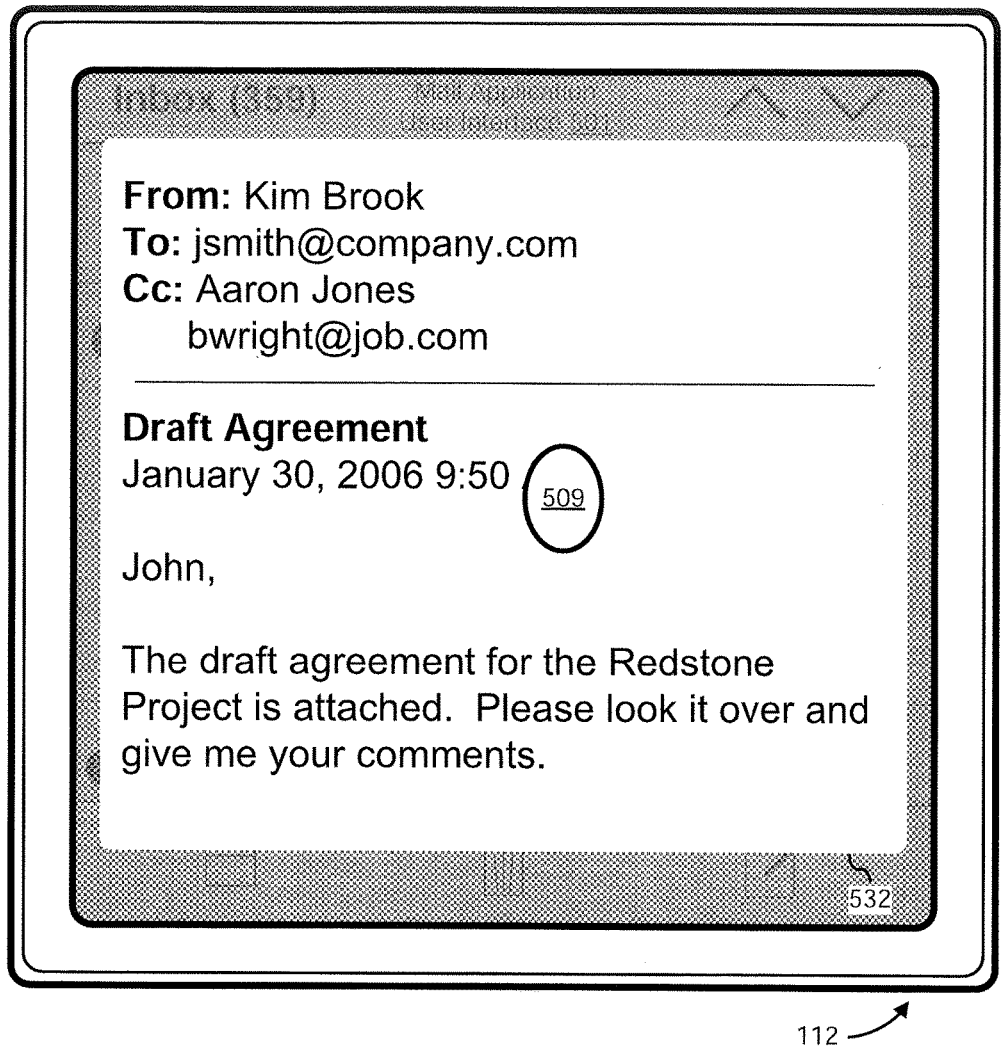
Figure 5Z:
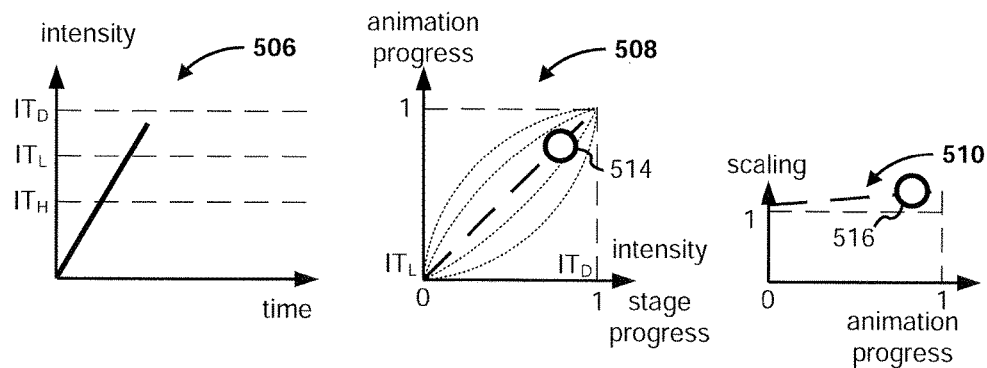
Figure 5A:
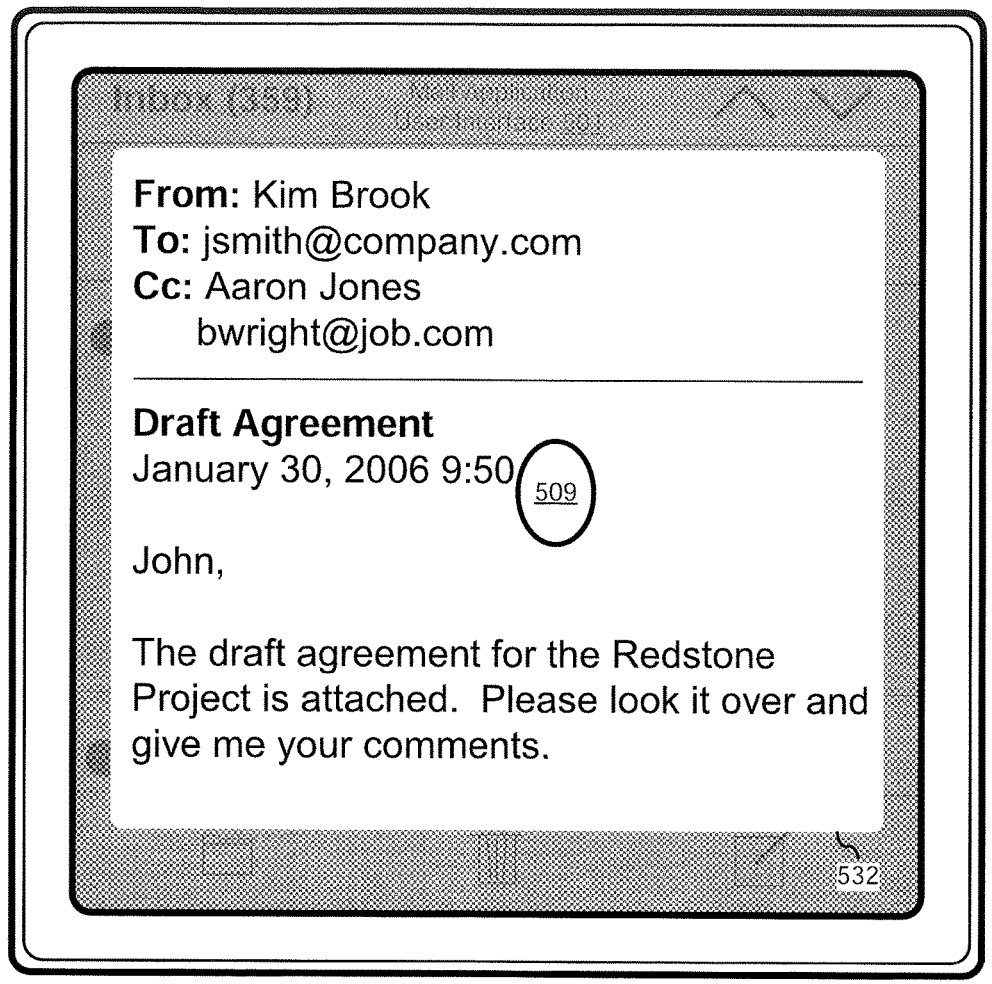
Figure 5A:
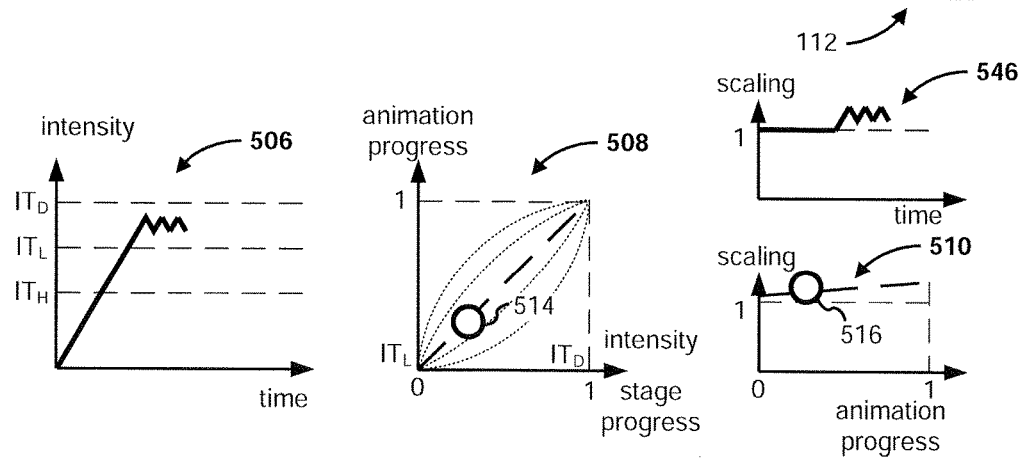
Figure 5B:
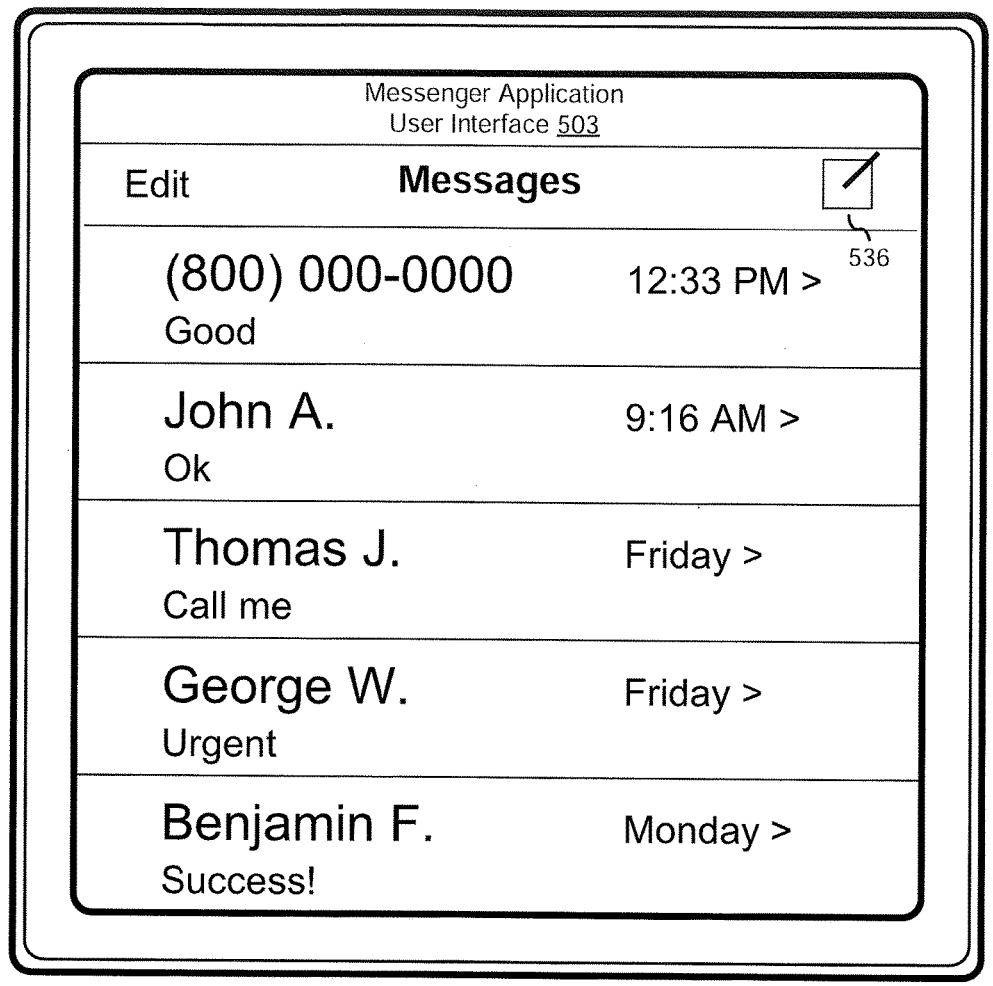
Figure 5B:
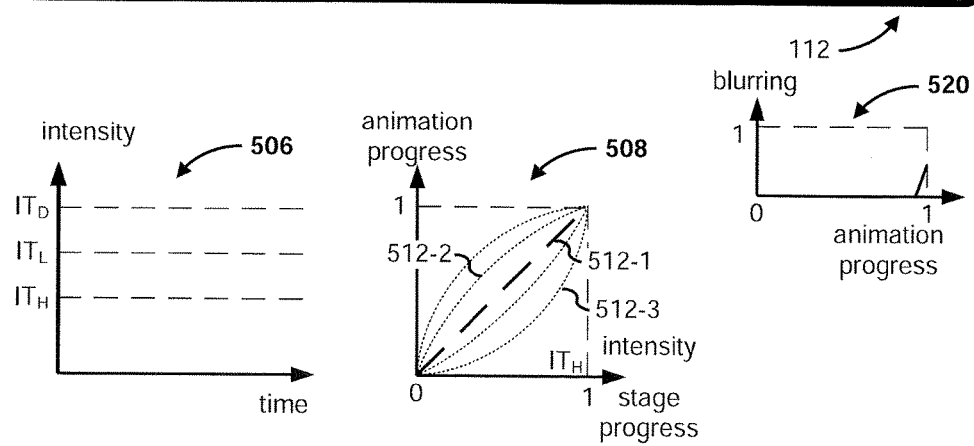
Figure 5C:
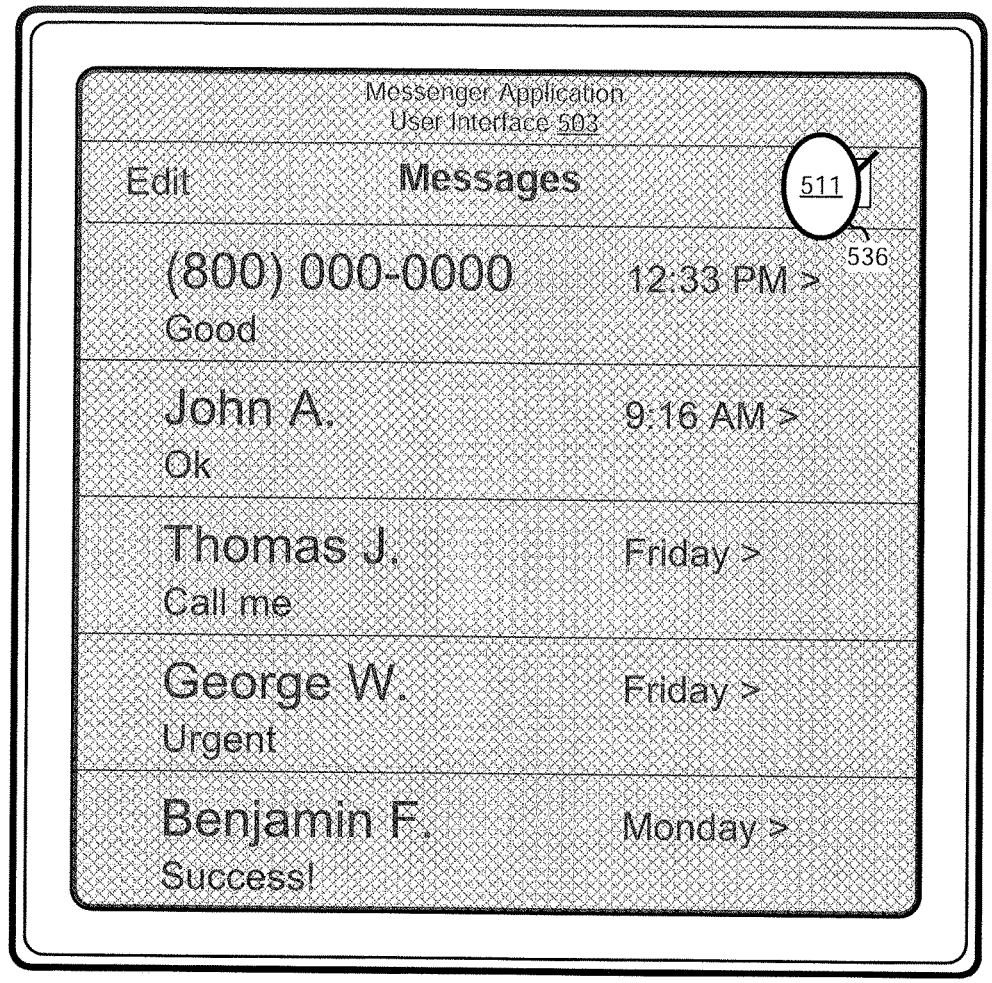
Figure 5C:
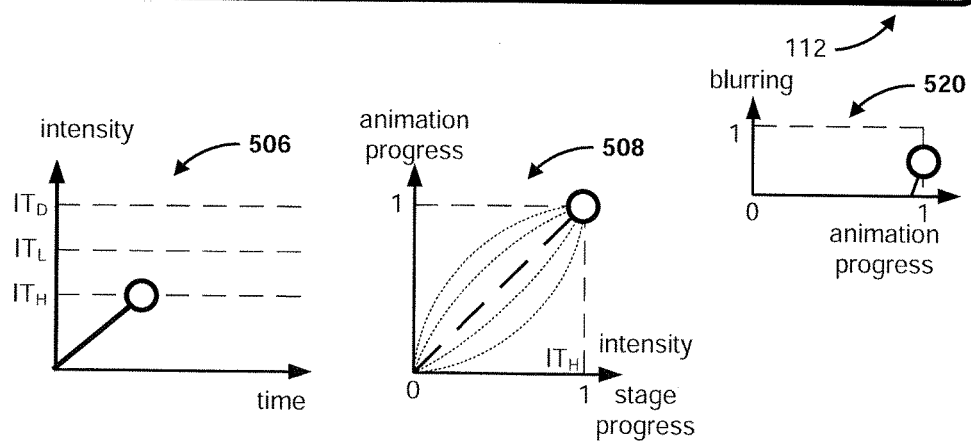
Figure 5D:
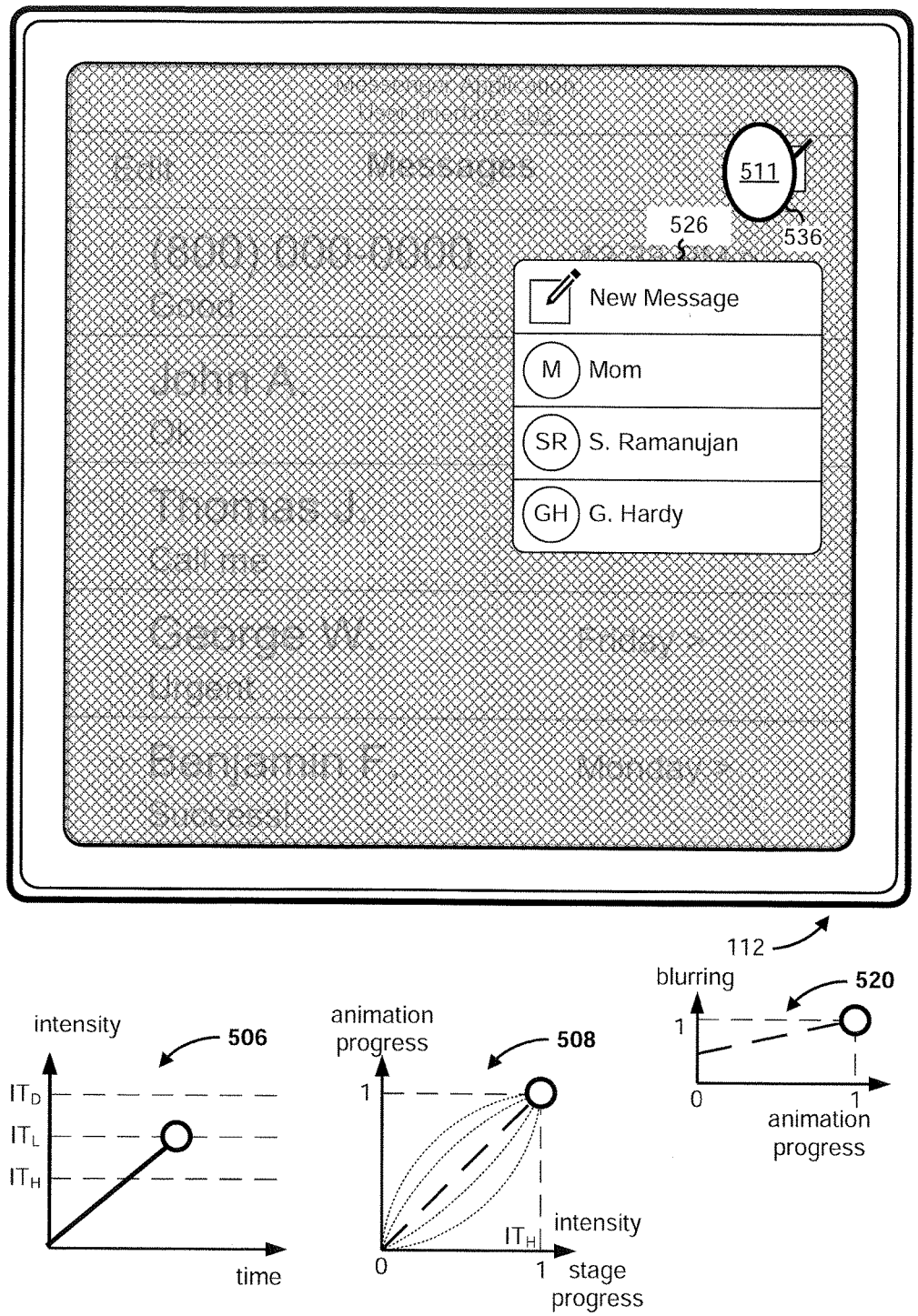
Figure 5E:
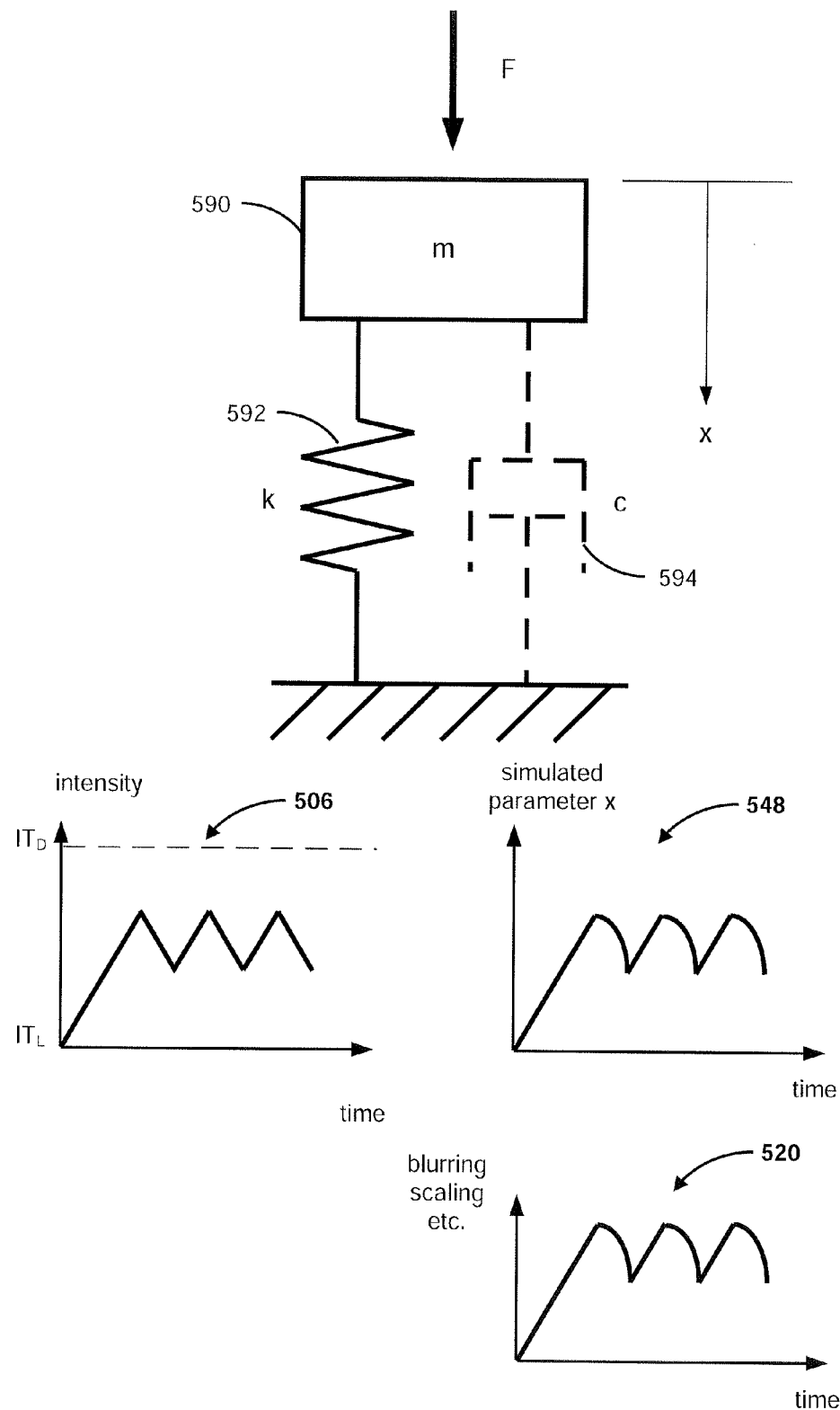
Figure 5F:
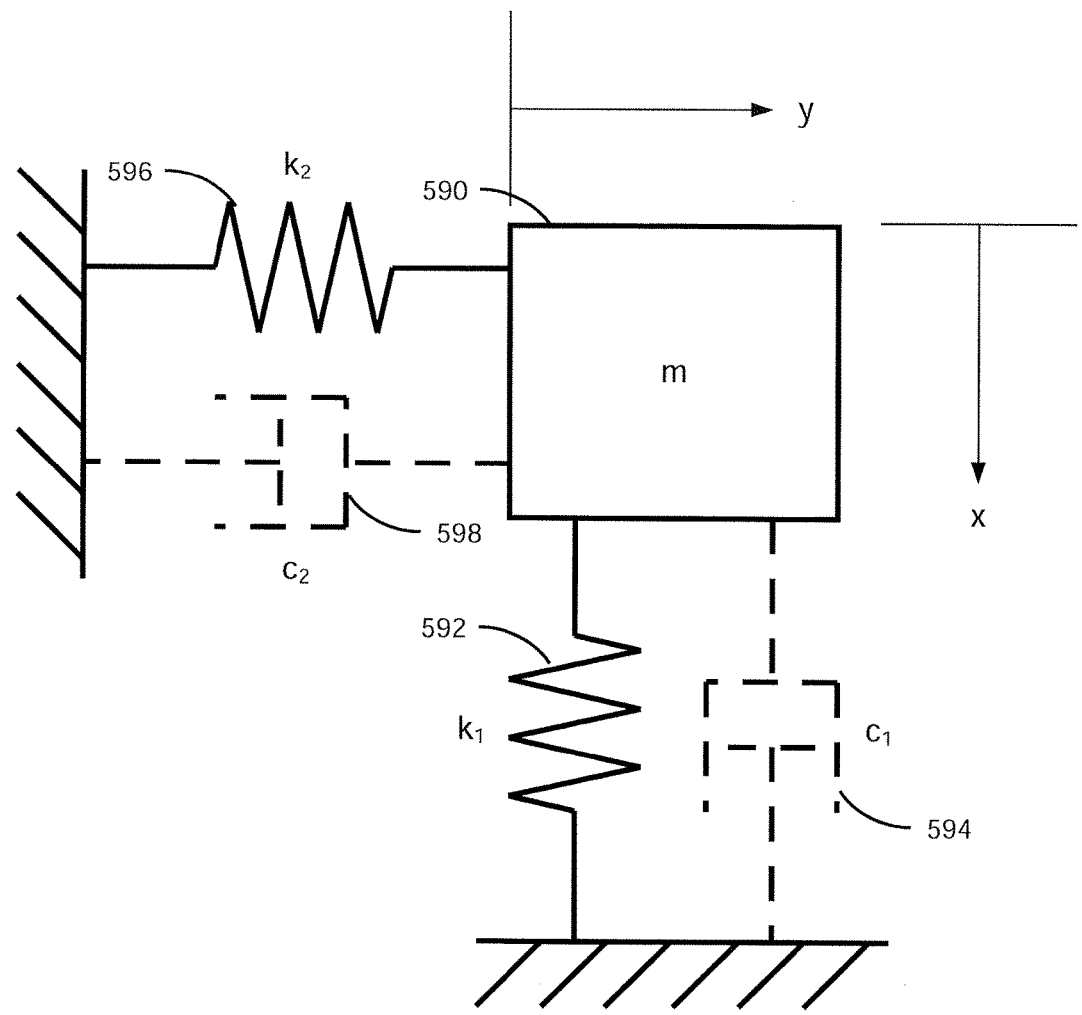
Figure 5G:
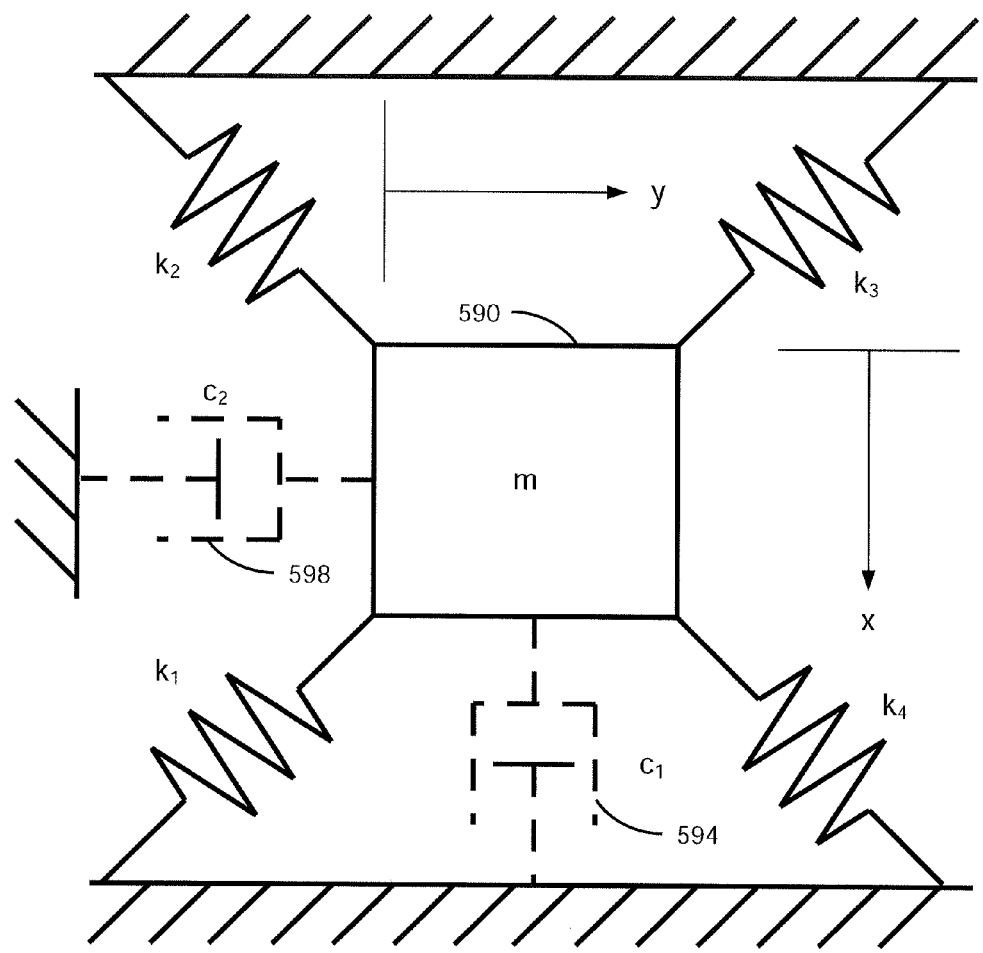
Figure 6A:
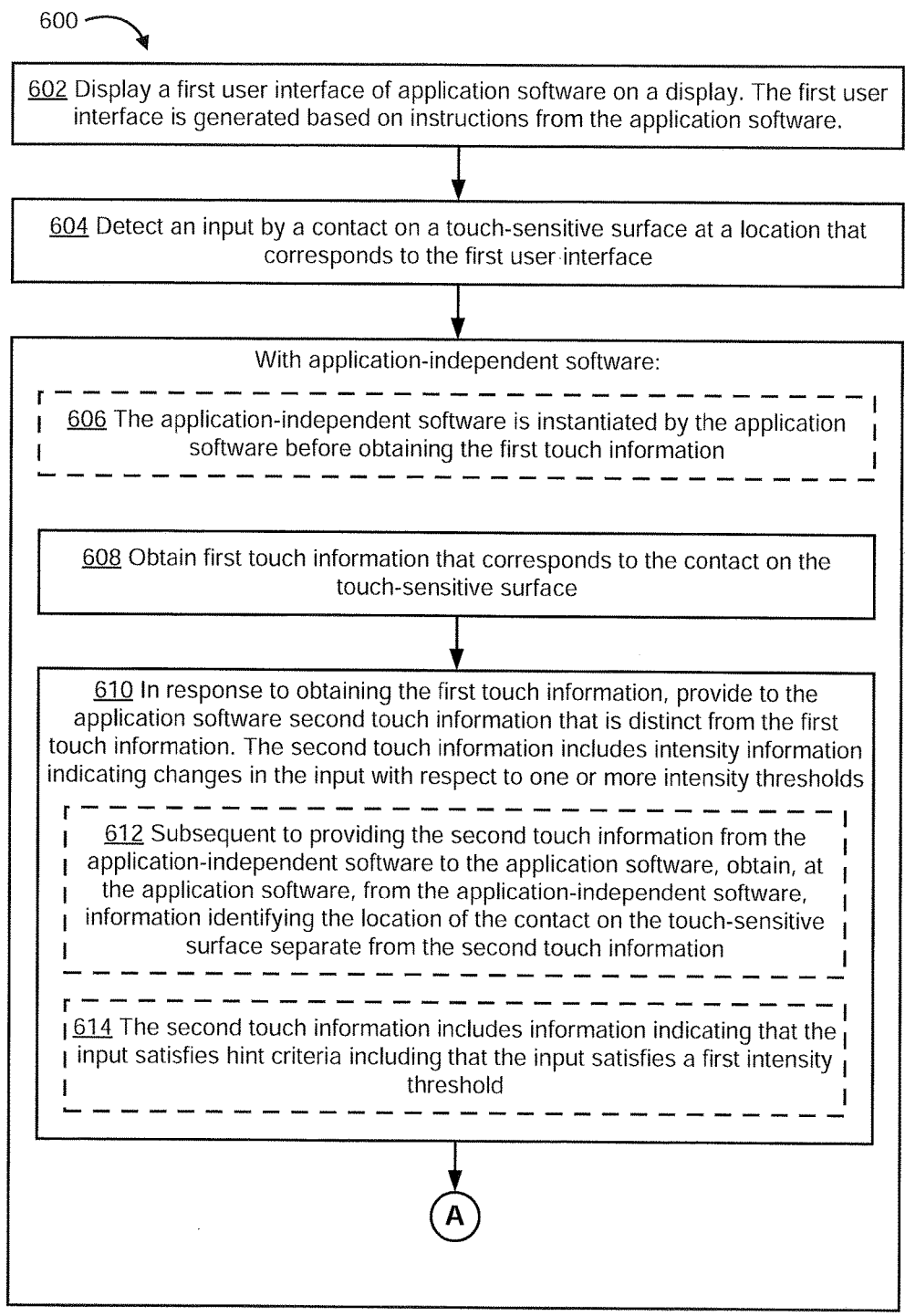
Figure 6B:
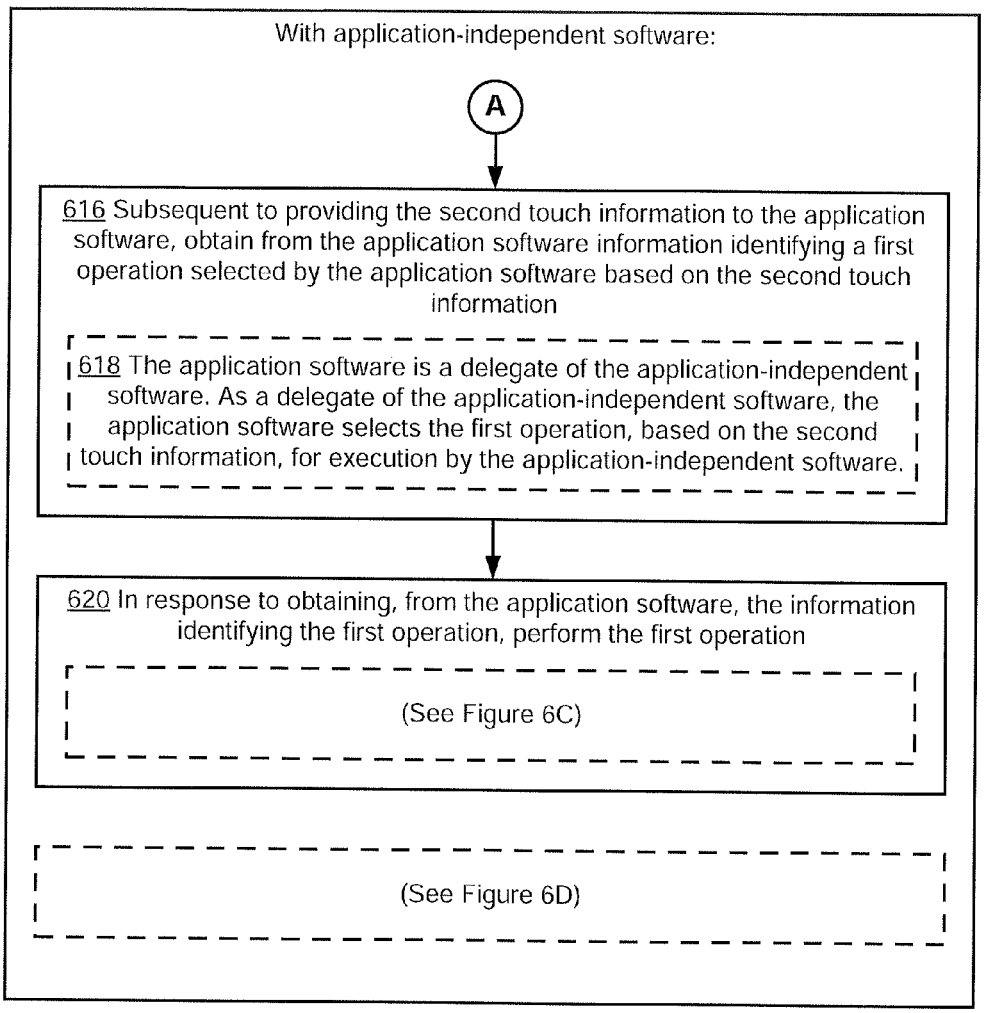

FIG. 5Z illustrates, in intensity graph 506, that the intensity of user input 509 has increased from the intensity of user input shown in FIG. 5Y. Graph 508 in FIG. 5Y represents that the animation progress value has increased, and indicator 516 in graph 510 is updated based on the changes to the animation progress value. FIG. 5Y also shows that user interface 501 is updated based on changes to the scaling factor. For example, the size of user interface object 532 increases based on the changes to the scaling factor.

FIG. 5AA illustrates, in intensity graph 506, that the intensity of user input 509 has fluctuated (e.g., increased and decreased multiple times) over time between the intensity threshold $IT_L$ and the intensity threshold $IT_D$. Graph 546 represents that the scaling factor also changes over time based on the changes to the intensity of user input 509 (and/or associated changes to the stage progress value). Accordingly, the size of user interface object 532 increases and decreases based on the changes to the intensity of user input 509. In some cases, this visually indicates that user interface object 530 is configured to respond to further changes in intensity of user input 509 (e.g., user interface object 530 is configured to expand and occupy entire user interface 501 in response to the intensity of user input 509 satisfying the intensity threshold $IT_D$).

FIGS. 5BB-5DD illustrate a transition of user interface 503 in response to an increase in intensity of a contact in accordance with some embodiments.

FIG. 5BB illustrates user interface 503 of a messenger application that includes a list of emails. User interface 503 includes user interface object 536, which, when selected (e.g., with a tap gesture), initiates displaying a user interface for composing a message.

FIG. 5CC shows that user input 511 is detected at a location on a touch-sensitive surface (e.g., touch-sensitive surface 451 or a touch-sensitive surface of a touch-screen display) that corresponds to user interface object 536. In response to detecting the intensity of user input 511 (as shown in intensity graph 506 of FIG. 5CC), an animation progress value is determined using the normalized intensity of user input 511 (e.g., the stage progress representing the normalized intensity of user input 511 at the intensity threshold $IT_H$) and the animation curve shown in graph 508, and, in turn, a blurring value (e.g., a blur radius) is determined from graph 520 based on the current animation progress value.

FIG. 5DD shows, in intensity graph 506, that the intensity of user input 511 has increased further to satisfy the intensity threshold $IT_L$. Graph 520 in FIG. 5DD represents that the blurring value has increased. FIG. 5DD also shows that user interface 503 is updated based on changes to the blurring value. User interface 503, other than user interface object 536, is blurred more (e.g., a larger blur radius is applied). In addition, user interface 503 includes user interface element 526 (e.g., a quick action menu).

FIGS. 5EE-5GG illustrate simulated physics models in accordance with some embodiments.

FIG. 5EE illustrates a simulated physics model that includes mass 590 (e.g., an object with a non-zero weight), spring 592, and optionally damper 594. In FIG. 5EE, spring 592 and damper 594 are connected in parallel to mass 590. However, in some embodiments, spring 592 and damper 594 connected in series to mass 590 are used (not shown).

In some embodiments, the physics model is used to determine a position of mass 590 at a particular moment in time (or over a series of points in time). In some cases, the position of mass 590 is measured (or determined) relative to a reference position (e.g., an initial position of mass 590 or a reference object, such as a (simulated) ground). The distance of mass 590 from the reference position is called herein a displacement (of mass 590).

In some embodiments, intensity of a touch input (e.g., the intensity of user input 509) is provided to the simulated physics model as an input. For example, the intensity of a touch input is used to determine a simulated force (F) applied to mass 590 in the simulated physics model, and the movement (or the displacement) of mass 590 is simulated. Spring 592 provides a simulated force to mass 590 that allows mass 590 to return to the reference position (or a neutral position, where the simulated force applied by spring 592 on mass 590, when mass 590 is static, is zero). Damper 594 provides resistance so that the movement of mass 590 slows down over time.

Alternatively, intensity of the touch input is provided to the simulated physics model as a conditional movement of mass 590. For example, the intensity of a touch input is treated like a forced movement of mass 590 in a single direction (and thus, the decrease in the intensity of the touch input does not pull mass 590 in the opposite direction) in the simulated physics model.

Due to the inertia of mass 590, elasticity of spring 592, and the resistance provided by damper 594, the displacement of mass 590 does not change linearly with the changes to the intensity of the user input, as shown in graph 548.

The simulated physical parameter (e.g., the displacement of mass 590) is used to determine visual display parameters (e.g., a blurring value, a scaling factor, a color change value, etc.), which are used for updating the user interface and/or providing the animated transition from one user interface to another user interface. In some embodiments, the visual display parameters are proportional to the simulated physical parameter.

For example, the simulated physical parameter is used for updating the user interface when the intensity of a user input fluctuates (e.g., as shown in FIGS. 5S-5AA). In some cases, updating the user interface linearly in response to changes to the intensity of a user input presents sudden, drastic changes to the user interface when the intensity of the user input changes significantly. Such drastic changes to the user interface can be distracting for users. Filtering the changes to the intensity of the user input with a low pass filter reduces the drastic changes to the user interface, but introduces a lag in updating the user interface. As a result, the user interface is updated with a user-observable delay after a change in the intensity of the user input, which reduces the user experience (because the user interface does not change when the user expects it to change). By utilizing a simulated physical parameter (e.g., displacement of a mass in a mass-and-spring system), the user interface is updated gradually (e.g., without sudden, drastic changes to the user interface) while the user interface remains responsive to any changes to the intensity of the user input (e.g., the delay between changes to the user input and the updates to the user interface is reduced or eliminated) while exhibiting physically intuitive behaviors such as inertia, damping, friction, and oscillation.

As explained above, FIG. 5EE illustrates a one-dimensional mass-and-spring system. In some other embodiments, a mass-and-spring system of a higher dimension is used. For example, FIG. 5FF illustrates a two-dimensional mass-and-spring system. Such systems may be used for simulating two or more parameters (e.g., one simulated physical parameter is used to determine visual display parameters and a second simulated physical parameter is used to determine a movement of a user interface object across the display). Alternatively, two separate one-dimensional mass-and-spring systems are used to simulate two parameters. While the examples above are given with reference to a one spring system and a two spring system, other arrangements of masses and springs are contemplated. For example, a three or four spring system (e.g., the four spring system illustrated in FIG. 5GG) where springs are arranged on opposite sides of the mass can provide beneficial damping and stabilization features that create a more intuitive physical system that responds within a narrow range of predictable values. In principle, any number of springs and masses can be used, however additional springs and/or masses included in a physics simulation increase the computational cost (e.g., time and energy to calculate updates to the system) and can reduce the responsiveness of a user interface relying on the physics simulation. Thus, in balancing between a stabilized system and an efficient system, a small number of springs (e.g., 3-5 springs) is frequently used in the physics simulation.

FIGS. 6A-6D are flow diagrams illustrating method 600 of processing inputs in accordance with some embodiments. Method 600 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, method 600 provides an enhanced way to process inputs using an application-independent software module. Processing inputs using application-independent software based on information from application software provides common user interface framework that provides consistent user experience when various software applications are used. Providing a common user interface frame work to the user enhances the usability of such software applications and the device executing such software applications. In turn, this enhances the operability of the device and makes the user-device interface more efficient (e.g., by helping the user to provide proper inputs and reducing user mistakes and/or unintended operations when operating/interacting with the device). In addition, the method reduces the size of software applications and makes execution of such software applications faster. For battery-operated electronic devices, enabling a user to use software applications faster and more efficiently conserves power and increases the time between battery charges.

The device stores (e.g., in memory) application software (e.g., a first software application, such as application 1 (136-1) in FIG. 1C) and application-independent software (e.g., application-independent software module 220-1 in FIG. 1C) that is available for use by a plurality of software applications (e.g., the first software application, such as application 1 (136-1), and one or more other software applications, such as application 2 (136-2) in FIG. 1C) on the electronic device (e.g., the electronic device stores the plurality of software applications).

The device displays (602) a first user interface of the application software on the display. The first user interface is generated based on instructions from the application software. For example, user interface 501 of a mail application shown in FIG. 5K is displayed on touch-sensitive display system 112. User interface 501 is configured by the mail application (e.g., instructions in the mail application define how user interface 501 is to be configured).

The device detects (604) an input by a contact on the touch-sensitive surface at a location that corresponds to the first user interface (e.g., user input 509 in FIG. 5L is detected on user interface 501).

In some embodiments, the application-independent software is instantiated (606) by the application software before obtaining the first touch information (e.g., during runtime). For example, as shown in FIGS. 1E-1G, instance 220-1 of the application-independent software is created prior to obtaining touch information from contact/motion module 130.

The device, with the application-independent software, obtains (608) first touch information that corresponds to the contact on the touch-sensitive surface (e.g., as shown in FIG. 1G, application-independent software module 220-1 receives touch information 272 from contact/motion module 130).

The device, with the application-independent software, in response to obtaining the first touch information, provides (610) to the application software second touch information that is distinct from the first touch information (e.g., touch information 274). In some embodiments, touch information 272 includes raw intensity of a touch input, which is not included in touch information 274. The second touch information includes intensity information indicating changes in the input with respect to one or more intensity thresholds. In some embodiments, in FIG. 1G, the second touch information (e.g., touch information 274) includes stage information 262 and/or progress indicator 264. In some embodiments, stage information 262 indicates an intensity range that the intensity of the touch input falls in. For example, in some cases, stage information 262 indicates whether the intensity of the touch input is below the intensity threshold $IT_H$ (called herein "stage 0"), between the intensity threshold $IT_H$ and the intensity threshold $IT_L$ (called herein "stage 1"), between the intensity threshold $IT_L$ and the intensity threshold $IT_D$ (called herein "stage 2"), or above the intensity threshold $IT_D$ (called herein "stage 3"). Progress indicator 264 represents normalized intensity of the touch input. In some embodiments, progress indicator 264 represents normalized intensity of the touch input within a current intensity stage. For example, when the intensity of the touch input falls within stage 1, progress indicator 264 represents normalized intensity of the touch input between the intensity threshold $IT_H$ and the intensity threshold $IT_L$ (e.g., intensity of the touch input corresponding to the intensity threshold $IT_H$ has a normalized intensity value of 0 and intensity of the touch input corresponding to the intensity threshold $IT_L$ has a normalized intensity value of 1, while the touch input is in intensity stage 1). When the intensity of the touch input falls within stage 2, progress indicator 264 represents normalized intensity of the touch input between the intensity threshold $IT_L$ and the intensity threshold $IT_D$ (e.g., intensity of the touch input corresponding to the intensity threshold $IT_L$ has a normalized intensity value of 0 and intensity of the touch input corresponding to the intensity threshold $IT_D$ has a normalized intensity value of 1, while the touch input is in intensity stage 2).

In some embodiments, the device, subsequent to providing the second touch information from the application-independent software to the application software, obtains (612), at the application software, from the application-independent software, information (e.g., location information 276 in FIG. 1G) identifying the location of the contact on the touch-sensitive surface separate from the second touch information. The location information is used to select an operation to be performed by the application-independent software. For example, when the location of the contact corresponds to a user interface object that is configured to respond to the contact, the application-independent software selects an operation associated with the user interface object. In some embodiments, when the location of the contact corresponds to a user interface object that is not configured to respond to the contact, the application-independent software does not select any operation, or selects a null operation. In some embodiments, subsequent to providing the second touch information from the application-independent software to the application software, the application software provides to the application-independent software a request for the information identifying the location of the contact on the touch-sensitive surface, and, in response to the request for the information identifying the location of the contact on the touch-sensitive surface, the application-independent software provides to the application software the information identifying the location of the contact on the touch-sensitive surface.

In some embodiments, the second touch information provided by the application-independent software to the application software identifies (or includes) the location of the contact on the touch-sensitive surface. In some embodiments, the location of the contact on the touch-sensitive surface is provided to the application software independent of the application-independent software (e.g., the location of the contact on the touch-sensitive surface is provided directly from contact/motion module 130 to the application software).

In some embodiments, the second touch information includes (614) information indicating that the input satisfies hint criteria including that the input satisfies a first intensity threshold (e.g., $IT_H$) (and optionally a duration threshold as described with respect to FIGS. 4C-4E). For example, touch information 274 in FIG. 1G includes stage information indicating that the user input is in stage 1, which satisfies the hint criteria (based on the intensity and/or duration of the user input).

The device, with the application-independent software, subsequent to providing the second touch information to the application software, obtains (616, FIG. 6B) from the application software information identifying a first operation selected by the application software based on the second touch information (e.g., operation information 278 in FIG. 1G includes selection of a hint operation, such as blurring of the background).

In some embodiments, the first operation is distinct from a system-defined hint operation based on parameters provided by the application software. For example, the application software provides one or more parameters to customize the hint operation (e.g., the application software selects to change the color of a user interface object when the system-default hint operation does not include changing the color of the user interface object, and/or the application software selects animation curve 512-2 or 512-3 instead of system-default animation curve 512-1). In some embodiments, the application software uses the system-default animation curve for system-default behavior (e.g., hint behavior) but picks a custom start and end states for the animation, and the application-independent module drives the animation between the custom start and end states using the system-default animation curve, so that the animation has a same feeling as the system-default behavior (e.g., the hint behavior), and if the system-default behavior is updated (e.g., via an operating system update that changes the system-default animation curve), the custom animation is also updated to have the same feeling as the updated system-default behavior.

In some embodiments, the application software is (618) a delegate of the application-independent software. As used herein, a delegate of a particular software component refers to a set of instructions configured to control operations of the particular software component. For example, the delegate of the particular software component determines (or selects) one or more operations based on information provided to the delegate, and the particular software component carries out the one or more operations based on the determination (or selection) by the delegate. As a delegate of the application-independent software, the application software selects the first operation, based on the second touch information, for execution by the application-independent software.

The device, with the application-independent software, in response to obtaining, from the application software, the information identifying the first operation, performs (620) the first operation (e.g., hint operation, as illustrated in FIGS. 5M-5O). In some embodiments, performing the first operation includes displaying an image corresponding to image data received by the application-independent software from the application software. Thus, the application-independent software is application-independent despite the fact that the first operation displays application-specific information (e.g., the user interface of the application software). In some embodiments, the application-independent software provides the same services to multiple applications (e.g., see FIG. 1C).

In some embodiments, the first operation includes (622, FIG. 6C) visually distinguishing at least a portion of the first user interface from another portion of the first user interface (e.g., blurring a portion of the first user interface, as illustrated in FIG. 5N).

In some embodiments, the first operation includes (624) transitioning at least a portion of the first user interface from a first state defined by the application software to a second state defined by the application software (e.g., a blur radius applied to a portion of user interface 501 changes between a first blur radius applied to the user interface in FIG. 5M to a second blur radius applied to the user interface in FIG. 5O). This enables the application to define a custom animation that has a same feeling as the system behaviors, thereby maintaining a consistent user experience that reduces user confusion and creates a more efficient human-machine interface.

In some embodiments, the first operation includes (626) transitioning the portion of the first user interface from the first state defined by the application software to the second state defined by the application software using animation curves defined by the application-independent software (e.g., a mapping of changes in intensity to progression from a start to an end of the animation, such as animation curve 512-1 in FIG. 5K). Because the application-independent software performs the transition, the workload on the application software is reduced. In addition, the size of the application software is reduced and the structure of the application software is simplified.

In some embodiments, the device, while, or subsequent to, performing the first operation: in accordance with a determination that the input has been canceled, provides (628) from the application-independent software to the application software information indicating that the touch has been canceled (e.g., touch cancel 226 in FIG. 1J); subsequent to providing the information indicating that the touch has been canceled to the application software, obtains, at the application-independent software, from the application software, information (e.g., operation information 228 in FIG. 1J) identifying a fourth operation selected by the application software based on the information indicating that the touch has been canceled (e.g., an undo operation reversing the blurring); and, in response to obtaining from the application software the information identifying the fourth operation, with the application-independent software, performs the fourth operation (e.g., the device removes the blurring on the user interface).

In some embodiments, the device, while, or subsequent to, performing the first operation: with the application-independent software, continues (630) to monitor the input; and, while the application-independent software is monitoring the input, in accordance with a determination that the input has been canceled (e.g., at application core 1 (230-1) in FIG. 1K), provides from the application software (or its application core) to the application-independent software information indicating that the touch has been canceled (e.g., touch cancel 232). The device, subsequent to providing from the application software to the application-independent software information indicating that the touch has been canceled, ceases, at the application-independent software, to monitor the input.

In some embodiments, the device, subsequent to providing to the application software the second touch information, detects (632, FIG. 6D) an increase in an intensity of the contact on the touch-sensitive surface. The device, with the application-independent software, obtains third touch information (e.g., touch information 282 in FIG. 1H) that corresponds to the contact with the increased intensity on the touch-sensitive surface; and, in accordance with a determination that the increased intensity of the input satisfies preview criteria including that the input satisfies a second intensity threshold (e.g., $IT_L$) that is higher than the first intensity threshold (e.g., $IT_H$), provides to the application software fourth touch information (e.g., touch information 284 in FIG. 1H) that is distinct from the third touch information. The fourth touch information includes information indicating that the input satisfies the preview criteria.

For example, touch information 284 in FIG. 1H includes stage information indicating that the user input is in stage 2, which satisfies the hint criteria (based on the intensity and/or duration of the user input). The device, with the application-independent software, subsequent to providing the fourth touch information to the application software, obtains from the application software information (e.g., operation information 288 in FIG. 1H) identifying a second operation selected by the application software based on the fourth touch information; and, in response to obtaining from the application software information identifying the second operation, performs the second operation (e.g., preview operation, such as displaying a preview window as illustrated in FIG. 5O).

In some embodiments, the second operation is distinct from a system-defined preview operation based on parameters provided by the application software. For example, the application software provides one or more parameters to customize the preview operation (e.g., the application software selects to change the shape of the preview window from the system-default preview window (e.g., from a system-default rectangle to a square or a circle, or a rectangle with a different corner radius), and/or the application software selects animation curve 512-2 or 512-3 instead of system-default animation curve 512-1). Thus, the application software can specify a customized operation, based on the system-defined framework. The customized operation can provide information in a manner more suitable for the application software. However, because the customization is based on the system-default framework, the user interface behaves similarly to the system-default behaviors. Thus, a user would be able to interact with the software application more easily and efficiently.

In some embodiments, the second operation includes (634) overlaying a preview area on a portion of the first user interface (e.g., user interface object 532 in FIG. 5O).

In some embodiments, the device, subsequent to providing to the application software the fourth touch information, detects (636) a further increase in an intensity of the contact on the touch-sensitive surface. The device, with the application-independent software, obtains fifth touch information (e.g., touch information 292 in FIG. 1I) that corresponds to the contact with the increased intensity on the touch-sensitive surface; and, in accordance with a determination that the further increased intensity of the input satisfies commit criteria including that the input satisfies a third intensity threshold (e.g., $IT_D$) that is distinct from the first intensity threshold ($IT_H$) and the second intensity threshold (e.g., $IT_L$), provides to the application software sixth touch information (e.g., touch information 294 in FIG. 1I) that is distinct from the fifth touch information. The sixth touch information includes information indicating that the input satisfies the commit criteria. The device, with the application-independent software, subsequent to providing the sixth touch information to the application software, obtains from the application software information (e.g., operation information 298 in FIG. 1I) identifying a third operation selected by the application software based on the fifth touch information; and, in response to obtaining from the application software information identifying the third operation, performs the third operation (e.g., commit operation, such as replacing the first user interface with a user interface shown in the preview area as illustrated in FIG. 5R).

In some embodiments, the third operation is distinct from a system-defined commit operation based on parameters provided by the application software. For example, the application software provides one or more parameters to customize the commit operation (e.g., the application software selects tactile output that is distinct from the system-default tactile output that is generated when the commit operation is initiated).

In some embodiments, the third operation includes (638) replacing display of the first user interface with a second user interface that is distinct from the first user interface (e.g., see FIG. 5R). In some embodiments, the second user interface includes content displayed in the preview area (e.g., see FIGS. 5Q and 5R). In some embodiments, the third operation includes ceasing to display the preview area (e.g., user interface object 532 is not displayed separately as a user interface object that is laid over a background).

In some embodiments, the electronic device is coupled (640) with one or more tactile output devices. The device, with the application-independent software, initiates the one or more tactile output devices to output (or generate) a tactile output in response to a determination that an intensity of the input has changed between a first state not satisfying intensity threshold of the one or more intensity thresholds and a second state satisfying the intensity threshold of the one or more intensity thresholds (e.g., in FIG. 5O, the device generates tactile output 528 in response to a determination that the intensity of the input has changed from below the intensity threshold $IT_L$ to the intensity threshold $IT_L$). This enables the application to generate tactile outputs under the same conditions that tactile outputs are generated for system animations without using the same system animations, thereby maintaining a consistent user experience that reduces user confusion and creates a more efficient human-machine interface.

In some embodiments, touch information sent from the application-independent software to the application software includes (642, FIG. 6B) a progress indicator (e.g., progress indicator 264 in FIG. 1G) that represents changes to intensity of the input.

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 600 described above with respect to FIGS. 6A-6D. For example, the contacts, gestures, user interface objects, tactile outputs, intensity thresholds, animations, software components (e.g., application software and application-independent software), and operations described above with reference to method 600 optionally have one or more of the characteristics of the contacts, gestures, user interface objects, tactile outputs, intensity thresholds, animations, software components, and operations described herein with reference to other methods described herein (e.g., methods 700 and 800). For brevity, these details are not repeated here.

Figure 7A:
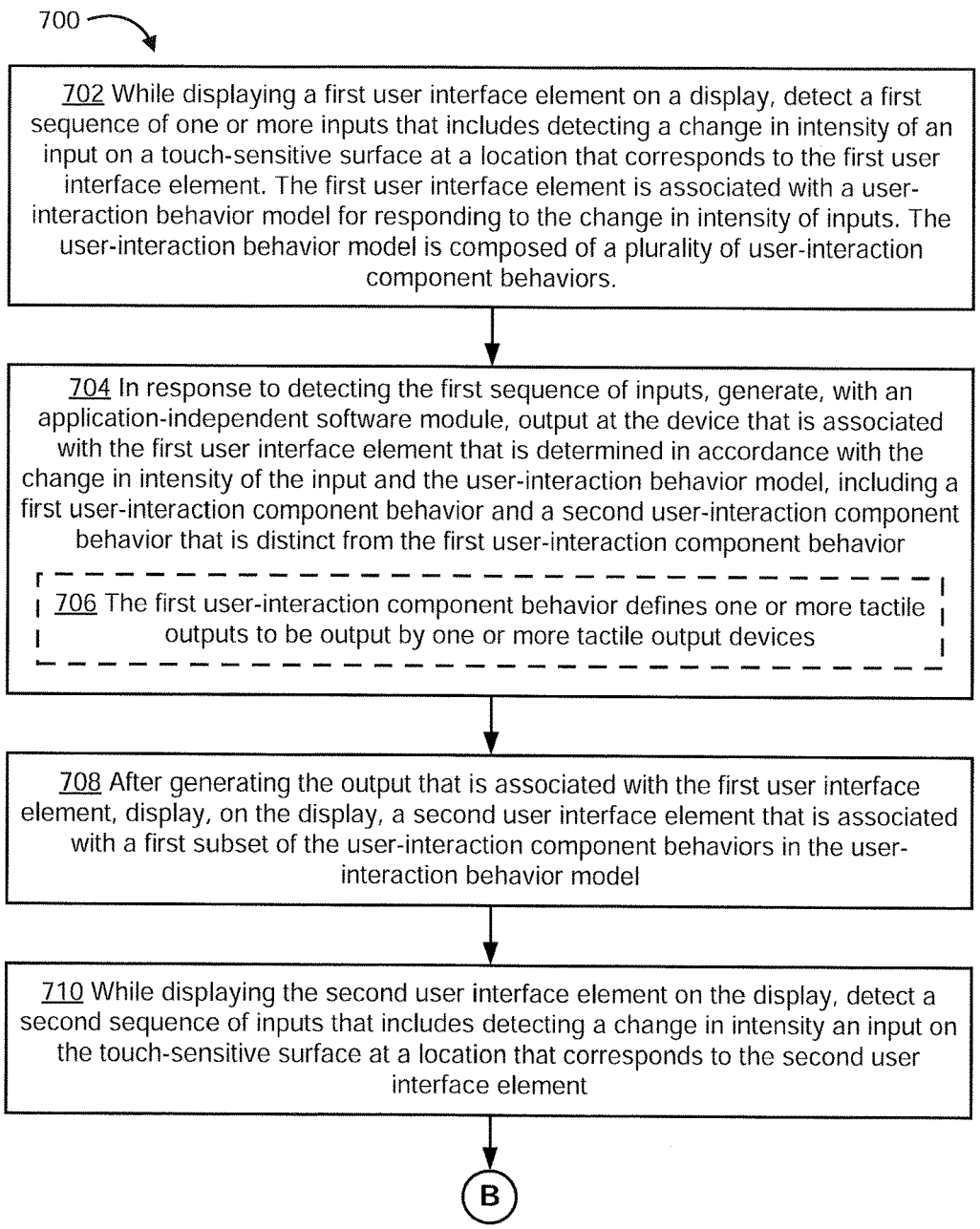
Figure 7B:
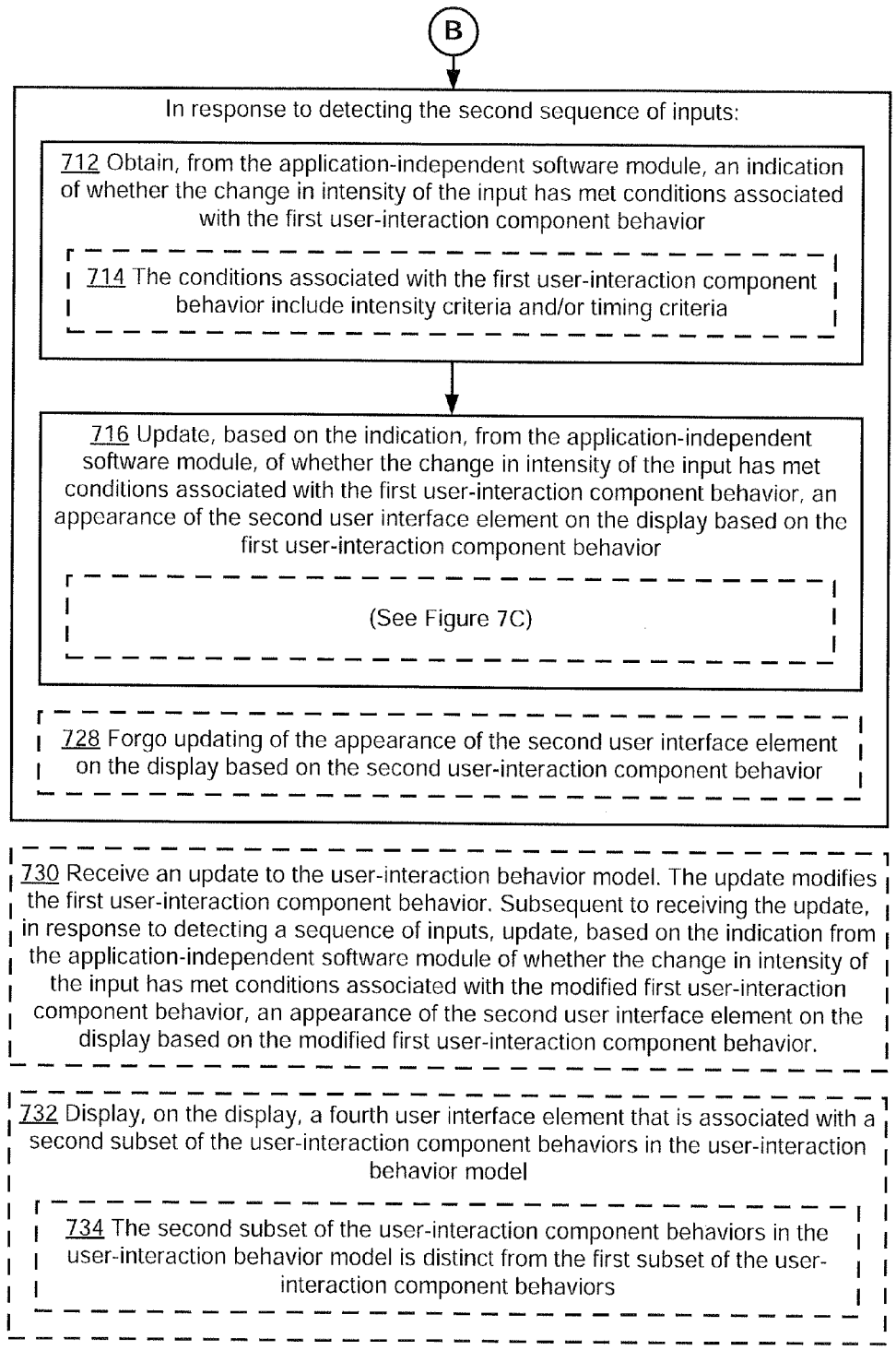
Figure 8A:
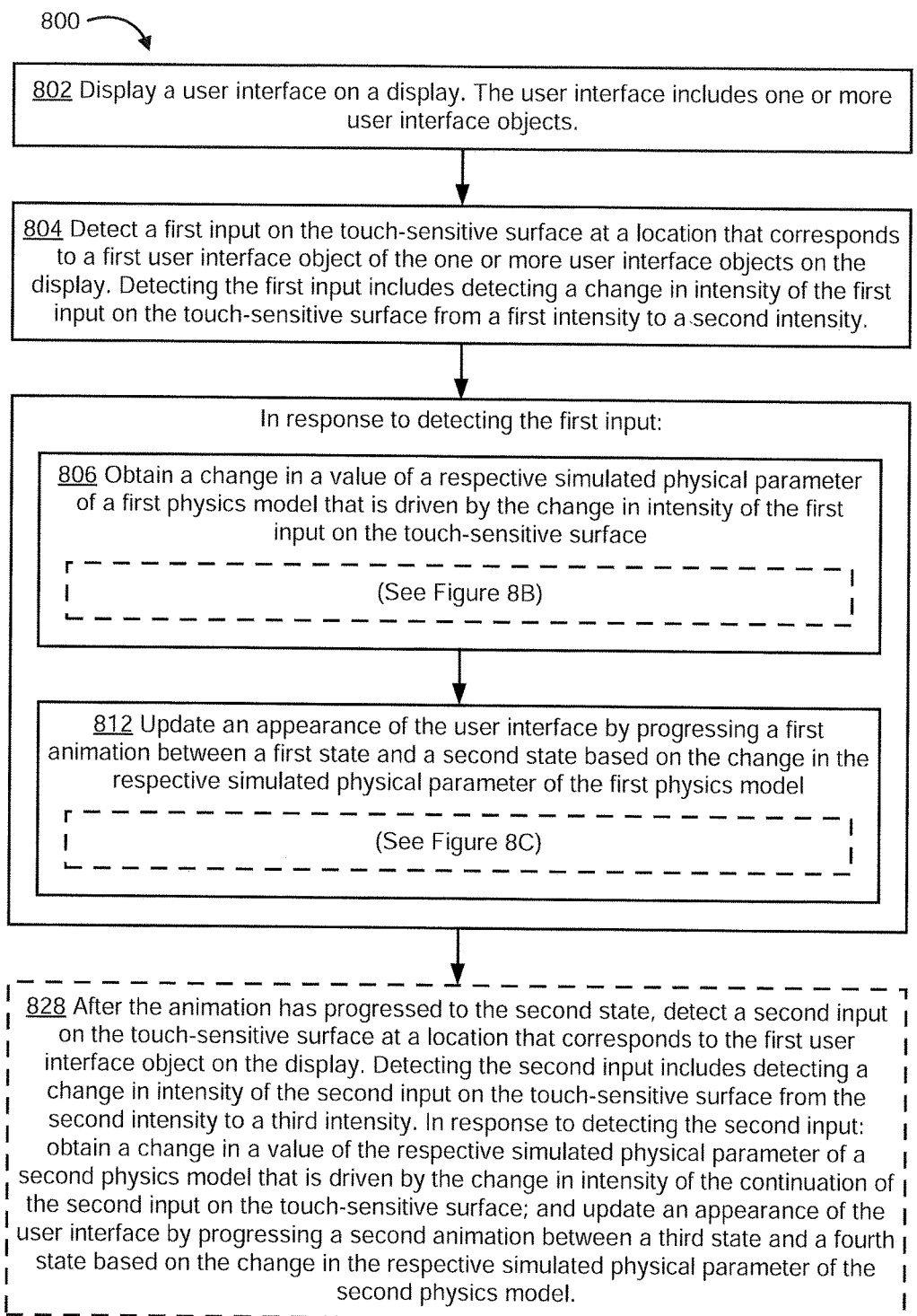

FIGS. 7A-7C are flow diagrams illustrating method 700 of processing inputs in accordance with some embodiments. Method 700 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, method 700 provides an enhanced way to process inputs. Method 700 provides subscription-based operations of software applications and an application-independent software module, which reduce the size of software applications and makes execution of such software applications faster. In addition, method 700 provides an intuitive common framework for processing inputs, thereby creating more efficient human-machine interface for users to learn and use. For battery-operated electronic devices, enabling a user to learn and use software applications faster and more efficiently conserves power and increases the time between battery charges.

The device, while displaying a first user interface element on the display, detects (702) a first sequence of one or more inputs that includes detecting a change in intensity of an input on the touch-sensitive surface at a location that corresponds to the first user interface element (e.g., in FIG. 5L, the device, while displaying user interface 501 of a mail application, detects user input 509 at a location that corresponds to user interface object 530). The first user interface element (e.g., an icon or row in a table view in a first party application on the device) is associated with a user-interaction behavior model (e.g., peek and pop) for responding to the change in intensity of inputs (e.g., user interface object 530 is configured for a peek-and-pop operation, including a preview operation, as illustrated in FIGS. 5L-5R). The user-interaction behavior model is composed of a plurality of user-interaction component behaviors (e.g., a hint behavior, a peek (or preview) behavior, a pop (or commit) behavior, etc.).

The device, in response to detecting the first sequence of inputs, generates (704), with an application-independent software module (e.g., application-independent software module 220-1 in FIG. 1G), output at the device that is associated with the first user interface element that is determined in accordance with the change in intensity of the input and the user-interaction behavior model, including a first user-interaction component behavior and a second user-interaction component behavior that is distinct from the first user-interaction component behavior (e.g., display a hint followed by displaying a peek platter (or a preview window) as shown in FIGS. 5L-5O).

In some embodiments, the first user-interaction component behavior defines (706) one or more tactile outputs to be output by one or more tactile output devices (e.g., a tactile output that is generated using one or more tactile output generators 167 when intensity of user input 509 satisfies the intensity threshold $IT_L$, as shown in FIG. 5E). In some embodiments, the method includes outputting the one or more tactile outputs using the one or more tactile output devices (e.g., in accordance with a determination that the change in intensity of the input has met the conditions associated with the first user-interaction component behavior).

The device, after generating the output that is associated with the first user interface element, displays (708), on the display, a second user interface element that is associated with a first subset of the user-interaction component behaviors in the user-interaction behavior model (e.g., the first user-interaction component behavior but not the second user-interaction component behavior). For example, user interface object 536 in FIG. 5BB is associated with the first user-interaction component behavior (e.g., a hint operation), but not the second user-interaction component behavior (e.g., a preview operation as illustrated in FIG. 5O). User interface object 536 in FIG. 5BB is also associated with a third user-interaction component behavior (e.g., a quick action menu operation as illustrated in FIG. 5DD), but user interface object 530 in FIG. 5L is not configured with the third user-interaction component behavior. Thus, the second user interface element behaves differently from the first user interface element, thereby providing customized operations that are better suited for the second user interface element. However, because the customization is performed within the system-defined framework, this enables the application to define a custom animation that has a same feeling as the system behaviors, thereby maintaining a consistent user experience that reduces user confusion and creates a more efficient human-machine interface.

In some embodiments, the first user interface element is part of a user interface of a first application (e.g., the first user interface element is rendered by the first application) and the second user interface element is part of a user interface of a second application that is distinct from the first application (e.g., the second user interface element is rendered by the second application). For example, user interface object 530 in FIG. 5K is part of user interface 501 rendered by a mail application and user interface object 536 in FIG. 5BB is part of user interface 503 rendered by a messenger application.

In some embodiments, displaying the second user interface element includes ceasing to display the first user interface element (e.g., launching a messenger application initiates replacing user interface 501 with display of user interface 503). In some embodiments, displaying the second user interface element includes displaying the second user interface element concurrently with at least a portion of the first user interface element.

In some embodiments, the first user interface element and the second user interface element are included in a single user interface.

The device, while displaying the second user interface element on the display, detects (710) a second sequence of inputs that includes detecting a change in intensity of an input on the touch-sensitive surface at a location that corresponds to the second user interface element (e.g., in FIG. 5CC, the device, while displaying user interface 503, detects user input 511 at a location that corresponds to user interface object 536).

The device, in response to detecting the second sequence of inputs obtains (712, FIG. 7B), from the application-independent software module, an indication of whether the change in intensity of the input has met conditions associated with the first user-interaction component behavior (e.g., in FIG. 5CC, user input 511 has satisfied the intensity threshold $IT_H$ for the hint behavior).

In some embodiments, the conditions associated with the first user-interaction component behavior include (714) intensity criteria and/or timing criteria. For example, as shown in FIGS. 4C-4E, the conditions associated with the hint behavior (e.g., hint criteria) are based on the intensity and timing of the user input.

The device updates (716), based on the indication from the application-independent software module of whether the change in intensity of the input has met conditions associated with the first user-interaction component behavior, an appearance of the second user interface element on the display based on the first user-interaction component behavior (e.g., in FIG. 5CC, one or more portions of user interface 503 are blurred).

In some embodiments, the device, in response to detecting the second sequence of inputs, in accordance with a determination that the change in intensity of the input has not met the conditions associated with the first user-interaction component behavior, forgoes (718, FIG. 7C) updating of the appearance of the second user interface element on the display based on the first user-interaction component behavior. For example, when intensity of the user input does not satisfy an intensity threshold for the first user-interaction component behavior or a duration of the user input does not satisfy a duration threshold for the first user-interaction component behavior, the appearance of the second user interface element is not updated based on the first user-interaction component behavior (e.g., when intensity of user input 511 is below the intensity threshold $IT_H$, the blurring effect is not applied to user interface 503).

In some embodiments, the first user-interaction component behavior includes (720) one or more animation curves based on which the appearance of the second user interface element on the display is updated (e.g., animation curves 512-1, 512-2, and 512-3, in FIG. 5K, one of which is selected for updating user interface object 530). In some embodiments, the one or more animation curves define updates to an appearance of a user interface element as a function of the (raw or normalized) intensity of the input (or the change in the intensity of the input). For example, the one or more animation curves define how an animation displayed on the display should progress as the intensity of the input changes. In some embodiments, the one or more animation curves are defined by the application-independent software module. Thus, even when a plurality of applications define distinct custom animations, such custom animations have a same feeling as the system behaviors, thereby maintaining a consistent user experience that reduces user confusion and creates a more efficient human-machine interface.

In some embodiments, updating the appearance of the second user interface element includes (722) displaying a third user interface element that is distinct from the second user interface element (e.g., a quick-action-menu, such as user interface object 526 in FIG. 5DD), and the first user-interaction component behavior defines whether the third user interface element is to remain on display in response to the input in the second sequence of inputs ceases to be detected. For example, the first user-interaction component indicates whether the quick action menu should remain on display only until termination of the input (e.g., liftoff of a contact from the touch-sensitive surface) or the quick action menu should be maintained on display even after the termination of the input. In another example, the second user-interaction component indicates whether a preview area (or window) should remain on display only until termination of the input (e.g., liftoff of a contact from the touch-sensitive surface) or the preview area should be maintained even after the termination of the input.

In some embodiments, the first user-interaction component behavior includes (724) a predefined animation (e.g., an animation defined in the application-independent software module, such as blurring one or more portions of user interface 503 with an increasing blur radius, as illustrated in FIGS. 5CC-5DD).

In some embodiments, updating the appearance of the second user interface element on the display based on the first user-interaction component behavior includes (726) changing, using the application-independent software module, the appearance of the second user interface element from a first display state to a second display state that is distinct from the first display state. The first display state and the second display state are defined by a software application associated with the second user interface element (e.g., the blur radius for when the intensity of the user input is at the intensity threshold $IT_H$ and the blur radius for when the intensity of the user input is at the intensity threshold $IT_L$ are defined by the software application associated with the second user interface). In some embodiments, the software application associated with the second user interface element is a second software application (e.g., a messenger application) that is distinct from the first software application (e.g., a mail application). In some embodiments, the first display state and the second display state are defined by the software application associated with the second user interface element, independent of the application-independent software module (e.g., the blur radius for when the intensity of the user input is at the intensity threshold $IT_H$ and the blur radius for when the intensity of the user input is at the intensity threshold $IT_L$ are defined by the software application associated with the second user interface independent of the application-independent software module). In some embodiments, after the first display state and the second display state are defined by the software application associated with the second user interface element, the appearance of the second user interface element is updated by the application-independent software module without further input from the software application associated with the second user interface element (e.g., once the software application provides the blur radius for when the intensity of the user input is at the intensity threshold $IT_H$ and the blur radius for when the intensity of the user input is at the intensity threshold $IT_L$ are defined by the software application associated with the second user interface independent of the application-independent software module, the application-independent software module carries out changing the blur radius based on the intensity of the user input, without requiring further inputs from the software application, thereby reducing or eliminating further operations to be performed by the software application in updating the appearance of the second user interface between the first display state and the second display state.

In some embodiments, the device, in response to detecting the second sequence of inputs, forgoes (728, FIG. 7B) updating of the appearance of the second user interface element on the display based on the second user-interaction component behavior (e.g., in FIG. 5E, the preview window is not displayed even though the intensity of the user input satisfies the intensity threshold $IT_L$). Allowing software applications to select a subset of the user-interaction component behaviors facilitates customization. Because the customization is performed within the system-defined framework, this enables the application to define a custom animation that has a same feeling as the system behaviors, thereby maintaining a consistent user experience that reduces user confusion and creates a more efficient human-machine interface.

In some embodiments, the device receives (730) an update to the user-interaction behavior model (e.g., via a system software update, such as an update to an operating system). The update modifies the first user-interaction component behavior, and the modified first user-interaction component behavior is different from the first user-interaction component behavior before modification (e.g., a different animation curve, such as animation curve 512-3, is used). The device, subsequent to receiving the update to the user-interaction behavior model, in response to detecting a sequence of inputs, updates, based on the indication from the application-independent software module of whether the change in intensity of the input has met conditions associated with the modified first user-interaction component behavior, an appearance of the second user interface element on the display based on the modified first user-interaction component behavior. Because a plurality of software application rely on the system-defined behaviors for customization, updating the user-interaction behavior model provides an easy, rapid, and efficient way to modify the behaviors of the plurality of software applications while maintaining the consistent user experience among the plurality of software application. This reduces user confusion and creates a more efficient human-machine interface.

In some embodiments, the device displays (732), on the display, a fourth user interface element that is associated with a second subset of the user-interaction component behaviors in the user-interaction behavior model (e.g., user interface object 438 that is associated with the hint behavior, but not the peek (or preview) behavior or the pop (or commit) behavior).

In some embodiments, the second subset of the user-interaction component behaviors in the user-interaction behavior model is (734) distinct from the first subset of the user-interaction component behaviors (e.g., user interface object 424 is associated with the hint behavior and the quick action menu behavior, and user interface object 438 is associated with the hint behavior only). In some embodiments, the second subset of the user-interaction component behaviors includes a user-interaction component behavior that is not included in the first subset of the user-interaction component behaviors (e.g., some user interface objects are associated with the hint behavior and the peek (or preview) behavior, which is not included in the first subset of the user-interaction component behaviors associated with user interface object 424). In some embodiments, the first subset of the user-interaction component behaviors includes a user-interaction component behavior that is not included in the second subset of the user-interaction component behaviors (e.g., the first subset of the user-interaction component behaviors associated with user interface object 424 includes a quick action menu behavior that is not included the second subset of the user-interaction component behaviors associated with user interface object 438). In some embodiments, however, the first subset of the user-interaction component behaviors and the second subset of the user-interaction component behaviors include one or more common user-interaction component behaviors (e.g., the hint behavior). In some embodiments, one of the component behaviors includes a vitality transform that adjusts an application-specified parameter of a user interface object (e.g., a size or color of a user interface object) based on a set of criteria that provide a dynamic intensity-driven animation. For example, the dynamic intensity-driven animation uses a physics model to translate the characteristic intensity of inputs on the touch-sensitive surface into displacement values, which are then used to drive the dynamic intensity-driven animation (e.g., as described in greater detail below with reference to method 800).

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 800) are also applicable in an analogous manner to method 700 described above with respect to FIGS. 7A-7C. For example, the contacts, gestures, user interface objects, tactile outputs, intensity thresholds, animations, software components, and operations described above with reference to method 700 optionally have one or more of the characteristics of the contacts, gestures, user interface objects, tactile outputs, intensity thresholds, animations, software components, and operations described herein with reference to other methods described herein (e.g., methods 600 and 800). For brevity, these details are not repeated here.

FIGS. 8A-8C are flow diagrams illustrating method 800 of processing inputs in accordance with some embodiments. Method 800 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, method 800 provides an intuitive way to process inputs. Intensity-based visual indication of provides the user with visual feedback about whether a particular user interface object is capable of responding to changes (or an increase) in intensity of an input. Providing the improved visual feedback to the user enhanced the operability of the device and makes the user-device more efficient (e.g., by helping the user to provide proper inputs and reducing user mistakes and/or unintended operations when operating/interacting with the device). For battery-operated electronic devices, enabling a user to interact with user interface objects faster and more efficiently conserves power and increases the time between battery charges.

The device displays (802) a user interface on the display (e.g., user interface 501 in FIG. 5S). The user interface includes one or more user interface objects (e.g., user interface object 530).

The device detects (804) a first input on the touch-sensitive surface at a location that corresponds to a first user interface object of the one or more user interface objects on the display (e.g., user input 509 in FIG. 5S at a location that corresponds to user interface object 530). Detecting the first input includes detecting a change in intensity of the first input on the touch-sensitive surface from a first intensity to a second intensity.

The device, in response to detecting the first input, obtains (806) a change in a value of a respective simulated physical parameter of a first physics model that is driven by the change in intensity of the first input on the touch-sensitive surface (e.g., a simulated displacement of mass 590, in FIG. 5EE, that is driven by the change in intensity of user input 509).

In some embodiments, the first physics model is (808, FIG. 8B) a mass and spring model.

In some embodiments, the respective simulated physical parameter is (810) displacement of a simulated mass (e.g., displacement x in FIG. 5EE). While the preceding examples have been given with respect to a simulated mass in a physics model with a mass and spring, other physics models could be used with similar smoothing effects (e.g., a physics model based on the interaction of masses with gravity or electromagnetic fields).

The device, in response to detecting the first input, updates (812, FIG. 8A) an appearance of the user interface by progressing a first animation between a first state and a second state based on the change in the respective simulated physical parameter of the first physics model (e.g., the user interface transitions during the hint operation based on the simulated physical parameter, rather than responding directly to the intensity of the user input). By using the simulated physical parameter, instead of the detected intensity of the first input, the device can provide a smoothing effect (e.g., based on an inertial movement of a mass) that appears more natural for users, thereby providing an improved user experience.

In some embodiments, obtaining the change in the value of the respective simulated physical parameter includes (814, FIG. 8C) updating the first physics model using the change in intensity of the first input on the touch-sensitive surface from the first intensity to the second intensity. Updating the first physics model includes changing one or more simulated physical parameters of the first physics model in accordance with the change in intensity of the first input (e.g., the change in intensity of the first input is applied as a simulated force (or a change in simulated force) to mass 590 in the simulated physics model, as shown in FIG. 5EE). Obtaining the change in the value of the respective simulated physical parameter also includes measuring a change in the respective simulated physical parameter of the one or more simulated physical parameters of the first physics model (e.g., displacement of mass 590 is determined after providing the simulated force based on the change in intensity of the first input).

In some embodiments, the first physics model is updated (816) repeatedly as the intensity of the first input changes. The change in the respective simulated physical parameter responds dynamically to changes in the intensity of the first input (e.g., as shown in FIG. 5EE, as the intensity of the first input changes repeatedly over time, the simulated physical parameter also changes repeatedly over time). Updating the appearance of the user interface includes repeatedly updating the appearance of the user interface as the respective simulated physical parameter responds dynamically to changes in the intensity of the first input.

In some embodiments, progressing the animation includes (818) updating a value of a respective display parameter (e.g., a blurring value, a scale factor, a color value, etc.) of an object displayed in the user interface. The respective simulated physical parameter of the object is different from the respective simulated physical parameter of the first physics model (e.g., the parameter of the physics model is displacement of a mass, and the display parameter is a size of a user interface element or a blur radius).

In some embodiments, progressing the animation includes (820) changing a size of the first user interface object (e.g., the size of user interface object 532 in FIGS. 5Y-5AA).

In some embodiments, progressing the animation includes (822) changing a blur radius of a background of the user interface (e.g., the changes to the blur radius shown in FIGS. 5V-5X).

In some embodiments, progressing the animation includes (824) changing a size of a background of the user interface (e.g., the changes to the size of the background as shown in FIGS. 5B-5D).

In some embodiments, the user interface is (826) a user interface of an application that includes application software that is specific to the application (e.g., application 1 (136-1), such as a mail application in FIG. 1G). The physics model is defined by application-independent software (e.g., application-independent software module 220-1 in FIG. 1G). The first state and second state of the animation are defined by the application software (e.g., the mail application defines how a preview window is to be displayed during the preview operation, and the application-independent software carries out the transition from the first state to the second state without further input from the application software).

In some embodiments, the device, after the animation has progressed to the second state, detects (828, FIG. 8A) a second input (e.g., a continuation of the first input, such as a continuation of user input 509 in FIG. 5O) on the touch-sensitive surface at a location that corresponds to the first user interface object on the display. Detecting the second input includes detecting a change in intensity of the second input on the touch-sensitive surface from the second intensity to a third intensity. The device, in response to detecting the second input, obtains a change in a value of the respective simulated physical parameter of a second physics model that is driven by the change in intensity of the continuation of the second input on the touch-sensitive surface. In some embodiments, the first physics model is the same as the second physics model. In some embodiments, the first physics model and the second physics model share the same structure but have one or more different constants (e.g., different spring constants for the springs or different coefficients of friction for the mass). This allows the first animation and the second animation to have a similar feeling, even though they may not progress exactly the same. This maintains a consistent user experience that reduces user confusion and creates a more efficient human-machine interface. The device, in response to detecting the second input, updates an appearance of the user interface by progressing a second animation between a third state and a fourth state based on the change in the respective simulated physical parameter of the second physics model (e.g., the user interface transitions during the preview operation based on the simulated physical parameter, rather than responding directly to the intensity of the user input). In some embodiments, transitioning between the first physics model and the second physics model includes changing a property of the physics model and allowing the physics model to react to the change. For example, when the difference between two physics models is a spring coefficient, the spring coefficient is changed instantaneously at whatever state the physics model is in (e.g., with the mass slightly displaced from a rest position), and the physics model responds smoothly to the change by continuing to move the mass based on the current state of the physics model and the new spring coefficient. Other differences between mass and spring physics models include changing a size of the mass, a length of the springs, a location of the attachment points of the springs relative to the resting position of the mass.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 700) are also applicable in an analogous manner to method 800 described above with respect to FIGS. 8A-8C. For example, the contacts, gestures, user interface objects, tactile outputs, intensity thresholds, animations, software components, and operations described above with reference to method 900 optionally have one or more of the characteristics of the contacts, gestures, user interface objects, tactile outputs, intensity thresholds, animations, software components, and operations described herein with reference to other methods described herein (e.g., methods 600 and 700). For brevity, these details are not repeated here.

Figure 9:
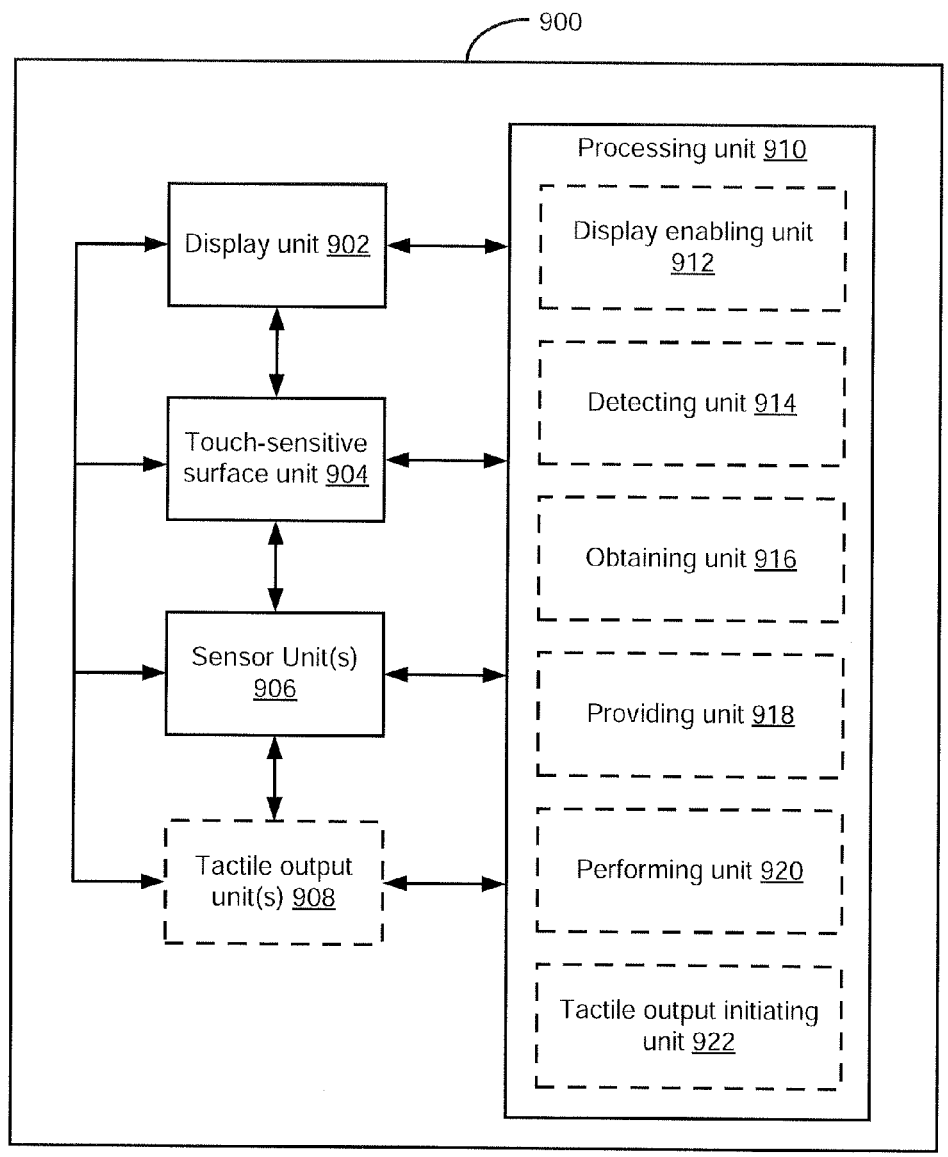
FIGS. 9-11 are functional block diagrams of respective electronic devices in accordance with some embodiments.

In accordance with some embodiments, FIG. 9 shows a functional block diagram of an electronic device 900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, electronic device 900 includes display unit 902 configured to display a user interface, touch-sensitive surface unit 904 configured to receive contacts, one or more sensor units 906 configured to detect intensity of contacts with touch-sensitive surface unit 904; and processing unit 910 coupled with display unit 902, touch-sensitive surface unit 904 and one or more sensor units 906. In some embodiments, electronic device 900 also includes one or more tactile output units 908, and processing unit 910 is coupled with one or more tactile output units 908. In some embodiments, the processing unit 910 includes: display enabling unit 912, detecting unit 914, obtaining unit 916, providing unit 918, performing unit 920, and/or tactile output initiating unit 922.

In some embodiments, processing unit 910 is configured to: enable display (e.g., with display enabling unit 912 (or an application-specific portion of display enabling unit 912) and/or display unit 902) of a first user interface of application software, wherein the first user interface is generated based on instructions from the application software; and detect (e.g., with detecting unit 914 and/or touch-sensitive surface unit 904) an input by a contact on the touch-sensitive surface unit at a location that corresponds to the first user interface. Processing unit 910 is also configured to, with application-independent software that is available for use by a plurality of software applications on electronic device 900: obtain (e.g., with obtaining unit 916) first touch information that corresponds to the contact on the touch-sensitive surface unit; in response to obtaining the first touch information, provide (e.g., with providing unit 918) to the application software second touch information that is distinct from the first touch information, wherein the second touch information includes intensity information indicating changes in the input with respect to one or more intensity thresholds; subsequent to providing the second touch information to the application software, obtain (e.g., with obtaining unit 916) from the application software information identifying a first operation selected by the application software based on the second touch information; and, in response to obtaining, from the application software, the information identifying the first operation, perform (e.g., with performing unit 920) the first operation.

In some embodiments, the first operation includes visually distinguishing (e.g., with display enabling unit 912 and/or display unit 902) at least a portion of the first user interface from another portion of the first user interface.

In some embodiments, the first operation includes transitioning (e.g., with display enabling unit 912 and/or display unit 902) at least a portion of the first user interface from a first state defined by the application software to a second state defined by the application software.

In some embodiments, the first operation includes transitioning (e.g., with display enabling unit 912 and/or display unit 902) the portion of the first user interface from the first state defined by the application software to the second state defined by the application software using animation curves defined by the application-independent software.

In some embodiments, the application-independent software is instantiated by the application software before obtaining the first touch information.

In some embodiments, the application software is a delegate of the application-independent software; and, as a delegate of the application-independent software, the application software selects the first operation, based on the second touch information, for execution by the application-independent software.

In some embodiments, processing unit 910 is further configured to, subsequent to providing the second touch information from the application-independent software to the application software, receive (e.g., with obtaining unit 916), at the application software, from the application-independent software, information identifying the location of the contact on touch-sensitive surface unit 904 separate from the second touch information.

In some embodiments, the second touch information includes information indicating that the input satisfies hint criteria including that the input satisfies a first intensity threshold.

In some embodiments, processing unit 910 is configured to, subsequent to providing to the application software the second touch information, detect (e.g., with detecting unit 914 and/or touch-sensitive surface unit 904) an increase in an intensity of the contact on touch-sensitive surface unit 904. Processing unit 910 is also configured to, with the application-independent software: receive (e.g., with obtaining unit 916) third touch information that corresponds to the contact with the increased intensity on the touch-sensitive surface unit; in accordance with a determination that the increased intensity of the input satisfies preview criteria including that the input satisfies a second intensity threshold that is higher than the first intensity threshold, send (e.g., with providing unit 918) to the application software fourth touch information that is distinct from the third touch information, wherein the fourth touch information includes information indicating that the input satisfies the preview criteria; subsequent to providing the fourth touch information to the application software, receive (e.g., with obtaining unit 916) from the application software information identifying a second operation selected by the application software based on the fourth touch information; and, in response to obtaining from the application software information identifying the second operation, perform (e.g., with performing unit 920) the second operation.

In some embodiments, the second operation includes overlaying (e.g., with display enabling unit 912 and/or display unit 902) a preview area on a portion of the first user interface.

In some embodiments, processing unit 910 is configured to, subsequent to providing to the application software the fourth touch information, detect (e.g., with detecting unit 914, touch-sensitive surface unit 904, and/or one or more sensor units 906) a further increase in an intensity of the contact on touch-sensitive surface unit 904. Processing unit 910 is also configured to, with the application-independent software: receive (e.g., with obtaining unit 916) fifth touch information that corresponds to the contact with the increased intensity on touch-sensitive surface unit 904; in accordance with a determination that the further increased intensity of the input satisfies commit criteria including that the input satisfies a third intensity threshold that is distinct from the first intensity threshold and the second intensity threshold, send (e.g., with providing unit 918) to the application software sixth touch information that is distinct from the fifth touch information, wherein the sixth touch information includes information indicating that the input satisfies the commit criteria; subsequent to providing the sixth touch information to the application software, receive (e.g., with obtaining unit 916) from the application software information identifying a third operation selected by the application software based on the fifth touch information; and, in response to obtaining from the application software information identifying the third operation, perform (e.g., with performing unit 920) the third operation.

In some embodiments, the third operation includes replacing display (e.g., with display enabling unit 912 and/or display unit 902) of the first user interface with a second user interface that is distinct from the first user interface.

In some embodiments, electronic device 900 is coupled with one or more tactile output devices (e.g., one or more tactile output units 908). Processing unit 910 is further configured to, with the application-independent software, initiate (e.g., with tactile output initiating unit 922) the one or more tactile output devices (e.g., one or more tactile output units 908) to output a tactile output in response to a determination that an intensity of the input has changed between a first state not satisfying intensity threshold of the one or more intensity thresholds and a second state satisfying the intensity threshold of the one or more intensity thresholds.

In some embodiments, processing unit 910 is further configured to, while, or subsequent to, performing the first operation: in accordance with a determination that the input has been canceled, send (e.g., with providing unit 918) from the application-independent software to the application software information indicating that the touch has been canceled; subsequent to providing the information indicating that the touch has been canceled to the application software, receive (e.g., with obtaining unit 916), at the application-independent software, from the application software, information identifying a fourth operation selected by the application software based on the information indicating that the touch has been canceled; and, in response to obtaining from the application software the information identifying the fourth operation, with the application-independent software, perform (e.g., with performing unit 920) the fourth operation.

In some embodiments, processing unit 910 is further configured to, while, or subsequent to, performing the first operation: with the application-independent software, continue to monitor (e.g., with detecting unit 914) the input; while the application-independent software is monitoring the input, in accordance with a determination that the input has been canceled, send (e.g., with providing unit 918) from the application software to the application-independent software information indicating that the touch has been canceled; and, subsequent to providing from the application software to the application-independent software information indicating that the touch has been canceled, cease (e.g., with detecting unit 914), at the application-independent software, to monitor the input.

In some embodiments, touch information sent from the application-independent software to the application software includes a progress indicator that represents changes to intensity of the input.

Figure 10:
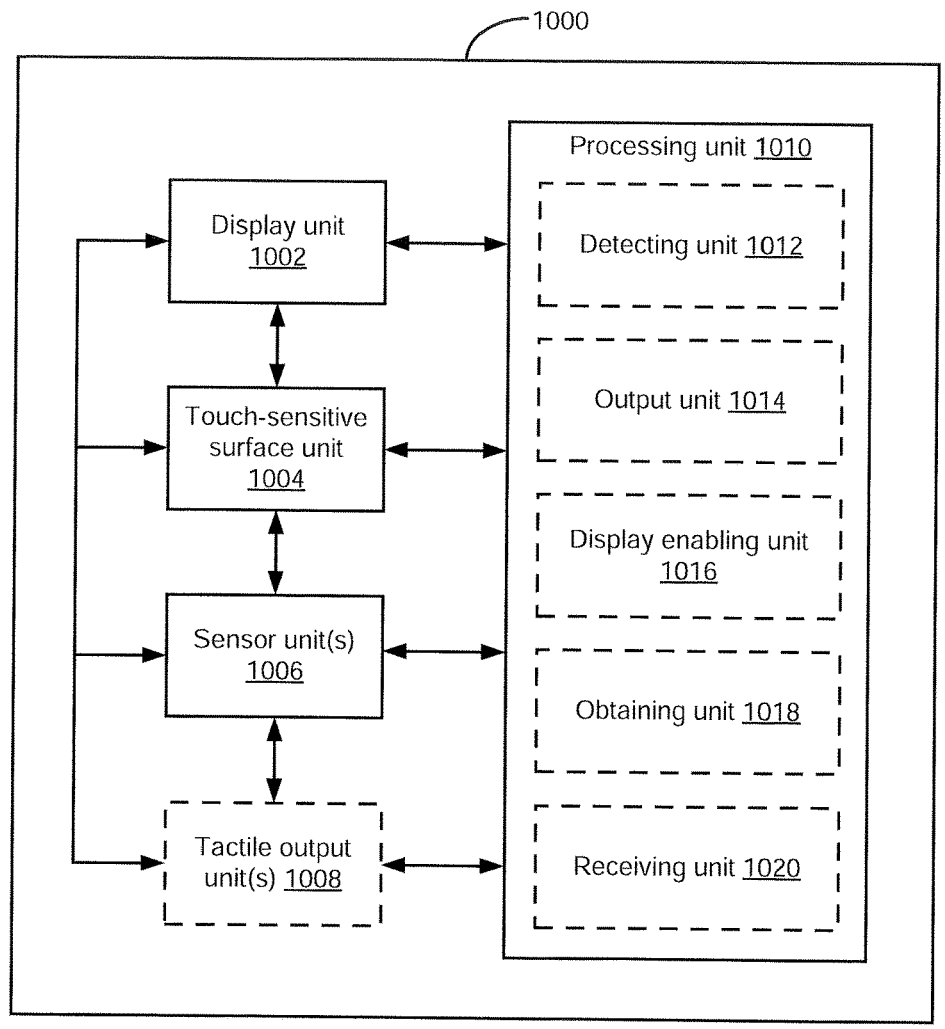

In accordance with some embodiments, FIG. 10 shows a functional block diagram of an electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, electronic device 1000 includes display unit 1002 configured to display a user interface, touch-sensitive surface unit 1004 configured to receive contacts, one or more sensor units 1006 configured to detect intensity of contacts with touch-sensitive surface unit 1004; and processing unit 1010 coupled with display unit 1002, touch-sensitive surface unit 1004 and one or more sensor units 1006. In some embodiments, electronic device 1000 also includes one or more tactile output units 1008, and processing unit 1010 is coupled with one or more tactile output units 1008. In some embodiments, processing unit 1010 includes: detecting unit 1012, output unit 1014, display enabling unit 1016, obtaining unit 1018, and/or receiving unit 1020.

Processing unit 1010 is configured to, while display unit 1002 is displaying a first user interface element, detect (e.g., with detecting unit 1012 and/or touch-sensitive surface unit 1004) a first sequence of one or more inputs, including detecting (e.g., with detecting unit 1012 and/or one or more sensor units 1006) a change in intensity of an input on the touch-sensitive surface unit at a location that corresponds to the first user interface element, wherein the first user interface element is associated with a user-interaction behavior model for responding to the change in intensity of inputs, and the user-interaction behavior model is composed of a plurality of user-interaction component behaviors. Processing unit 1010 is also configured to, in response to detecting the first sequence of inputs, generate (e.g., with output unit 1014 (or an application-independent portion of output unit 1014), display enabling unit 1016 (or an application-independent portion of display enabling unit 1016), and/or display unit 1002), with an application-independent software module, output at device 1000 that is associated with the first user interface element that is determined in accordance with the change in intensity of the input and the user-interaction behavior model, including a first user-interaction component behavior and a second user-interaction component behavior that is distinct from the first user-interaction component behavior. Processing unit 1010 is further configured to, after generating the output that is associated with the first user interface element, enable display (e.g., with display enabling unit 1016 and/or display unit 1002) of a second user interface element that is associated with a first subset of the user-interaction component behaviors in the user-interaction behavior model; while display unit 1002 is displaying the second user interface element, detect (e.g., with detecting unit 1012 and/or touch-sensitive surface unit 1004) a second sequence of inputs, including detecting (e.g., with detecting unit 1012 and/or one or more sensor units 1006) a change in intensity of an input on touch-sensitive surface unit 1004 at a location that corresponds to the second user interface element; and, in response to detecting the second sequence of inputs: obtain (e.g., with obtaining unit 1018), from the application-independent software module, an indication of whether the change in intensity of the input has met conditions associated with the first user-interaction component behavior; and update (e.g., with display enabling unit 1016 (or an application-specific portion of display enabling unit 1016) and/or display unit 1002), based on the indication from the application-independent software module of whether the change in intensity of the input has met conditions associated with the first user-interaction component behavior, an appearance of the second user interface element on the display unit based on the first user-interaction component behavior.

In some embodiments, processing unit 1010 is configured to, in response to detecting the second sequence of inputs, forgo updating (e.g., with display enabling unit 1016 and/or display unit 1002) of the appearance of the second user interface element on display unit 1002 based on the second user-interaction component behavior.

In some embodiments, the conditions associated with the first user-interaction component behavior include intensity criteria and/or timing criteria.

In some embodiments, processing unit 1010 is configured to, in response to detecting the second sequence of inputs, in accordance with a determination that the change in intensity of the input has not met the conditions associated with the first user-interaction component behavior, forgo updating (e.g., with display enabling unit 1016 and/or display unit 1002) of the appearance of the second user interface element on display unit 1002 based on the first user-interaction component behavior.

In some embodiments, the first user-interaction component behavior defines one or more tactile outputs to be output by one or more tactile output devices (e.g., one or more tactile output units 1008).

In some embodiments, the first user-interaction component behavior includes one or more animation curves based on which the appearance of the second user interface element on display unit 1002 is updated.

In some embodiments, updating the appearance of the second user interface element includes enabling display (e.g., with display enabling unit 1016 and/or display unit 1002) of a third user interface element that is distinct from the second user interface element, and the first user-interaction component behavior defines whether the third user interface element is to remain on display in response to the input in the second sequence of inputs ceases to be detected.

In some embodiments, the first user-interaction component behavior includes a predefined animation.

In some embodiments, processing unit 1010 is configured to: receive (e.g., with receiving unit 1020) an update to the user-interaction behavior model, wherein the update modifies the first user-interaction component behavior and the modified first user-interaction component behavior is different from the first user-interaction component behavior before modification; and, subsequent to receiving the update to the user-interaction behavior model, in response to detecting (e.g., with detecting unit 1012, touch-sensitive surface unit 1004, and/or one or more sensor units 1006) a sequence of inputs, update (e.g., with display enabling unit 1016 (or an application-specific portion of display enabling unit 1016) and/or display unit 1002), based on the indication from the application-independent software module of whether the change in intensity of the input has met conditions associated with the modified first user-interaction component behavior, an appearance of the second user interface element on display unit 1002 based on the modified first user-interaction component behavior.

In some embodiments, updating the appearance of the second user interface element on display unit 1002 based on the first user-interaction component behavior includes changing (e.g., with display enabling unit 1016 (or an application-independent portion of display enabling unit 1016) and/or display unit 1002), using the application-independent software module, the appearance of the second user interface element from a first display state to a second display state that is distinct from the first display state. The first display state and the second display state are defined by a software application associated with the second user interface element.

In some embodiments, processing unit 1010 is configured to enable display (e.g., with display enabling unit 1016 and/or display unit 1002) of a fourth user interface element that is associated with a second subset of the user-interaction component behaviors in the user-interaction behavior model.

In some embodiments, the second subset of the user-interaction component behaviors in the user-interaction behavior model is distinct from the first subset of the user-interaction component behaviors.

Figure 11:
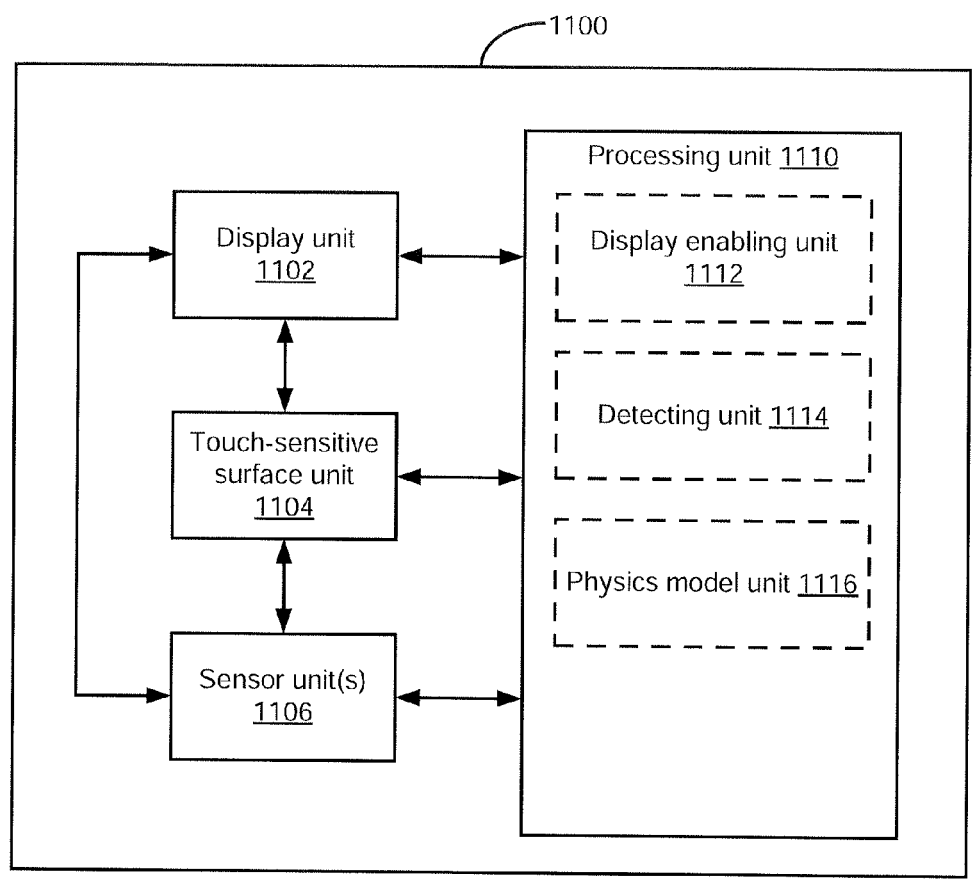

In accordance with some embodiments, FIG. 11 shows a functional block diagram of an electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, electronic device 1100 includes display unit 1102 configured to display a user interface, touch-sensitive surface unit 1104 configured to receive contacts, one or more sensor units 1106 configured to detect intensity of contacts with touch-sensitive surface unit 1104; and processing unit 1110 coupled with display unit 1102, touch-sensitive surface unit 1104 and one or more sensor units 1106. In some embodiments, processing unit 1110 includes: display enabling-unit 1112, detecting unit 1114, and/or physics model unit 1116.

Processing unit 1110 is configured to enable display (e.g., with display enabling unit 1112) of a user interface on display unit 1102, wherein the user interface includes one or more user interface objects. Processing unit 1110 is also configured to detect (e.g., with detecting unit 1114) a first input on touch-sensitive surface unit 1104 at a location that corresponds to a first user interface object of the one or more user interface objects on display unit 1102, wherein detecting the first input includes detecting a change in intensity of the first input on the touch-sensitive surface unit from a first intensity to a second intensity. Processing unit 1110 is further configured to, in response to detecting the first input: obtain (e.g., with physics model unit 1116) a change in a value of a respective simulated physical parameter of a first physics model that is driven by the change in intensity of the first input on the touch-sensitive surface unit; and update (e.g., with display enabling unit 1112 and/or display unit 1102) an appearance of the user interface by progressing a first animation between a first state and a second state based on the change in the respective simulated physical parameter of the first physics model.

In some embodiments, progressing the animation includes updating (e.g., with physics model unit 1116) a value of a respective display parameter of an object displayed in the user interface, wherein the respective simulated physical parameter of the object is different from the respective simulated physical parameter of the first physics model.

In some embodiments, the first physics model is a mass and spring model.

In some embodiments, the respective simulated physical parameter is displacement of a simulated mass.

In some embodiments, obtaining the change in the value of the respective simulated physical parameter includes: updating (e.g., with physics model unit 1116) the first physics model using the change in intensity of the first input on the touch-sensitive surface unit from the first intensity to the second intensity, wherein updating the first physics model includes changing one or more simulated physical parameters of the first physics model in accordance with the change in intensity of the first input; and measuring (e.g., with physics model unit 1116) a change in the respective simulated physical parameter of the one or more simulated physical parameters of the first physics model.

In some embodiments, the first physics model is updated repeatedly as the intensity of the first input changes. The change in the respective simulated physical parameter responds dynamically to changes in the intensity of the first input. Updating the appearance of the user interface includes repeatedly updating the appearance of the user interface as the respective simulated physical parameter responds dynamically to changes in the intensity of the first input.

In some embodiments, progressing the animation includes changing a size of the first user interface object.

In some embodiments, progressing the animation includes changing a blur radius of a background of the user interface.

In some embodiments, progressing the animation includes changing a size of a background of the user interface.

In some embodiments, processing unit 1110 is configured to, after the animation has progressed to the second state, detect (e.g., with detecting unit 1114) a second input on the touch-sensitive surface unit at a location that corresponds to the first user interface object on the display unit, wherein detecting the second input includes detecting a change in intensity of the second input on the touch-sensitive surface unit from the second intensity to a third intensity. Processing unit 1110 is also configured to, in response to detecting the second input: obtain (e.g., with physics model unit 1116) a change in a value of the respective simulated physical parameter of a second physics model that is driven by the change in intensity of the continuation of the second input on the touch-sensitive surface unit; and update (e.g., with display enabling unit 1112 and/or display unit 1102) an appearance of the user interface by progressing a second animation between a third state and a fourth state based on the change in the respective simulated physical parameter of the second physics model.

In some embodiments, the user interface is a user interface of an application that includes application software that is specific to the application. The physics model is defined by application-independent software. The first state and second state of the animation are defined by the application software.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6D, 7A-7C, and 8A-8C are, optionally, implemented by components depicted in FIGS. 1A-1B or FIGS. 9-11. For example, detection operation 604, obtain operation 608, providing operation 610, and performing operation 620 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

For example, in accordance with some embodiments, an electronic device includes a display, a touch-sensitive surface, one or more sensors to detect intensity of contacts with the touch-sensitive surface, and memory storing application software and application-independent software that is available for use by a plurality of software applications on the electronic device and defines a plurality of user-interaction component behaviors. Each user-interaction component behavior corresponds to a respective set of input criteria. The device displays a first user interface of the application software on the display. The first user interface is generated based on instructions from the application software. The device detects an input by a contact on the touch-sensitive surface at a location that corresponds to the first user interface. The device, with the application-independent software, receives from the application software a request to perform a first operation that corresponds to a first user-interaction component behavior, of the plurality of user-interaction component behaviors, for changes in the input with respect to one or more intensity thresholds (e.g., the application software sends a request to perform the first operation that corresponds to the first user-interaction component behavior in case of changes in the input with respect to one or more thresholds, such as the intensity of the input changing from below an intensity threshold to above the intensity threshold). The device, subsequent to receiving the request, detects changes in the input with respect to the one or more intensity thresholds; and, in response to detecting the changes in the input with respect to the one or more intensity thresholds, performs the first operation that corresponds to the first user-interaction component behavior, of the plurality of user-interaction component behaviors. In some embodiments, the application software sends a request to perform the first operation that corresponds to the first user-interaction component behavior based on changes in the input with respect to one or more thresholds without performing all of operations that correspond to all of the plurality of user-interaction component behaviors (e.g., one or more operations of the plurality of user-interaction component behaviors are not performed). In some embodiments, the application-independent software receives from the application software a request to forgo performing a second operation that corresponds to a second user-interaction component behavior of the plurality of user-interaction component behaviors or does not receive from the application software a request to perform the second operation that corresponds to the second user-interaction component behavior of the plurality of user-interaction component behaviors. The device forgoes performing the second operation that corresponds to the second user-interaction component behavior (even if the changes in the input satisfy input criteria for performing the second operation).

The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising: at an electronic device with a display, a touch-sensitive surface, one or more sensors to detect intensity of contacts with the touch-sensitive surface:
    displaying a first user interface of a first application, the first user interface including a first user interface element on the display;
    while displaying the first user interface, detecting a first sequence of one or more inputs that includes detecting a change in intensity of a first input on the touch-sensitive surface at a location that corresponds to the first user interface element of the first user interface, wherein the first user interface element is associated with a user-interaction behavior model, wherein the user-interaction behavior model is composed of a plurality of user-interaction component behaviors that are responsive to changes in intensities of inputs on the touch-sensitive surface, including a first user-interaction component behavior and a second user-interaction component behavior that is distinct from the first user-interaction component behavior;
    in response to detecting the first sequence of one or more inputs, generating, with an application-independent software module, output at the device that is associated with the first user interface element that is determined in accordance with the change in intensity of the first input and the user-interaction behavior model, including the first user-interaction component behavior and the second user-interaction component behavior in the user-interaction behavior model;
    after generating the output that is associated with the first user interface element, displaying, on the display, a second user interface of a second application distinct from the first application without displaying the first user interface of the first application, the second user interface including a second user interface element that is distinct from the first user interface element and is associated with a first subset of the plurality of user-interaction component behaviors in the user-interaction behavior model, wherein the first subset of the plurality of user-interaction component behaviors includes the first user-interaction component behavior and does not include the second user-interaction component behavior;
    while displaying the second user interface element on the display, detecting a second sequence of inputs that includes detecting a change in intensity of a second input on the touch-sensitive surface at a location that corresponds to the second user interface element, wherein the second sequence of inputs is distinct from and detected after the first sequence of inputs; and
    in response to detecting the second sequence of inputs:
        obtaining, from the application-independent software module, an indication of whether the change in intensity of the second input has met conditions associated with the first user-interaction component behavior; and
        updating, based on the indication from the application-independent software module of whether the change in intensity of the second input has met conditions associated with the first user-interaction component behavior, an appearance of the second user interface element on the display based on the first user-interaction component behavior.

2. The method of claim 1, including:
    in response to detecting the second sequence of inputs:
        forgoing updating of the appearance of the second user interface element on the display based on the first user-interaction component behavior.

3. The method of claim 1, wherein the conditions associated with the first user-interaction component behavior include intensity criteria and/or timing criteria.

4. The method of claim 1, including:
    in response to detecting the second sequence of inputs:
        in accordance with a determination that the change in intensity of the second input has not met the conditions associated with the first user-interaction component behavior, forgoing updating of the appearance of the second user interface element on the display based on the first user-interaction component behavior.

5. The method of claim 1, wherein the first user-interaction component behavior defines one or more tactile outputs to be output by one or more tactile output devices.

6. The method of claim 1, wherein the first user-interaction component behavior includes one or more animation curves based on which the appearance of the second user interface element on the display is updated.

7. The method of claim 1, wherein updating the appearance of the second user interface element includes displaying a third user interface element that is distinct from the second user interface element, and the first user-interaction component behavior defines whether the third user interface element is to remain on display in response to a determination that the second input in the second sequence of inputs ceases to be detected.

8. The method of claim 1, wherein the first user-interaction component behavior includes a predefined animation.

9. The method of claim 1, including:
    receiving an update to the user-interaction behavior model, wherein the update modifies the first user-interaction component behavior and the modified first user-interaction component behavior is different from the first user-interaction component behavior before modification; and,
    subsequent to receiving the update to the user-interaction behavior model, in response to detecting a sequence of inputs, updating, based on the indication from the application-independent software module of whether the change in intensity of the second input has met conditions associated with the modified first user-interaction component behavior, the appearance of the second user interface element on the display based on the modified first user-interaction component behavior.

10. The method of claim 1, wherein:
updating the appearance of the second user interface element on the display based on the first user-interaction component behavior includes changing, using the application-independent software module, the appearance of the second user interface element from a first display state to a second display state that is distinct from the first display state; and
the first display state and the second display state are defined by a software application associated with the second user interface element.

11. The method of claim 1, including:
displaying, on the display, a fourth user interface element that is associated with a second subset of the plurality of user-interaction component behaviors in the user-interaction behavior model.

12. The method of claim 11, wherein the second subset of the plurality of user-interaction component behaviors in the user-interaction behavior model is distinct from the first subset of the user-interaction component behaviors.

13. An electronic device, comprising:
a display;
a touch-sensitive surface;
one or more sensors for detecting intensity of contacts with the touch-sensitive surface;
one or more processors; memory storing application software, an application-independent software module that is available for use by a plurality of software applications on the electronic device, and instructions, configured to be executed by the one or more processors, for:
displaying a first user interface of a first application, the first user interface including a first user interface element on the display;
while displaying the first user interface, detecting a first sequence of one or more inputs that includes detecting a change in intensity of a first input on the touch-sensitive surface at a location that corresponds to the first user interface element of the first user interface, wherein the first user interface element is associated with a user-interaction behavior model, wherein the user-interaction behavior model is composed of a plurality of user-interaction component behaviors that are responsive to changes in intensities of inputs on the touch-sensitive surface, including a first user-interaction component behavior and a second user-interaction component behavior that is distinct from the first user-interaction component behavior;
in response to detecting the first sequence of one or more inputs, generating, with the application-independent software module, output at the device that is associated with the first user interface element that is determined in accordance with the change in intensity of the first input and the user-interaction behavior model, including the first user-interaction component behavior and the second user-interaction component behavior in the user-interaction behavior model;
after generating the output that is associated with the first user interface element, displaying, on the display, a second user interface of a second application distinct from the first application without displaying the first user interface of the first application, the second user interface including a second user interface element that is distinct from the first user interface element and is associated with a first subset of the plurality of user-interaction component behaviors in the user-interaction behavior model, wherein the first subset of the plurality of user-interaction component behaviors includes the first user-interaction component behavior and does not include the second user-interaction component behavior;
while displaying the second user interface element on the display, detecting a second sequence of inputs that includes detecting a change in intensity of a second input on the touch-sensitive surface at a location that corresponds to the second user interface element, wherein the second sequence of inputs is distinct from and detected after the first sequence of inputs; and
in response to detecting the second sequence of inputs:
obtaining, from the application-independent software module, an indication of whether the change in intensity of the second input has met conditions associated with the first user-interaction component behavior; and
updating, based on the indication from the application-independent software module of whether the change in intensity of the second input has met conditions associated with the first user-interaction component behavior, an appearance of the second user interface element on the display based on the first user-interaction component behavior.

14. The device of claim 13, wherein the memory stores instructions, configured to be executed by the one or more processors, for:
in response to detecting the second sequence of inputs:
forgoing updating of the appearance of the second user interface element on the display based on the first user-interaction component behavior.

15. The device of claim 13, wherein the conditions associated with the first user-interaction component behavior include intensity criteria and/or timing criteria.

16. The device of claim 13, wherein the memory stores instructions, configured to be executed by the one or more processors, for:
in response to detecting the second sequence of inputs:
in accordance with a determination that the change in intensity of the second input has not met the conditions associated with the first user-interaction component behavior, forgoing updating of the appearance of the second user interface element on the display based on the first user-interaction component behavior.

17. A non-transitory computer readable storage medium storing application software; an application-independent software module that is available for use by a plurality of software applications on an electronic device with a display, a touch-sensitive surface, and one or more sensors for detecting intensity of contacts with the touch-sensitive surface; and instructions, which, when executed by the electronic device, cause the electronic device to:
display a first user interface of a first application, the first user interface including a first user interface element on the display;
while displaying the first user interface, detect a first sequence of one or more inputs that includes detecting a change in intensity of a first input on the touch-sensitive surface at a location that corresponds to the first user interface element of the first user interface, wherein the first user interface element is associated with a user-interaction behavior model, wherein the user-interaction behavior model is composed of a plurality of user-interaction component behaviors that are responsive to changes in intensities of inputs on the touch-sensitive surface, including a first user-interaction component behavior and a second user-interaction component behavior that is distinct from the first user-interaction component behavior;

in response to detecting the first sequence of one or more inputs, generate, with an application-independent software module, output at the device that is associated with the first user interface element that is determined in accordance with the change in intensity of the first input and the user-interaction behavior model, including the first user-interaction component behavior and the second user-interaction component behavior in the user-interaction behavior model;

after generating the output that is associated with the first user interface element, display, on the display, a second user interface of a second application distinct from the first application without displaying the first user interface of the first application, the second user interface including a second user interface element that is distinct from the first user interface element and is associated with a first subset of the plurality of user-interaction component behaviors in the user-interaction behavior model, wherein the first subset of the plurality of user-interaction component behaviors includes the first user-interaction component behavior and does not include the second user-interaction component behavior;

while displaying the second user interface element on the display, detect a second sequence of inputs that includes detecting a change in intensity of a second input on the touch-sensitive surface at a location that corresponds to the second user interface element, wherein the second sequence of inputs is distinct from and detected after the first sequence of inputs; and in response to detecting the second sequence of inputs:
obtain, from the application-independent software module, an indication of whether the change in intensity of the second input has met conditions associated with the first user-interaction component behavior; and update, based on the indication from the application-independent software module of whether the change in intensity of the second input has met conditions associated with the first user-interaction component behavior, an appearance of the second user interface element on the display based on the first user-interaction component behavior.

18. The non-transitory computer readable storage medium of claim 17, wherein the computer readable storage medium also stores instructions, which, when executed by the electronic device, cause the electronic device to:
in response to detecting the second sequence of inputs:
forgo updating of the appearance of the second user interface element on the display based on the first user-interaction component behavior.

19. The non-transitory computer readable storage medium of claim 17, wherein the conditions associated with the first user-interaction component behavior include intensity criteria and/or timing criteria.

20. The non-transitory computer readable storage medium of claim 17, wherein the computer readable storage medium also stores instructions, which, when executed by the electronic device, cause the electronic device to:
in response to detecting the second sequence of inputs:
in accordance with a determination that the change in intensity of the second input has not met the conditions associated with the first user-interaction component behavior, forgo updating of the appearance of the second user interface element on the display based on the first user-interaction component behavior.

21. The method of claim 1, wherein the first user interface element is associated with a first set of features of the user-interaction behavior model that includes the first user-interaction component behavior and the second user-interaction component behavior, and the second user interface element is associated a second set of features of the user-interaction behavior model that includes the first user-interaction component behavior but not the second user-interaction component behavior.

22. The device of claim 13, wherein the first user-interaction component behavior defines one or more tactile outputs to be output by one or more tactile output devices.

23. The device of claim 13, wherein the first user-interaction component behavior includes one or more animation curves based on which the appearance of the second user interface element on the display is updated.

24. The device of claim 13, wherein updating the appearance of the second user interface element includes displaying a third user interface element that is distinct from the second user interface element, and the first user-interaction component behavior defines whether the third user interface element is to remain on display in response to a determination that the second input in the second sequence of inputs ceases to be detected.

25. The device of claim 13, wherein the first user-interaction component behavior includes a predefined animation.

26. The device of claim 13, wherein the memory further stores instructions, configured to be executed by the one or more processors, for:
receiving an update to the user-interaction behavior model, wherein the update modifies the first user-interaction component behavior and the modified first user-interaction component behavior is different from the first user-interaction component behavior before modification; and, subsequent to receiving the update to the user-interaction behavior model, in response to detecting a sequence of inputs, updating, based on the indication from the application-independent software module of whether the change in intensity of the second input has met conditions associated with the modified first user-interaction component behavior, the appearance of the second user interface element on the display based on the modified first user-interaction component behavior.

27. The device of claim 13, wherein
updating the appearance of the second user interface element on the display based on the first user-interaction component behavior includes changing, using the application-independent software module, the appearance of the second user interface element from a first display state to a second display state that is distinct from the first display state; and the first display state and the second display state are defined by a software application associated with the second user interface element.

28. The device of claim 13, wherein the memory stores instructions, configured to be executed by the one or more processors, for:
displaying, on the display, a fourth user interface element that is associated with a second subset of the plurality of user-interaction component behaviors in the user-interaction behavior model.

29. The device of claim 13, wherein the first user interface element is associated with a first set of features of the user-interaction behavior model that includes the first user-interaction component behavior and the second user-interaction component behavior, and the second user interface element is associated a second set of features of the user-interaction behavior model that includes the first user-interaction component behavior but not the second user-interaction component behavior.

30. The non-transitory computer readable storage medium of claim 17, wherein the first user-interaction component behavior defines one or more tactile outputs to be output by one or more tactile output devices.

31. The non-transitory computer readable storage medium of claim 17, wherein the first user-interaction component behavior includes one or more animation curves based on which the appearance of the second user interface element on the display is updated.

32. The non-transitory computer readable storage medium of claim 17, wherein updating the appearance of the second user interface element includes displaying a third user interface element that is distinct from the second user interface element, and the first user-interaction component behavior defines whether the third user interface element is to remain on display in response to a determination that the second input in the second sequence of inputs ceases to be detected.

33. The non-transitory computer readable storage medium of claim 17, wherein the first user-interaction component behavior includes a predefined animation.

34. The non-transitory computer readable storage medium of claim 17, wherein the computer readable storage medium further stores instructions, which, when executed by the electronic device, cause the electronic device to:
receive an update to the user-interaction behavior model, wherein the update modifies the first user-interaction component behavior and the modified first user-interaction component behavior is different from the first user-interaction component behavior before modification; and,
subsequent to receiving the update to the user-interaction behavior model, in response to detecting a sequence of inputs, update, based on the indication from the application-independent software module of whether the change in intensity of the second input has met conditions associated with the modified first user-interaction component behavior, the appearance of the second user interface element on the display based on the modified first user-interaction component behavior.

35. The non-transitory computer readable storage medium of claim 17, wherein
updating the appearance of the second user interface element on the display based on the first user-interaction component behavior includes changing, using the application-independent software module, the appearance of the second user interface element from a first display state to a second display state that is distinct from the first display state; and
the first display state and the second display state are defined by a software application associated with the second user interface element.

36. The non-transitory computer readable storage medium of claim 17, wherein the computer readable storage medium also stores instructions, which, when executed by the electronic device, cause the electronic device to:
display, on the display, a fourth user interface element that is associated with a second subset of the plurality of user-interaction component behaviors in the user-interaction behavior model.

37. The non-transitory computer readable storage medium of claim 17, wherein the first user interface element is associated with a first set of features of the user-interaction behavior model that includes the first user-interaction component behavior and the second user-interaction component behavior, and the second user interface element is associated a second set of features of the user-interaction behavior model that includes the first user-interaction component behavior but not the second user-interaction component behavior.

* * * * *